United States Patent
Kurasawa et al.

(10) Patent No.: US 11,126,287 B2
(45) Date of Patent: Sep. 21, 2021

(54) DISPLAY DEVICE

(71) Applicant: Japan Display Inc., Tokyo (JP)

(72) Inventors: Hayato Kurasawa, Tokyo (JP);
Hiroshi Mizuhashi, Tokyo (JP);
Tadayoshi Katsuta, Tokyo (JP)

(73) Assignee: Japan Display Inc., Tokyo (JP)

(*) Notice: Subject to any disclaimer, the term of this patent is extended or adjusted under 35 U.S.C. 154(b) by 107 days.

(21) Appl. No.: 15/986,919

(22) Filed: May 23, 2018

(65) Prior Publication Data
US 2018/0348935 A1 Dec. 6, 2018

(30) Foreign Application Priority Data

Jun. 1, 2017 (JP) .............................. JP2017-109437

(51) Int. Cl.
| G06F 3/041 | (2006.01) |
| G06F 3/046 | (2006.01) |
| G09G 3/36 | (2006.01) |
| G06F 3/044 | (2006.01) |

(52) U.S. Cl.
CPC ............ *G06F 3/0412* (2013.01); *G06F 3/046* (2013.01); *G06F 3/0442* (2019.05); *G06F 3/0445* (2019.05); *G06F 3/0446* (2019.05); *G06F 3/04166* (2019.05); *G09G 3/3611* (2013.01); *G06F 2203/04106* (2013.01); *G09G 2300/0426* (2013.01); *G09G 2320/029* (2013.01); *G09G 2354/00* (2013.01)

(58) Field of Classification Search
USPC ........................................................ 345/174
See application file for complete search history.

(56) References Cited

U.S. PATENT DOCUMENTS

| 2007/0124515 A1* | 5/2007 | Ishikawa ................. G06F 3/046 710/15 |
| 2012/0154326 A1* | 6/2012 | Liu ......................... G06F 3/0446 345/174 |
| 2012/0169400 A1* | 7/2012 | Liu ........................ G06F 3/04166 327/517 |

(Continued)

FOREIGN PATENT DOCUMENTS

| JP | H10-049301 A | 2/1998 |
| JP | 2005-352572 A | 12/2005 |
| JP | 2006-163745 A | 6/2006 |

*Primary Examiner* — Roberto W Flores
(74) *Attorney, Agent, or Firm* — K&L Gates LLP

(57) ABSTRACT

A display device includes a substrate, first electrodes, pixel electrodes, a display functional layer, common electrodes, second electrodes stacked in this order. The display device further includes lines that are provided between the substrate and the display functional layer and intersect with the first electrodes in the plan view. In response to a control signal from a controller, the pixel electrodes are supplied with a pixel signal through the lines, and the common electrodes are supplied with a common signal in the display periods; either of the lines and the first electrodes are supplied with a first drive signal to generate a magnetic field, and the other thereof generate an electromotive force caused by the magnetic field in the first sensing period; the common electrodes are supplied with a second drive signal to generate electrostatic capacitance between the common electrodes and the second electrodes in the second sensing period.

17 Claims, 34 Drawing Sheets

(56) References Cited

U.S. PATENT DOCUMENTS

| | | | |
|---|---|---|---|
| 2013/0093724 A1* | 4/2013 | Liu | G06F 3/046 |
| | | | 345/174 |
| 2014/0152616 A1* | 6/2014 | Kida | G06F 3/0418 |
| | | | 345/174 |
| 2015/0002453 A1* | 1/2015 | Lu | G06F 3/0445 |
| | | | 345/174 |
| 2015/0060832 A1* | 3/2015 | Ito | H01L 51/5225 |
| | | | 257/40 |
| 2016/0202820 A1* | 7/2016 | Ito | G02F 1/13306 |
| | | | 345/173 |
| 2016/0253023 A1* | 9/2016 | Aoyama | G06F 3/0416 |
| | | | 345/174 |
| 2016/0334903 A1* | 11/2016 | Shepelev | G06F 3/044 |

* cited by examiner

DISPLAY DEVICE

CROSS-REFERENCE TO RELATED APPLICATIONS

This application claims priority from Japanese Application No. 2017-109437, filed on Jun. 1, 2017, the contents of which are incorporated by reference herein in its entirety.

BACKGROUND

1. Technical Field

The present disclosure relates to a display device.

2. Description of the Related Art

In recent years, touch detection devices commonly called touchscreen panels that are capable of detecting an external proximate object have been attracted attention. Such a touchscreen panel is mounted on or integrated with a display device, such as a liquid crystal display device, which is used as a display device with a touch detection function. A capacitance method and an electromagnetic induction method are known as detection methods for such a display device. In the electromagnetic induction method, coils for generating magnetic fields and coils for detecting the magnetic fields are provided in the display device. An external object to be detected, such as a pen, is provided with a coil and a capacitive element forming a resonant circuit. The display device detects the pen through electromagnetic induction between the coils in the display device and the coil in the pen. Japanese Patent Application Laid-open Publication No. 10-49301 describes a coordinate input device using the electromagnetic induction method.

The capacitance method greatly differs from the electromagnetic induction method in the configuration of a detection target and detection electrodes. Therefore, if electrodes and various types of wiring provided in the display device and the driving configuration thereof are directly employed in the electromagnetic induction method, the electromagnetic induction touch detection may be difficult to be satisfactorily performed.

SUMMARY

According to an aspect, a display device includes a substrate; a plurality of first electrodes; a plurality of lines; a plurality of pixel electrodes; a display functional layer; a plurality of common electrodes; a plurality of second electrodes; and a controller. The substrate, the first electrodes, the pixel electrodes, the display functional layer, the common electrodes, and the second electrodes are stacked in this order, and the common electrodes and the second electrodes are provided so as to intersect with each other in a plan view. The lines are provided between the substrate and the display functional layer, arranged from one side to the other side of the substrate, and intersect with the first electrodes in the plan view. The controller is configured to perform processing during a plurality of display periods to display an image, during a first sensing period, and during a second sensing period in a time-division manner, and control the pixel electrodes, the common electrodes, and the first electrodes according to the periods. During the display periods, in response to a control signal from the controller, the pixel electrodes are supplied with a pixel signal through the lines, and the common electrodes are supplied with a common signal. During the first sensing period, in response to the control signal from the controller, either of the lines and the first electrodes are supplied with a first drive signal to generate a magnetic field, and the other of the lines and the first electrodes generate an electromotive force caused by the magnetic field. During the second sensing period, in response to the control signal from the controller, the common electrodes are supplied with a second drive signal to generate electrostatic capacitance between the common electrodes and the second electrodes.

DETAILED DESCRIPTION

Figure 1:
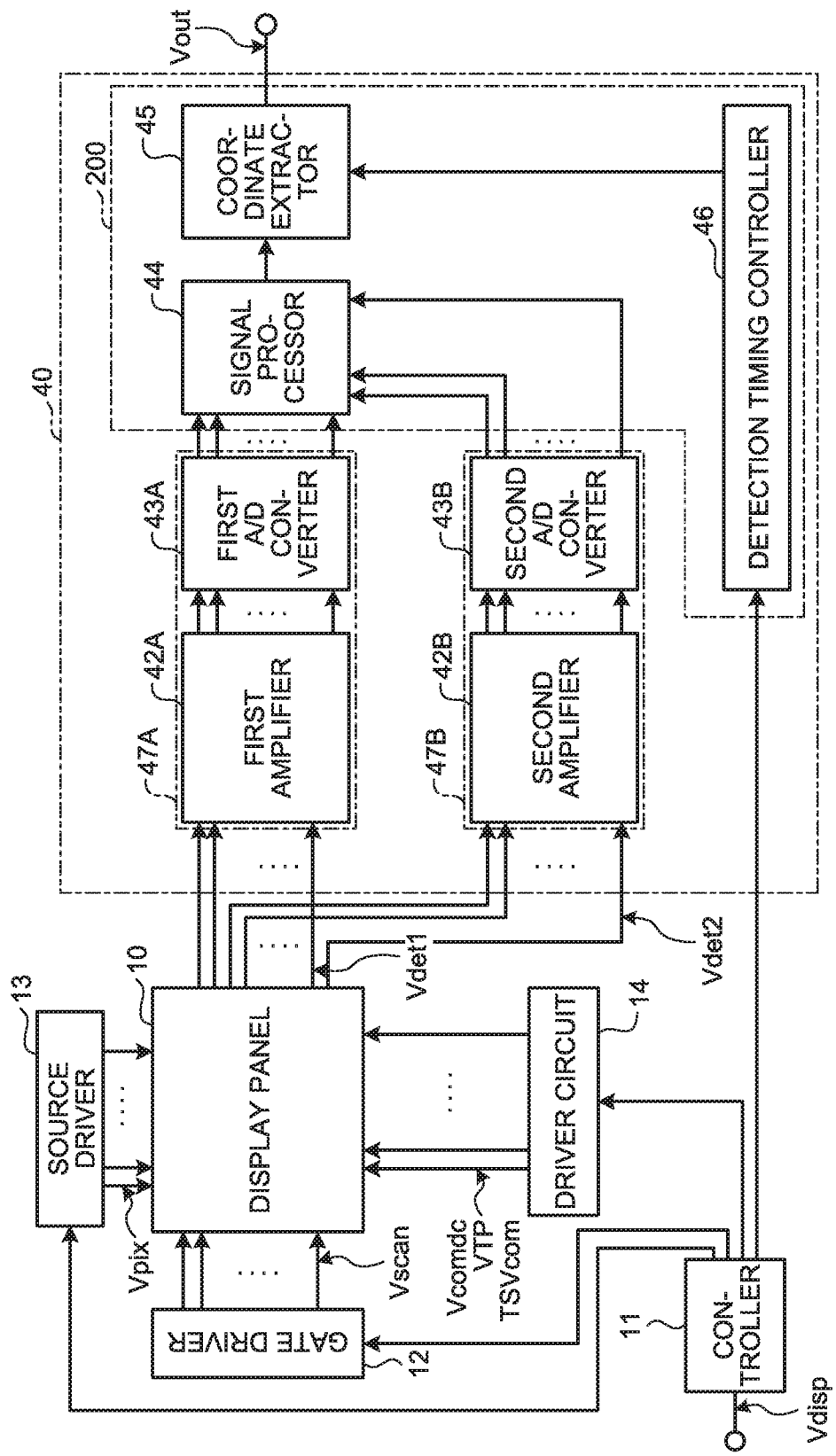
FIG. 1 is a block diagram illustrating a configuration example of a display device according to a first embodiment of the present disclosure.

The following describes embodiments for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. The disclosure is merely an example, and the present disclosure naturally encompasses appropriate modifications easily conceivable by those skilled in the art while maintaining the gist of the present disclosure. To further clarify the description, widths, thicknesses, shapes, and other properties of various parts are schematically illustrated as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating a configuration example of a display device according to a first embodiment of the present disclosure. A display device 1 of this embodiment incorporates a detection function to detect contact or proximity of a detection target body with or to a display surface. As illustrated in FIG. 1, the display device 1 includes a display panel 10, a controller 11, a gate driver 12, a source driver 13, a driver circuit 14, and a detector 40.

The display panel 10 includes a plurality of pixels including display elements. The display panel 10 has a display surface facing the pixels. The display panel 10 receives a video signal and displays an image formed by the pixels on the display surface.

The controller 11 is a circuit that controls mainly display operations by supplying control signals to the gate driver 12, the source driver 13, and the driver circuit 14 based on an externally supplied video signal Vdisp.

The gate driver 12 has a function to sequentially select one horizontal line as a target of display driving of the display panel 10 based on a control signal supplied from the controller 11.

The source driver 13 is a circuit that supplies a pixel signal Vpix to each sub-pixel SPix of the display panel 10 based on the control signal supplied from the controller 11. The present disclosure is, however, not limited to this configuration. The controller 11 may generate the pixel signal Vpix and supply the pixel signal Vpix to the source driver 13.

The driver circuit 14 supplies a drive signal Vcomdc for display, and a first drive signal VTP and a second drive signal TSVcom for detection, to common electrodes COML (refer to FIG. 7) based on the control signal supplied from the controller 11.

The controller 11 controls a detection operation to detect the detection target body, such as a finger or a touch pen of a user (hereinafter, simply called the detection target body in some cases), on or above the display panel 10. The display panel 10 has a function to detect a position of a finger in contact with or in proximity to the display surface of the display panel 10 based on the basic principle of touch detection using a mutual-capacitive touch detection method. The display panel 10 also has a function to detect a position of a touch pen in contact with or in proximity to the display surface based on the basic principle of touch detection using an electromagnetic induction method.

When the contact or the proximity of the touch pen is detected using the electromagnetic induction method, the display panel 10 outputs a first detection signal Vdet1 to the detector 40. When the contact or the proximity of the finger is detected using the mutual-capacitance method, the display panel 10 outputs a second detection signal Vdet2 to the detector 40.

During the electromagnetic induction touch detection, the detector 40 detects whether the display surface of the display panel 10 is touched by the touch pen based on a control signal supplied from the controller 11 and the first detection signal Vdet1 output from the display panel 10. During the mutual-capacitive touch detection, the detector 40 detects whether the display surface is touched by the finger based on the control signal supplied from the controller 11 and the second detection signal Vdet2 output from the display panel 10. If the display surface is touched, the detector 40 obtains, for example, coordinates where the touch input is performed.

As illustrated in FIG. 1, the detector 40 includes a first analog front-end circuit 47A (hereinafter, referred to as the first AFE 47A), a second analog front-end circuit 47B (hereinafter, referred to as the second AFE 47B), a signal processor 44, a coordinate extractor 45, and a detection timing controller 46.

The first AFE 47A includes a first amplifier 42A and a first analog-to-digital (A/D) converter 43A. The second AFE 47B includes a second amplifier 42B and a second A/D converter 43B. The first amplifier 42A amplifies the first detection signal Vdet1 supplied from the display panel 10. The first A/D converter 43A samples each analog signal output from the first amplifier 42A, and converts the analog signal into a digital signal at a time synchronized with the first drive signal VTP. The first AFE 47A is an analog signal processing circuit that converts the first detection signal Vdet1 into the digital signal, and outputs it to the signal processor 44. In the same manner, the second amplifier 42B amplifies the second detection signal Vdet2 supplied from the display panel 10. The second A/D converter 43B samples each analog signal output from the second amplifier 42B, and converts the analog signal into a digital signal at a time synchronized with the second drive signal TSVcom. The second AFE 47B is an analog signal processing circuit that converts the second detection signal Vdet2 into the digital signal, and outputs it to the signal processor 44.

The signal processor 44 is a logic circuit that detects whether the display panel 10 is touched, based on the output signals from the first AFE 47A and the second AFE 47B. The signal processor 44 performs processing of extracting a signal of difference (absolute value |ΔV|) in the detection signals caused by the detection target body. The signal processor 44 compares the absolute value |ΔV| with a predetermined threshold voltage. If the absolute value |ΔV| is lower than the threshold voltage, the signal processor 44 determines that the detection target body is in a non-contact state. If, instead, the absolute value |ΔV| is equal to or higher than the threshold voltage, the signal processor 44 determines that the detection target body is in a contact state or a proximate state. In this manner, the detector 40 can perform the touch detection.

In this specification, the term "contact state" includes a state where the detection target body is in contact with the display surface and a state where the detection target body is so proximate to the display surface as to be treatable as in contact therewith, and the term "non-contact state" includes a state where the detection target body is not in contact with the display surface and a state where the detection target body is not so proximate to the display surface as to be treatable as in contact therewith.

The coordinate extractor 45 is a logic circuit that obtains touchscreen panel coordinates of the touch when the touch is detected by the signal processor 44. The coordinate extractor 45 outputs the touchscreen panel coordinates as an output signal Vout. The coordinate extractor 45 may output the output signal Vout to the controller 11. The controller 11 can perform a predetermined operation of display or detection based on the output signal Vout.

The detection timing controller 46 controls, based on the control signal supplied from the controller 11, the first and second AFEs 47A and 47B, the signal processor 44, and the coordinate extractor 45 so as to operate them in synchronization with one another.

The first and second AFEs 47A and 47B, the signal processor 44, the coordinate extractor 45, and the detection timing controller 46 of the detector 40 are mounted on the display device 1. The present disclosure is, however, not limited to this configuration. All or some of the functions of the detector 40 may be incorporated in an external processor or the like. For example, the signal processor 44 and the coordinate extractor 45 may be incorporated in an external controller 200 separate from the display device 1.

Figure 2:
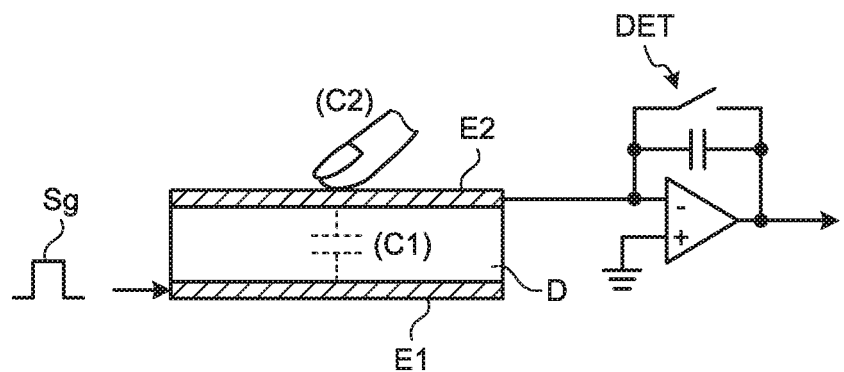
FIG. 2 is an explanatory diagram for explaining the basic principle of mutual-capacitive touch detection.

The display panel 10 performs touch control based on the basic principle of the capacitive touch detection and touch control based on the basic principle of the electromagnetic induction touch detection. The following describes the basic principle of the touch detection using the mutual-capacitive touch detection method performed by the display panel 10 of this embodiment, with reference to FIG. 2. FIG. 2 is an explanatory diagram for explaining the basic principle of the mutual-capacitive touch detection. FIG. 2 illustrates also a detection circuit. Although the following describes a case where the finger serving as the detection target body is in contact with or in proximity to the display surface, the detection target body is not limited to the finger, but may be a stylus pen.

For example, as illustrated in FIG. 2, a capacitive element C1 includes a pair of electrodes, that is, a drive electrode E1 and a detection electrode E2 that are disposed opposite to each other with a dielectric material D interposed therebetween. The capacitive element C1 generates lines of electric force between opposite surfaces of the drive electrode E1 and the detection electrode E2, and in addition, generates fringe components of the lines of electric force extending from ends of the drive electrode E1 toward the upper surface of the detection electrode E2. One end of the capacitive element C1 is coupled to an alternating-current signal source, and the other end thereof is coupled to a voltage detector DET. The voltage detector DET is included, for example, in the detector 40 illustrated in FIG. 1.

A square wave Sg having a predetermined frequency (ranging, for example, roughly from several kilohertz to several hundred kilohertz) is applied from the alternating-current signal source to the drive electrode E1 (one end of the capacitive element C1). In the non-contact state, a current corresponding to the capacitance value of the capacitive element C1 flows in the voltage detector DET. The voltage detector DET converts variation in current corresponding to the square wave Sg into variation in voltage.

In the contact state, electrostatic capacitance C2 generated by the finger is in contact with the detection electrode E2 or is so proximate thereto as to be treatable as in contact therewith, as illustrated in FIG. 2. This condition causes the finger to interrupt the fringe components of the lines of electric force present between the drive electrode E1 and the detection electrode E2. This interruption causes the capacitive element C1 to act as a capacitive element having a smaller capacitance value than that in the non-contact state.

The amplitude of the voltage signal output from the voltage detector DET is smaller in the contact state than that in the non-contact state. The absolute value |ΔV| of the difference in the voltage signal varies depending on whether the detection target body is present. The detector 40 compares the absolute value |ΔV| with the predetermined threshold voltage to determine whether the detection target body is in the non-contact state, or in either the contact state or the proximate state.

Figure 3:
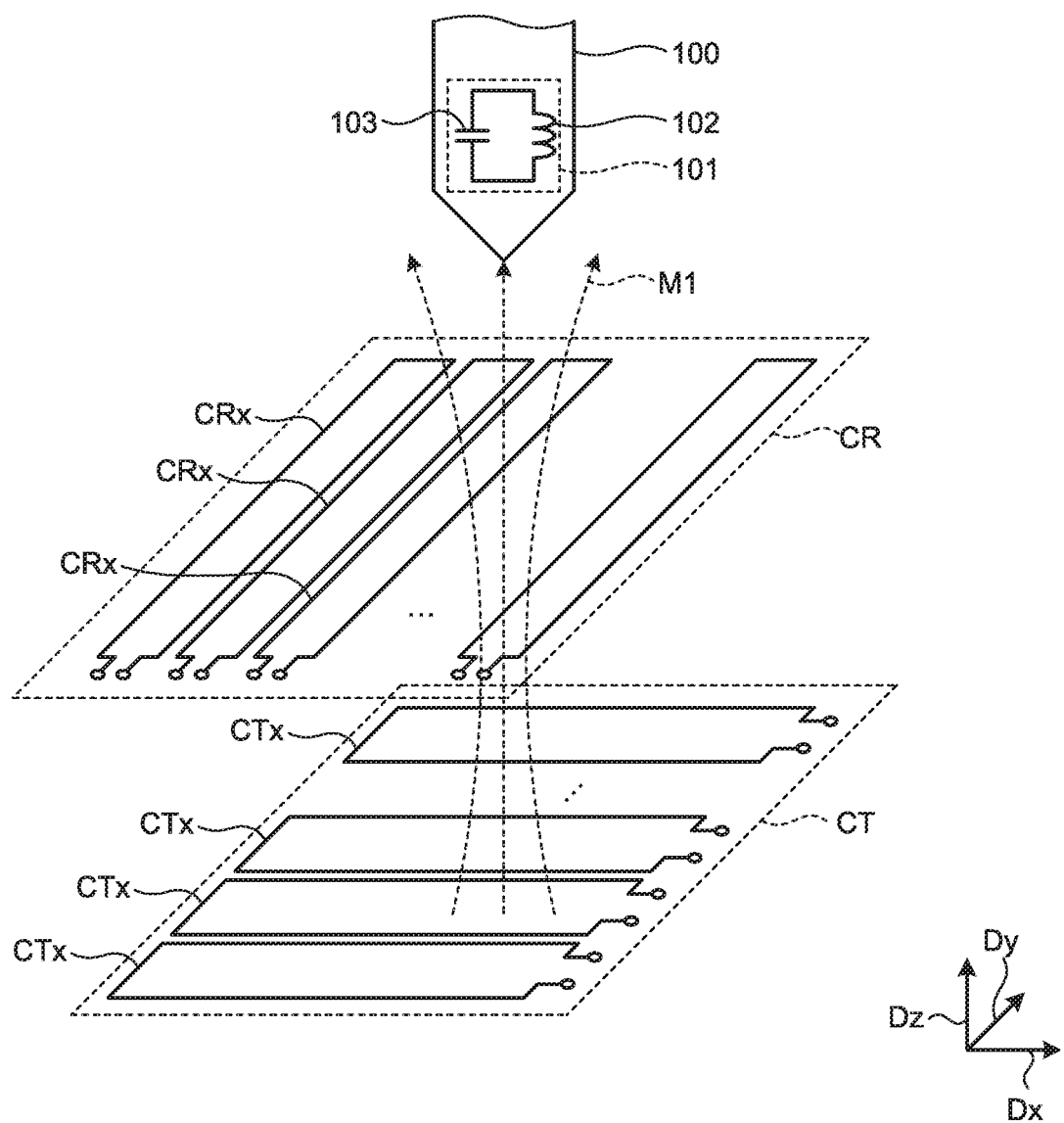
FIG. 3 is an explanatory diagram of a magnetic field generation period for explaining the basic principle of electromagnetic induction touch detection.
Figure 4:
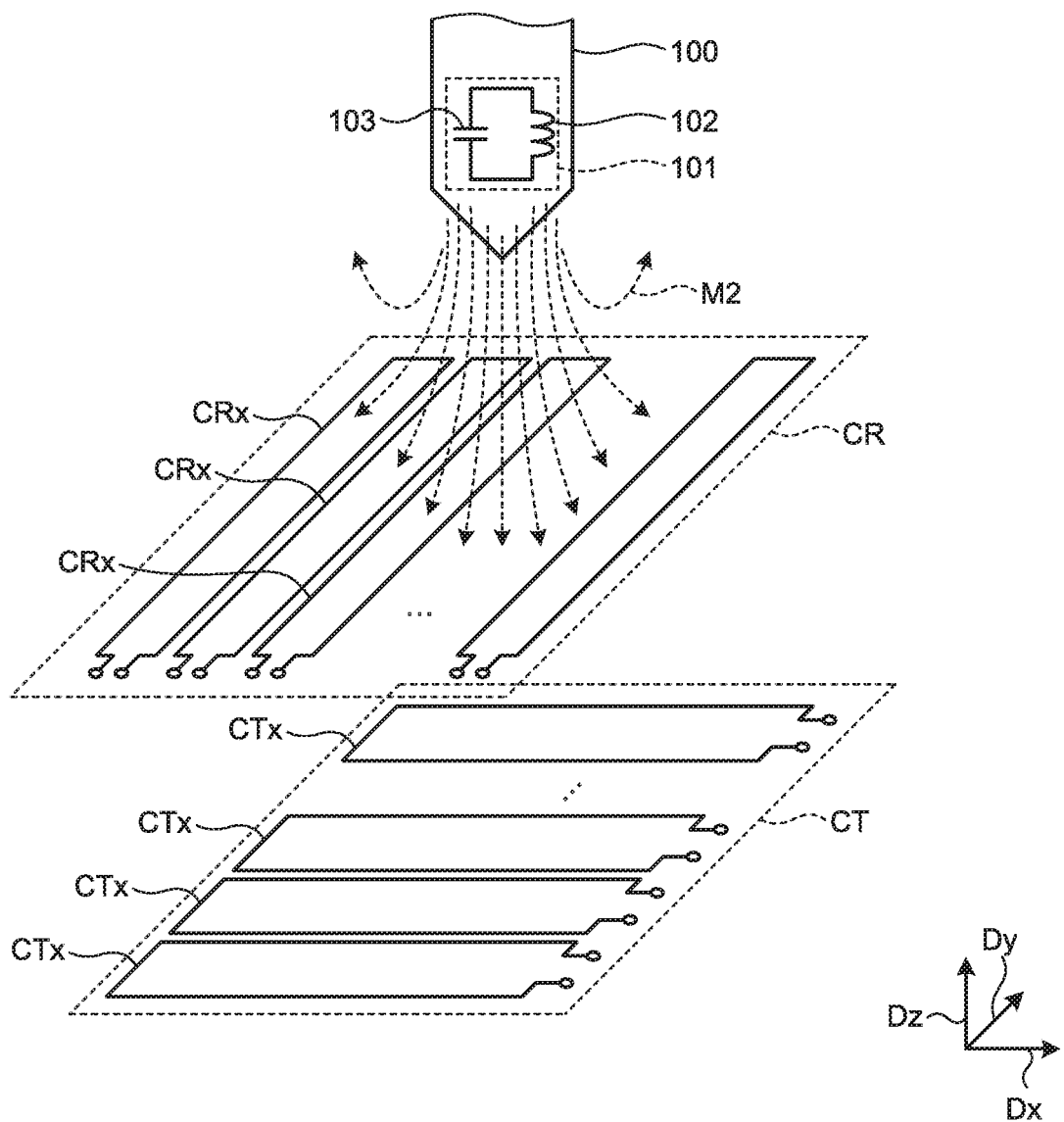
FIG. 4 is an explanatory diagram of a magnetic field detection period for explaining the basic principle of the electromagnetic induction touch detection.

The following describes the basic principle of the touch detection using the electromagnetic induction method performed by the display panel 10 of this embodiment, with reference to FIGS. 3 and 4. FIG. 3 is an explanatory diagram of a magnetic field generation period for explaining the basic principle of the electromagnetic induction touch detection. FIG. 4 is an explanatory diagram of a magnetic field detection period for explaining the basic principle of the electromagnetic induction touch detection.

As illustrated in FIGS. 3 and 4, in the electromagnetic induction touch detection, the contact or the proximity of a touch pen 100 is detected. A resonant circuit 101 is provided in the touch pen 100. The resonant circuit 101 is configured by coupling a coil 102 to a capacitive element 103 in parallel.

In the electromagnetic induction method, transmitting coils CT and receiving coils CR are provided so as to overlap with each other. A longitudinal direction of each transmitting coil CTx corresponds to a first direction Dx. A longitudinal direction of each receiving coil CRx corresponds to a second direction Dy. The receiving coils CRx are provided so as to intersect with the transmitting coils CTx in a plan view. The transmitting coil CTx is coupled to the alternating-current signal source (drive signal source). The receiving coil CRx is coupled to the voltage detector DET (refer to FIG. 2).

As illustrated in FIG. 3, during the magnetic field generation period, a square wave having a predetermined frequency (ranging, for example, roughly from several kilohertz to several hundred kilohertz) is applied from an alternating-current signal source to the transmitting coil CTx. As a result, a current flows in the transmitting coil CTx, and the transmitting coil CTx generate a magnetic field M1 corresponding to the change in current. When the touch pen 100 is in contact with or in proximity to the display surface, an electromotive force is generated in the coil 102 by mutual induction between the transmitting coil CTx and the coil 102, whereby the capacitive element 103 is charged.

Then, during the magnetic field detection period illustrated in FIG. 4, the coil 102 of the touch pen 100 generates a magnetic field M2 that varies with the resonant frequency of the resonant circuit 101. The magnetic field M2 passes through the receiving coil CRx, and as a result, an electromotive force is generated in the receiving coils CRx by mutual induction between the receiving coil CRx and the coil 102. A current corresponding to the electromotive force of the receiving coil CRx flows in the voltage detector DET. In this manner, the electromotive force is generated in the resonant circuit 101 of the touch pen 100 according to the magnetic field M1 generated in the transmitting coil CTx; the magnetic field M2 is generated in the coil 102 according to the electromotive force; and the electromotive force is generated in the receiving coil CRx according to the magnetic field M2. In view of the above description, the electromotive force of the receiving coil CRx can be said to be generated according to the magnetic field generated in the transmitting coil CTx. Although the description of the touch pen 100 and the magnetic field M2 will be omitted in following the embodiments, the magnetic field M1 generated in the transmitting coil CTx causes the generation of the electromotive force in the receiving coil CRx through the above-described process.

The voltage detector DET converts variation in current corresponding to the electromotive force of the receiving coil CRx into variation in voltage. As described above, the detector 40 compares the absolute value |ΔV| with the predetermined threshold voltage to determine whether the touch pen 100 is in the non-contact state, or in either the contact state or the proximate state. The detector 40 can detect the touch pen 100 based on the basic principle of the electromagnetic induction touch detection by scanning each of the transmitting coils CTx and the receiving coils CRx.

Figure 5:
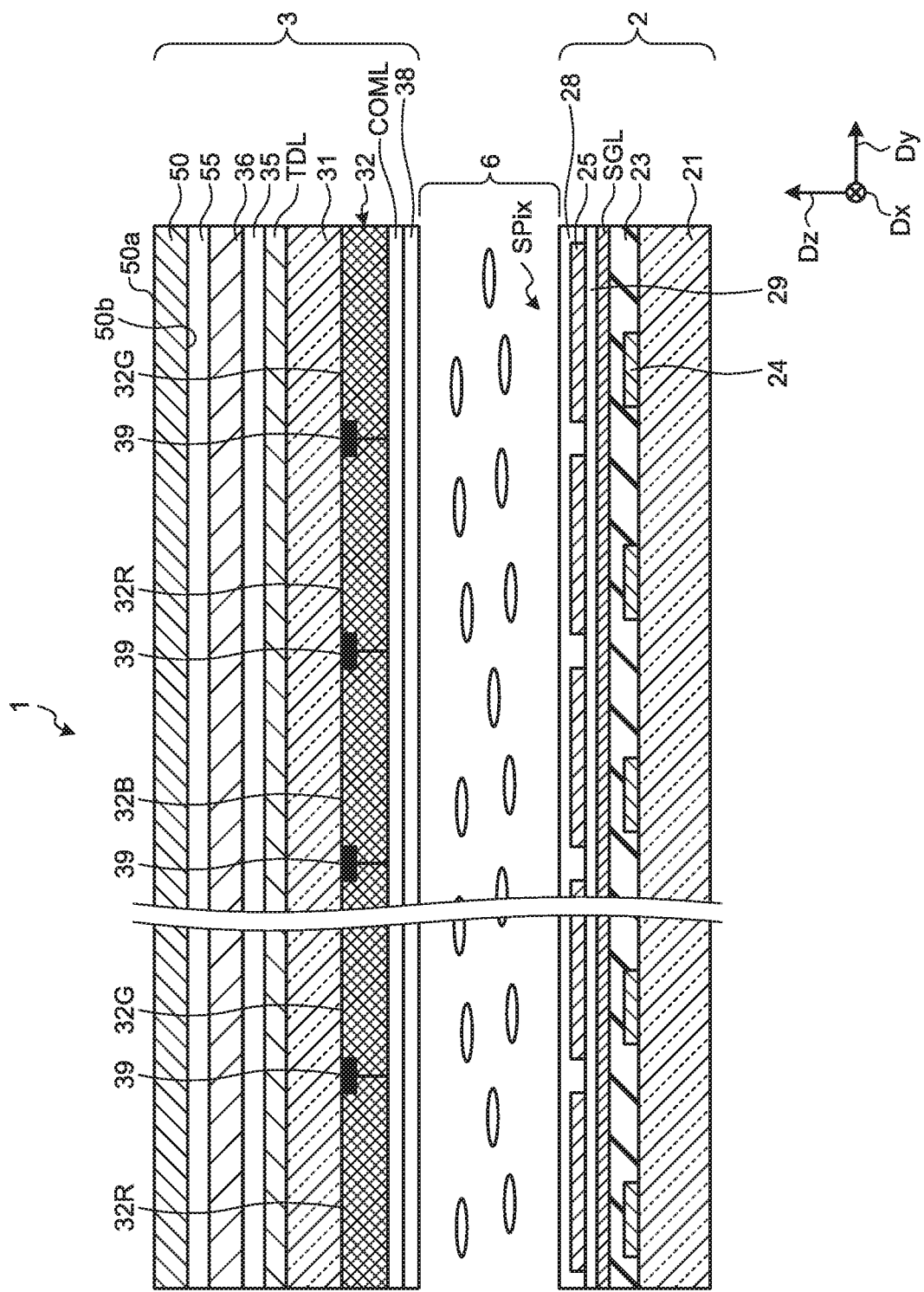
FIG. 5 is a schematic diagram illustrating a sectional structure of the display device according to the first embodiment.

The following describes a configuration example of the display device 1 of this embodiment. FIG. 5 is a schematic diagram illustrating a sectional structure of the display device according to the first embodiment. As illustrated in FIG. 5, the display device 1 includes a pixel substrate 2, a counter substrate 3, a liquid crystal layer 6 serving as a display functional layer, and a cover member 50. The counter substrate 3 is disposed so as to be opposed to a surface of the pixel substrate 2 in the vertical direction. The liquid crystal layer 6 is provided between the pixel substrate 2 and the counter substrate 3.

The cover member 50 is provided on a surface of the counter substrate 3. A first surface 50a of the cover member 50 is the display surface on which an image is displayed, and is a detection surface to which the detection target body comes in contact or proximity. In this embodiment, the touch detection includes a case of detecting the detection target body directly in contact with the first surface 50a. The touch detection also includes a case where the first surface 50a is provided thereon with a protective film (not illustrated), and the detection target body in contact with the protective film is detected.

The cover member 50 is bonded to a polarizing plate 36 with an adhesive layer 55 interposed therebetween. The cover member 50 may be a glass substrate or may be a film-like base material using a light-transmitting resin material or other materials. Light (external light) incident from outside on the first surface 50a side is reflected by pixel electrodes 25 in the pixel substrate 2 and is transmitted from the first surface 50a. The display device 1 of this embodiment is a reflective liquid crystal display device that displays the image using this reflected light.

In this specification, the first direction Dx refers to a direction parallel to the first surface 50a, and the second direction Dy refers to a direction intersecting with the first direction Dx in a plane parallel to the first surface 50a. A third direction Dz refers to a direction orthogonal to the first surface 50a. In this specification, in a direction orthogonal to a first substrate 21, the term "upper side" refers to a direction from the first substrate 21 toward a second substrate 31, and the term "lower side" refers to a direction from the second substrate 31 toward the first substrate 21. The term "plan view" refers to a case of viewing from a direction orthogonal to a surface of the first substrate 21.

The pixel substrate 2 includes the first substrate 21, first electrodes 24, the pixel electrodes 25, signal lines SGL, an insulating layer 23, a planarizing film 29, and an orientation film 28. The first electrodes 24, the signal lines SGL, and the pixel electrodes 25 are provided in this order to the first substrate 21. For example, a glass substrate is used as the first substrate 21. The first substrate 21 is provided with circuit elements and various types of wiring, such as gate lines, which are not illustrated, in addition to the signal lines SGL. The circuit elements include switching elements, such as thin-film transistors (TFTs), and capacitive elements.

The pixel electrodes 25 are provided on the planarizing film 29. The orientation film 28 is disposed on the outermost surface of the pixel substrate 2, and is provided between the pixel electrodes 25 and the liquid crystal layer 6. The pixel electrodes 25 are made of, for example, a metal, such as aluminum (Al) or silver (Ag). The pixel electrodes 25 may also have a configuration stacked with such a metal material and a light-transmitting conductive material, such as indium tin oxide (ITO). The pixel electrodes 25 are made using a material having good reflectance, and are provided as reflective electrodes that diffusively reflect the light incident from outside.

The first electrodes 24 are provided between the first substrate 21 and the pixel electrodes 25 in the direction orthogonal to the surface of the first substrate 21. The first electrodes 24 are provided so as to overlap the pixel electrodes 25 with the insulating layer 23 and the planarizing film 29 in between. This configuration generates retention capacitance 53 (refer to FIG. 6) between the first electrodes 24 and the pixel electrodes 25. In this embodiment, the first electrodes 24 also serve as the receiving coils CRx (refer to FIGS. 3 and 4) of the display panel 10.

The counter substrate 3 includes the second substrate 31, a color filter 32 provided on one surface of the second substrate 31, the common electrodes COML, an orientation film 38, second electrodes TDL provided on the other surface of the second substrate 31, an insulating layer 35, and the polarizing plate 36. In this embodiment, the second substrate 31 is, for example, a glass substrate or a resin substrate. Each of the second electrodes TDL serves as the detection electrode E2 (refer to FIG. 2) of the display panel 10.

The color filter 32 is opposed to the liquid crystal layer 6 in the direction orthogonal to the first substrate 21. The color filter 32 may be disposed on the first substrate 21. The color filter 32 includes, for example, three filters having a color region 32R (red), a color region 32G (green), and a color region 32B (blue). The color filter 32 may include a white (W) filter, or may include filters having five or more different colors. A light-shielding layer 39 is provided at boundary portions between the color regions 32R, 32G, and 32B. The light-shielding layer 39 is a colored resin layer or metal layer commonly called a black matrix.

The common electrodes COML are provided on a side of the second substrate 31 opposite to a side thereof facing the second electrodes TDL. The common electrodes COML are provided between the color filter 32 and the liquid crystal layer 6 in the direction orthogonal to the first substrate 21. The common electrodes COML are made of a light-transmitting conductive material, such as ITO.

The liquid crystal layer 6 includes, for example, nematic liquid crystals. Liquid crystal molecules of the liquid crystal layer 6 are stationary in an initial orientation state while no electric field is generated between the common electrodes COML and the pixel electrodes 25. During a display period Pd (refer to FIG. 9), the level of a voltage between the common electrodes COML and the pixel electrodes 25 is changed, and an electric field is generated between the common electrodes COML and the pixel electrodes 25. As a result, the orientation of the liquid crystal molecules changes from the initial orientation. The electric field can differ between the pixel electrodes 25. Accordingly, light passing through the liquid crystal layer 6 is modulated on a per sub-pixel SPix basis.

With the configuration described above, the first substrate 21, the first electrodes 24, the pixel electrodes 25, the liquid crystal layer 6 serving as the display functional layer, the common electrodes COML, and the second electrodes TDL are stacked in this order. The second substrate 31 serving as an insulating substrate is provided between the common electrodes COML and the second electrodes TDL. The incident light incident from the first surface 50a side of the display device 1 passes through the counter substrate 3 and the liquid crystal layer 6, and reaches the pixel electrodes 25. The incident light is reflected by the pixel electrodes 25. The light reflected by the pixel electrodes 25 passes through the liquid crystal layer 6 to be modulated on a per sub-pixel SPix basis, and is transmitted from the first surface 50a.

Since the display device 1 is a reflective display device that performs display by reflecting the external light, a light source, such as a frontlight or a backlight, is not provided. The display device 1 is, however, not limited to this configuration, and may have a light source, such as the frontlight or the backlight. In this case, the frontlight is provided on the first surface 50a side, or the backlight is provided on the back surface of the pixel substrate 2, that is, on a side of the first substrate 21 opposite to a side thereof facing the liquid crystal layer 6. When the backlight is used, light from the backlight passes between the pixel electrodes 25 to reach the first surface 50a. The light from the backlight serves as auxiliary light.

Figure 6:
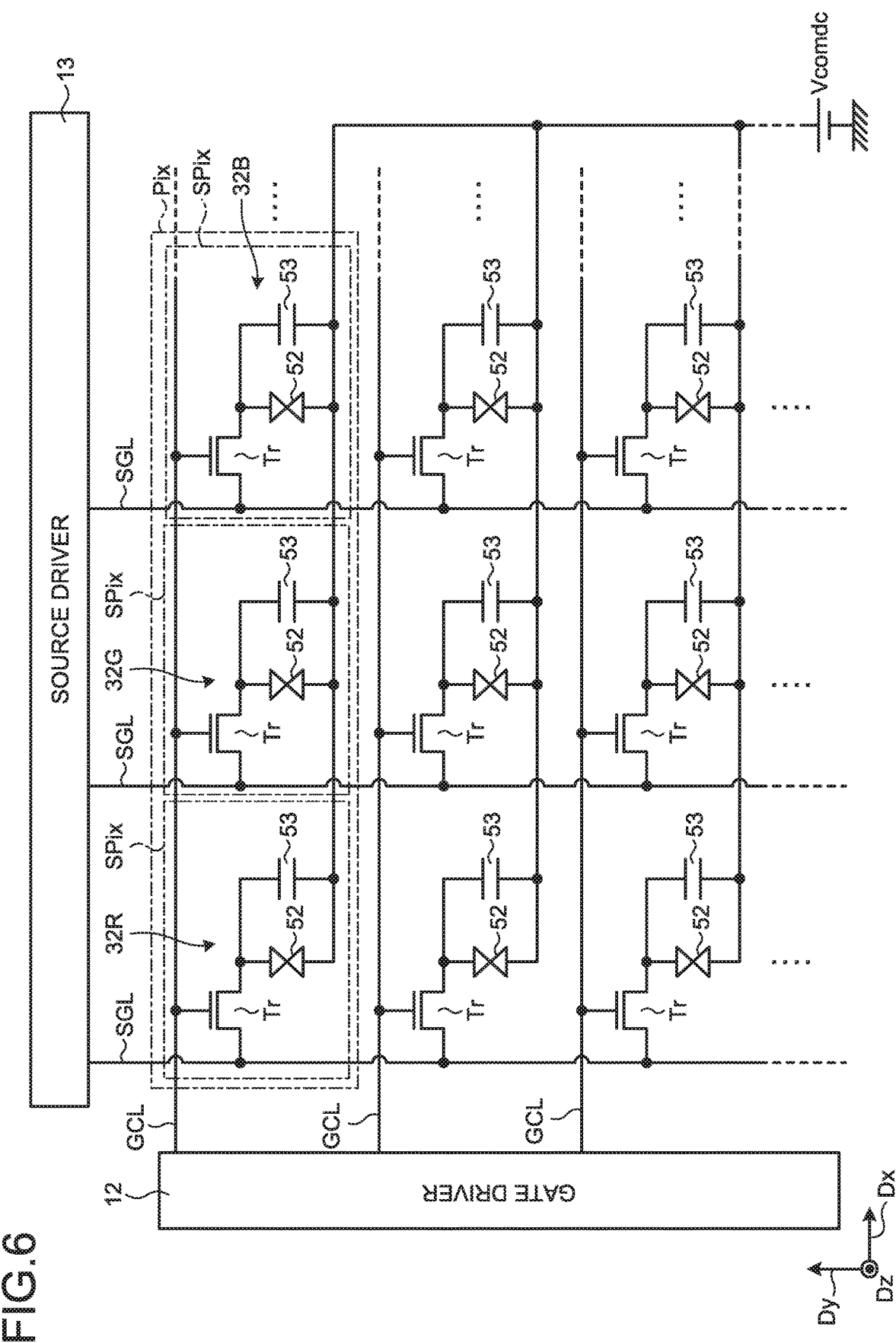
FIG. 6 is a circuit diagram illustrating a pixel array of the display device according to the first embodiment.

The following describes the display operation of the display device 1. FIG. 6 is a circuit diagram illustrating a pixel array of the display device according to the first embodiment. The first substrate 21 illustrated in FIG. 5 is provided with switching elements Tr of the respective sub-pixels SPix and wiring, such as the signal lines SGL for supplying the pixel signals Vpix to the corresponding pixel electrodes 25 and the gate lines GCL for supplying the drive signals for driving the switching elements Tr. The gate lines GCL and the signal lines SGL are provided so as to intersect with each other. The gate lines GCL and the signal lines SGL partition a display region Ad (refer to FIG. 7) into a matrix having a row-column configuration. Each of the partitioned regions is referred to as the sub-pixel SPix.

As illustrated in FIG. 6, the display device 1 includes the sub-pixels SPix arranged in a matrix having a row-column configuration. Each of the sub-pixels SPix includes the switching element Tr, a liquid crystal element 52, and the retention capacitance 53. The sub-pixel SPix is provided with the pixel electrode 25 (refer to FIG. 5), and the pixel electrode 25 is coupled to the switching element Tr. The switching element Tr is fabricated from a thin-film transistor (TFT), and in the present example, fabricated from an n-channel metal oxide semiconductor (MOS) TFT. The liquid crystal element 52 includes liquid crystal capacitance generated between the pixel electrode 25 and the common electrode COML. Capacitance generated between the pixel electrode 25 and the first electrode 24 can be used as the retention capacitance 53. The sub-pixel SPix is not limited to this configuration, but may be provided with a capacitive element.

The gate lines GCL are coupled to the gate driver 12. The gate driver 12 sequentially selects the gate lines GCL. The gate driver 12 applies a scan signal Vscan (refer to FIG. 1) to the gate of each of the switching elements Tr through the selected one of the gate lines GCL. This operation sequentially selects one row (one horizontal line) of the sub-pixels SPix as a target of display driving. The signal lines SGL are coupled to the source driver 13. The source driver 13 supplies the pixel signal Vpix to each of the sub-pixels SPix included in the selected one horizontal line through the signal lines SGL. These sub-pixels SPix perform display of each horizontal line according to the supplied pixel signals Vpix.

When this display operation is performed, the driver circuit 14 (refer to FIG. 1) applies the drive signal Vcomdc for display to the common electrodes COML and the first electrodes 24. As a result, the common electrodes COML and the first electrodes 24 serve as common electrodes for the pixel electrodes 25 during the display operation. In this embodiment, the common electrodes COML are provided along the gate lines GCL, and intersect with the signal lines SGL. The common electrodes COML are not limited to this configuration, and may be provided so as to intersect with the gate lines GCL.

The color regions 32R, 32G, and 32B of the three colors correspond to the sub-pixels SPix illustrated in FIG. 6 described above. The combination of the color regions 32R, 32G, and 32B is regarded as a set. The sub-pixels SPix corresponding to the color regions 32R, 32G, and 32B of the three colors R, G, and B as a set constitute a pixel Pix.

Figure 7:
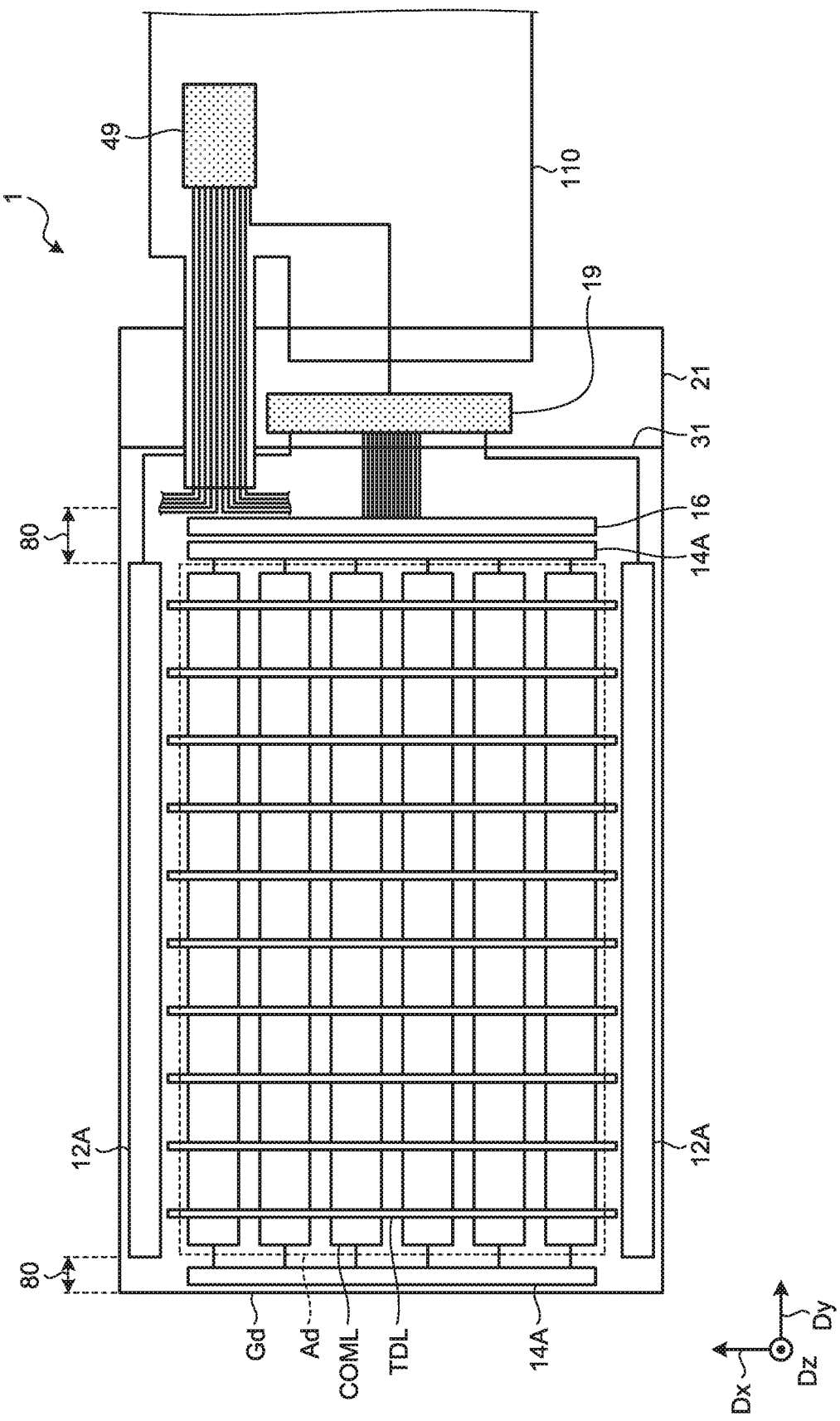
FIG. 7 is a plan view schematically illustrating the display device according to the first embodiment.

The following describes the configuration of the common electrodes COML and the second electrodes TDL, and the touch detection operation. FIG. 7 is a plan view schematically illustrating the display device according to the first embodiment. As illustrated in FIG. 7, the display device 1 is provided with a display region Ad and a peripheral region Gd. In this specification, the display region Ad is a region for displaying the image, and is a region overlapping with the pixels Pix (sub-pixels SPix). In this embodiment, a direction along a long side of the display region Ad is assumed to be the second direction Dy, and a direction intersecting with the second direction Dy is assumed to be the first direction Dx.

As illustrated in FIG. 7, the common electrodes COML are provided in the display region Ad. The common electrodes COML are provided so as to extend in the second direction Dy, and are arranged in the first direction Dx. The second electrodes TDL are provided in the display region Ad. The second electrodes TDL extend in the first direction Dx, and are arranged in the second direction Dy. That is, the common electrodes COML and the second electrodes TDL are provided so as to intersect with each other in the plan view. Both the common electrodes COML and the second electrodes TDL are formed into strips. Electrostatic capacitance is generated at intersecting portions between the common electrodes COML and the second electrodes TDL, and at the peripheries thereof.

The second electrodes TDL are made by forming thin metal wires having a width of several micrometers to several tens micrometers into zigzag lines, wavy lines, or a mesh. In the same manner as the common electrodes COML, the second electrodes TDL may be made using a light-transmitting conductive material, such as ITO.

As illustrated in FIG. 7, a flexible substrate 110 is coupled to the first substrate 21 and the second substrate 31 in the peripheral region Gd. The flexible substrate 110 is provided with a touch integrated circuit (IC) 49 for controlling the detection operation of the display panel 10. The second electrodes TDL are each electrically coupled to the touch IC 49. In addition, the first substrate 21 in the peripheral region Gd is provided with a driver IC 19 for controlling the display operation of the display panel 10. The common electrodes COML are each electrically coupled to the driver IC 19. The various circuits, such as the source driver 13 and the driver circuit 14, illustrated in FIG. 1 are provided in the driver IC 19. A multiplexer 16 is provided between the driver IC 19 and the display region Ad. The first and second AFEs 47A and 47B illustrated in FIG. 1 are provided in the touch IC 49.

The long sides of the peripheral region Gd of the first substrate 21 are provided with various circuits, such as a gate scanner 12A. The short sides of the peripheral region Gd of the first substrate 21 are provided with various circuits, such as a common electrode scanner 14A. The gate scanner 12A is a circuit included in the gate driver 12 (refer to FIG. 1), and sequentially selects the gate lines GCL. The common electrode scanner 14A is a circuit that sequentially or simultaneously selects the common electrodes COML. The common electrode scanner 14A is electrically coupled to the common electrodes COML, and supplies various drive signals from the driver IC 19 to the common electrodes COML. In the peripheral region Gd, a region provided with the common electrode scanner 14A and a region provided with the common electrode scanner 14A and the multiplexer 16 serve as a peripheral circuit region 80.

With this configuration, when the mutual-capacitive touch detection is performed, the driver IC 19 supplies the second drive signal TSVcom to the common electrodes COML in a time-division manner. In this case, the common electrode scanner 14A may simultaneously select a plurality of common electrodes COML as a drive electrode block Bk, and sequentially supply the second drive signal TSVcom on a per drive electrode block Bk basis. The second detection signal Vdet2 corresponding to a change in electrostatic capacitance between the common electrodes COML and the second electrodes TDL is output from the second electrodes TDL to the touch IC 49, and thus, the touch of the detection target body is detected. That is, each of the common electrodes COML corresponds to the drive electrode E1, and each of the second electrodes TDL corresponds to the detection electrode E2, in the basic principle of the mutual-capacitive touch detection described above.

Figure 8:
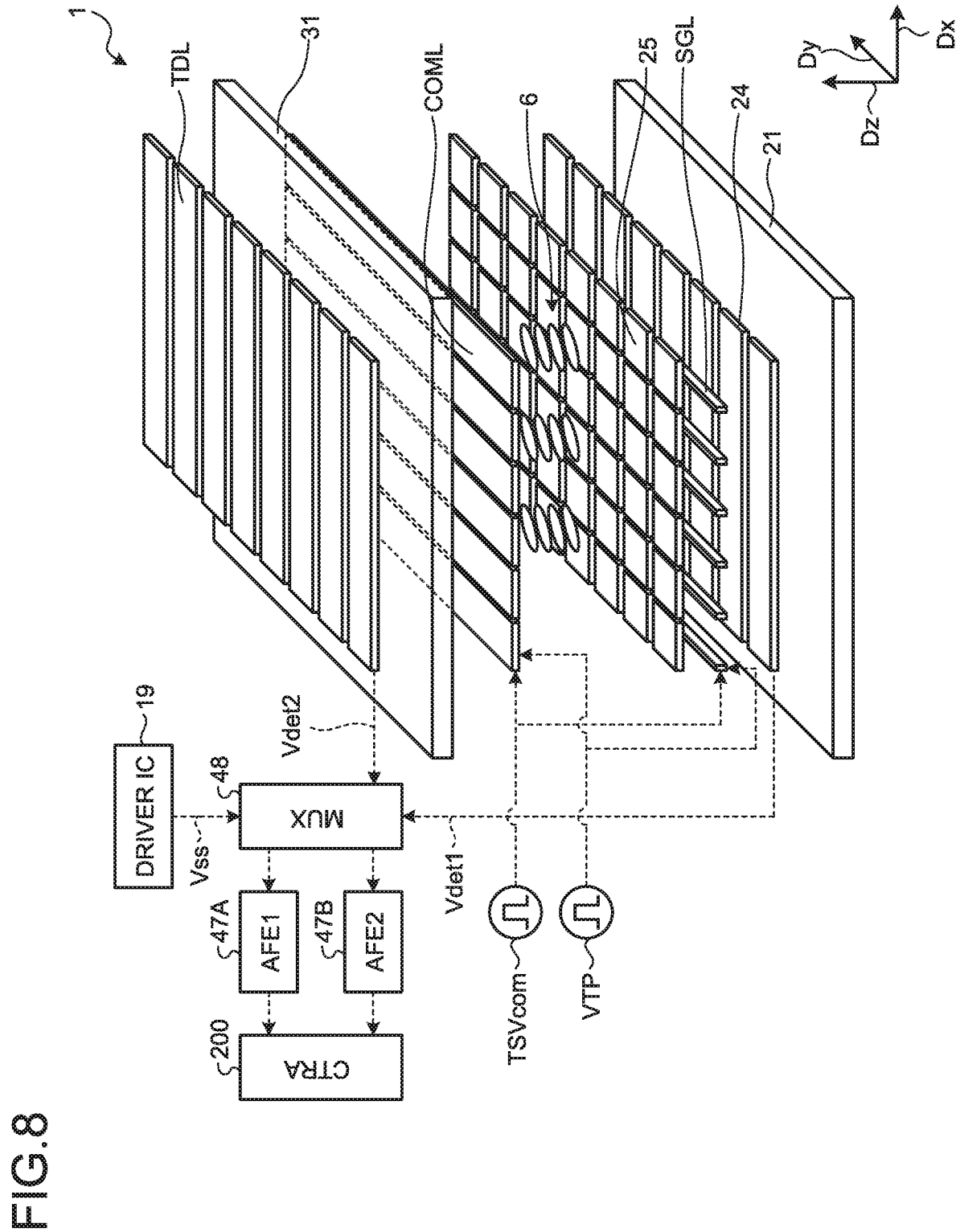
FIG. 8 is an exploded perspective view of the display device according to the first embodiment.

FIG. 8 is an exploded perspective view of the display device according to the first embodiment. As illustrated in FIG. 8, the first electrodes 24 are provided so as to extend in the first direction Dx, and are arranged in the second direction Dy. The first electrodes 24 are provided so as to intersect with the common electrodes COML in the plan view, and extend in the same direction as that of the second electrodes TDL. The signal lines SGL are disposed between the first substrate 21 and the liquid crystal layer 6. The signal lines SGL are provided along the second direction Dy, and are arranged in the first direction Dx. The signal lines SGL intersect with each of the first electrodes 24 and each of the second electrodes TDL in the plan view, and extend in the same direction as that of the common electrodes COML.

The first AFE 47A is electrically coupled to the first electrodes 24 through a multiplexer 48. The second AFE 47B is electrically coupled to the second electrodes TDL through the multiplexer 48. The driver IC 19 supplies a switching signal Vss to the multiplexer 48. The multiplexer 48 is a circuit that changes the coupling states of the first electrodes 24 and the second electrodes TDL to the first AFE 47A and the second AFE 47B, respectively, based on the switching signal Vss. The multiplexer 48 couples the first electrodes 24 to the first AFE 47A when the electromagnetic induction method is used, and couples the second electrodes TDL to the second AFE 47B when the mutual-capacitance method is used. The multiplexer 48 may be provided on the second substrate 31, or provided in the touch IC 49. The output signals from the first and second AFEs 47A and 47B are supplied to the external controller 200. The controller 200 is, for example, a host IC mounted on a control board.

When the electromagnetic induction touch detection is performed, the driver IC 19 (refer to FIG. 7) supplies the first drive signal VTP to the common electrodes COML. The common electrodes COML serve as the transmitting coils CTx when the electromagnetic induction touch detection is performed. As a result, the electromagnetic induction is generated among the common electrodes COML, the touch pen 100, and the first electrodes 24. The electromotive force is generated in the first electrodes 24 by the mutual induction with the touch pen 100. The first detection signal Vdet1 corresponding to the electromotive force is supplied from the first electrodes 24 to the first AFE 47A through the multiplexer 48. As a result, the electromagnetic induction touch detection is performed.

When the mutual-capacitive touch detection is performed, the driver IC 19 (refer to FIG. 7) supplies the second drive signal TSVcom to the common electrodes COML. The second detection signal Vdet2 corresponding to the change in electrostatic capacitance between the common electrodes COML and the second electrodes TDL is supplied from the second electrodes TDL to the second AFE 47B through the multiplexer 48. As a result, the mutual-capacitive touch detection is performed.

In this embodiment, when the electromagnetic induction touch detection is performed, the driver IC 19 supplies the first drive signal VTP also to the signal lines SGL. When the mutual-capacitive touch detection is performed, the driver IC 19 supplies the second drive signal TSVcom also to the signal lines SGL. That is, in the same manner as the common electrodes COML, the signal lines SGL each serve as the drive electrode E1 in the mutual-capacitance method, and serve as the transmitting coils CTx in the electromagnetic induction method. This configuration can improve detection sensitivity in the touch detection using the mutual-capacitance method and the electromagnetic induction method.

Figure 9:
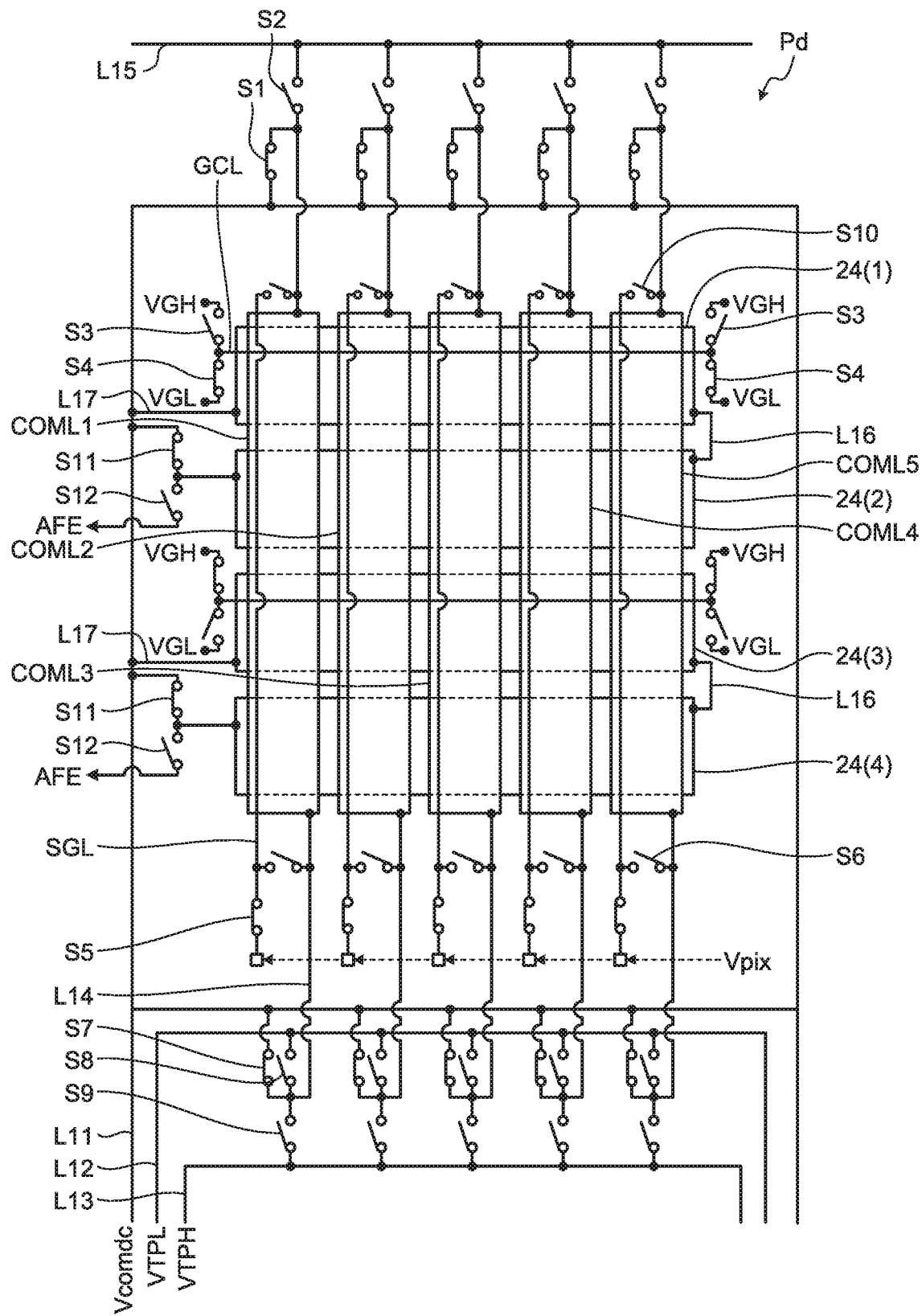
FIG. 9 is a circuit diagram illustrating a coupling configuration of common electrodes during a display period.
Figure 10:
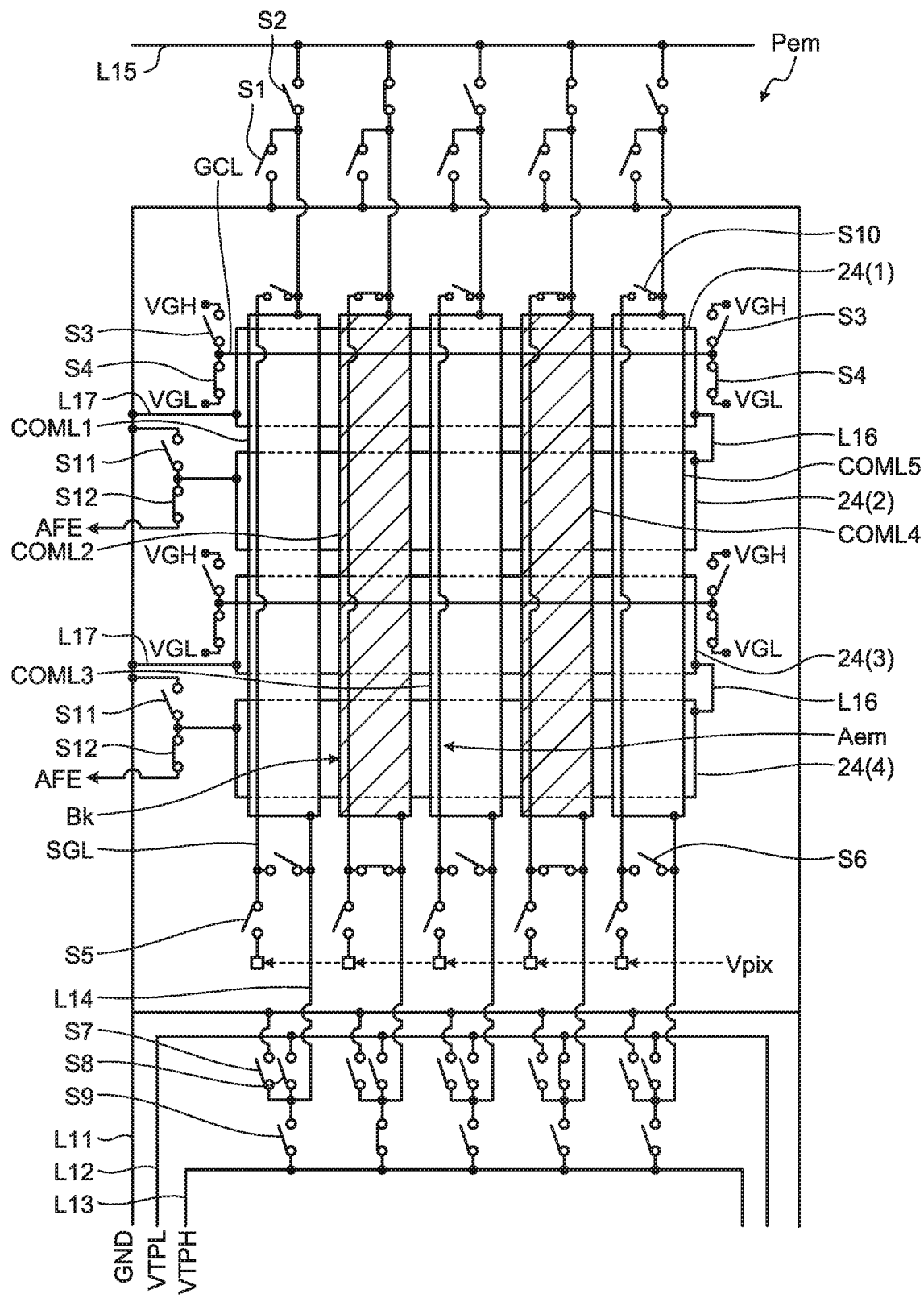
FIG. 10 is a circuit diagram illustrating a coupling configuration of the common electrodes during a first sensing period.
Figure 11:
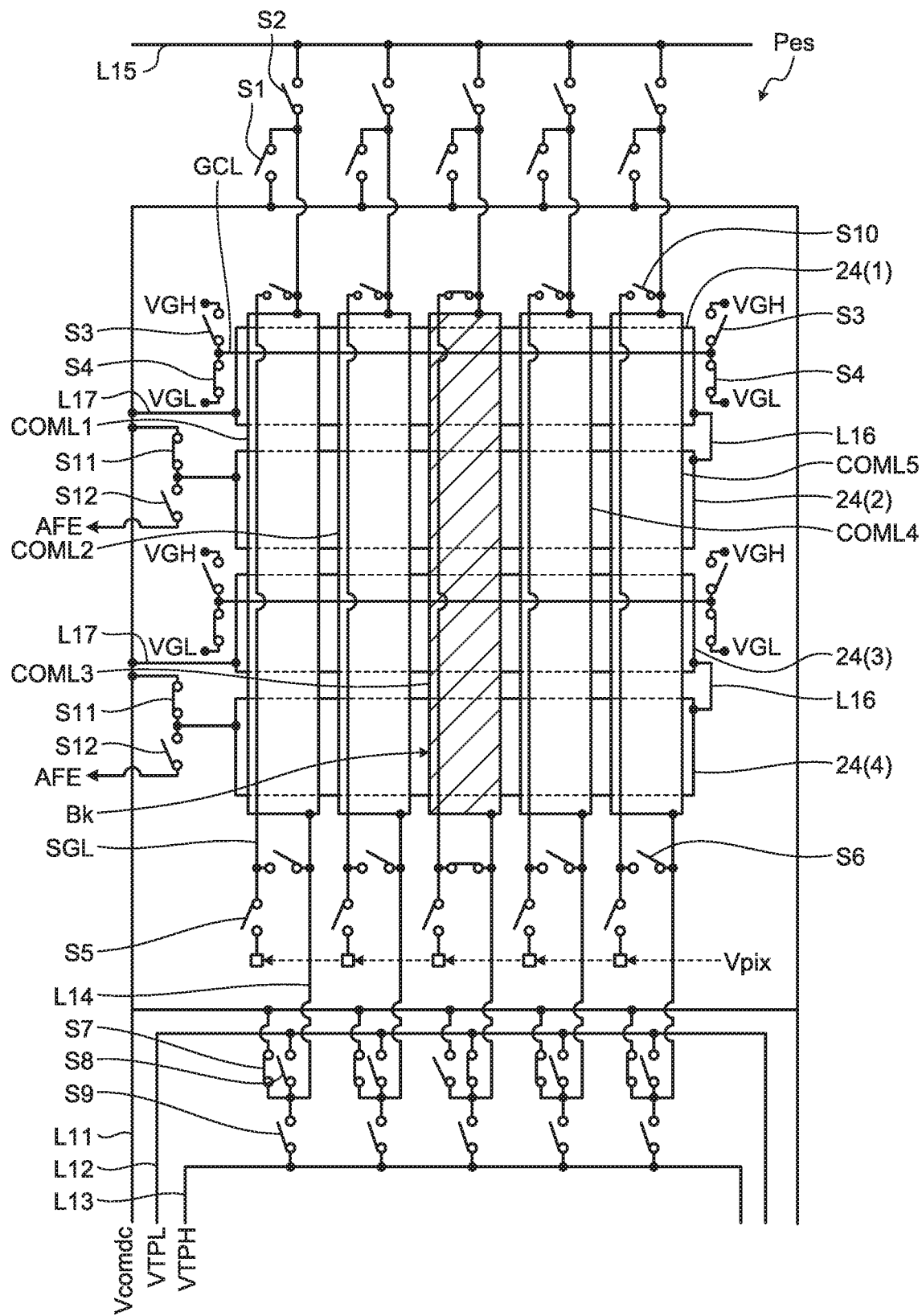
FIG. 11 is a circuit diagram illustrating still a coupling configuration of the common electrodes during a second sensing period.

The common electrodes COML have the functions of the common electrodes during the display, the drive electrodes during the touch detection using the mutual-capacitance method, and the transmitting coils using the electromagnetic induction method. Therefore, the coupling state needs to be changed according to the operation of each of the functions. The following describes coupling configurations of the common electrodes COML. FIG. 9 is a circuit diagram illustrating a coupling configuration of the common electrodes during a display period. FIG. 10 is a circuit diagram illustrating a coupling configuration of the common electrodes during a first sensing period. FIG. 11 is a circuit diagram illustrating a coupling configuration of the common electrodes during a second sensing period.

As illustrated in FIGS. 9 to 11, a plurality of common electrodes COML1, COML2, COML3, COML4, and COML5 are arranged. In the following description, the common electrodes COML1, COML2, COML3, COML4, and COML5 will each be referred to as a common electrode COML when they need not be distinguished from one another. A plurality of first electrodes 24(1), 24(2), 24(3), and 24(4) are arranged so as to intersect with the common electrodes COML. In the following description, the first electrodes 24(1), 24(2), 24(3), and 24(4) will each be referred to as the first electrode 24 when they need not be distinguished from one another.

As illustrated in FIGS. 9 and 11, the drive signal Vcomdc for display is supplied to the common electrodes COML through wiring L11. As illustrated in FIGS. 9 to 11, a second voltage VTPL is supplied to the common electrodes COML and the signal lines SGL through wiring L12. A first voltage VTPH is supplied to the common electrodes COML and the signal lines SGL through wiring L13. Wiring L14 couples the common electrodes COML to the wiring L11, L12, and L13. Wiring L15 couples the ends on the same side of the common electrodes COML to one another.

The first voltage VTPH is a direct-current voltage signal having a first potential. The second voltage VTPL is a direct-current voltage signal having a second potential lower than the first potential.

A switch S1 is provided between the wiring L11 and one end of the common electrode COML. A switch S2 is provided between the wiring L15 and one end of the common electrode COML. In the following description, one end of the common electrode COML is referred to as the upper end, and the other end thereof is referred to as the lower end, with reference to FIGS. 9 to 11. A high-level voltage VGH of the scan signal Vscan (refer to FIG. 1) is supplied to the gate lines GCL through switches S3. A low-level voltage VGL of the scan signal Vscan is supplied to the gate lines GCL through switches S4. The pixel signals Vpix are supplied to the signal lines SGL through switches S5.

Switches S6 are provided between the signal lines SGL and the wiring L14 coupled to the lower ends of the common electrodes COML. Switches S7 are provided between the wiring L11 and the wiring L14 coupled to the lower ends of the common electrodes COML. Switches S8 are provided between the wiring L12 and the wiring L14 coupled to the lower ends of the common electrodes COML. Switches S9 are provided between the wiring L13 and the wiring L14 coupled to the lower ends of the common electrodes COML. Switches S10 face the switches S6 across the common electrodes COML, and are provided between the signal lines SGL and the upper ends of the common electrodes COML. The switches S6 and the switches S10 switches between coupling and uncoupling corresponding ends, that is, ends on the same side, of the corresponding signal lines SGL and the corresponding common electrodes COML.

Of the one of a pair of the first electrodes 24(1) and 24(2), one end of the first electrodes 24(1) is coupled to the wiring L11 through wiring L17. In the following description, one end of the first electrode 24 is referred to as the left end, and the other end thereof is referred to as the right end, with reference to FIGS. 9 to 11. The right ends on the same side of the first electrodes 24(1) and 24(2) are coupled to each other through wiring L16. As a result, the first electrodes 24(1) and 24(2) are coupled together so as to form a loop. The left end of the first electrode 24(2) is coupled to the wiring L11 through a switch S11, or coupled to the first AFE 47A through a switch S12. The first electrodes 24(3) and 24(4) are coupled together so as to form a loop in the same manner.

As illustrated in FIG. 9, the switches S1 and S7 are turned on in response to the control signal from the controller 11 during the display period Pd. As a result, the upper ends of the common electrodes COML are coupled to the wiring L11 through the switches S1, and the lower ends thereof are coupled to the wiring L11 through the wiring L14 and the switches S7. As a result, the drive signal Vcomdc for display is supplied to both ends of the common electrodes COML through the wiring L11.

During the display period Pd, the switches S11 are turned on and the switches S12 are turned off in response to the control signal from the controller 11. As a result, the left end of each of the first electrodes 24 is coupled to the wiring L11 through the wiring L17 or the switch S11. As a result, the drive signal Vcomdc for display is supplied to each of the first electrodes 24 through the wiring L11. In this manner, the drive signal Vcomdc for display is supplied to the common electrodes COML and also to the first electrodes 24.

The switches S3 and the switches S4 coupled to the gate lines GCL operate in a manner inverted from each other. The switches S3 are sequentially turned on to supply the high-level voltage VGH of the scan signal Vscan to a selected one of the gate lines GCL. The other of the gate lines GCL not selected are supplied with the low-level voltage VGL. The switches S5 are turned on to supply the pixel signals Vpix to the signal lines SGL.

During the display period Pd, the switches S6 and S10 are turned off to uncouple the signal lines SGL from the common electrodes COML. All the switches S8 and S9 are turned off to uncouple the respective common electrodes COML from the wiring L12 and L13. As a result, the first voltage VTPH and the second voltage VTPL are not supplied to the common electrodes COML and the signal lines SGL.

As described above, during the display period Pd, the pixel signals Vpix are supplied to the pixel electrodes 25 through the signal lines SGL, and the drive signal Vcomdc as a common signal is supplied to the common electrodes COML and the first electrodes 24.

As illustrated in FIG. 10, during a first sensing period Pem in which the electromagnetic induction touch detection is performed, the switches S5 are turned off and some of the switches S6 and S10 are turned on in response to the control signal from the controller 11. As a result, some of the common electrodes COML are electrically coupled to some of the signal lines SGL overlapping with such common electrodes COML. Such signal lines SGL are supplied with the same signal as the first drive signal VTP that is supplied to the common electrodes COML through the wiring L14.

The following describes a case illustrated in FIG. 10 where the common electrodes COML2 and COML4 are selected as the drive electrode block Bk. A region between the common electrodes COML2 and COML4 serves as a detection region Aem. Specifically, the switches S2 coupled to the upper ends of the common electrodes COML2 and COML4 are turned on. As a result, the upper end of the common electrode COML2 is coupled to the upper end of the common electrode COML4 through the wiring L15. The common electrode COML2, the wiring L15, and the common electrode COML4 are coupled together so as to form a loop surrounding the detection region Aem. As a result, the common electrodes COML2 and COML4 are formed as a transmitting coil CTx (refer to FIG. 3).

As described above, such switches S2 are provided that couple together the ends on the same side of a pair of the common electrodes COML (such as the common electrodes COML2 and COML4) among the common electrodes COML. During the first sensing period Pem, the controller 11 couples together the pair of the common electrodes COML by operating the switches S2. As a result, the pair of the common electrodes COML is formed as the transmitting coil CTx. During a period different from the first sensing period Pem, the controller 11 brings the pair of the common electrodes COML into an uncoupled state by operating the switches S2.

The switch S8 coupled to the lower end of the common electrode COML2 is turned off, and the switch S9 coupled thereto is turned on. As a result, the lower end of the common electrode COML2 and the signal line SGL overlapping with the common electrode COML2 are supplied with the first voltage VTPH through the wiring L13 and L14. The switch S8 coupled to the lower end of the common electrode COML4 is turned on, and the switch S9 coupled thereto is turned off. As a result, the lower end of the common electrode COML4 and the signal line SGL overlapping with the common electrode COML4 are supplied with the second voltage VTPL through the wiring L12 and L14. Each of the first voltage VTPH and the second voltage VTPL is a direct-current voltage signal. The operations of the switches are switched at a predetermined frequency to generate the first drive signal VTP serving as an alternating-current voltage signal. The common electrodes COML2 and COML4 are supplied with the first drive signal VTP.

Currents corresponding to the potential difference between the first voltage VTPH and the second voltage VTPL flow in the common electrodes COML2 and COML4. These currents generate a magnetic field passing through the detection region Aem. The currents flowing in the common electrodes COML2 and COML4 generate the magnetic field to cause the electromagnetic induction.

During the first sensing period Pem, the wiring L11 is grounded, and a ground voltage GND is supplied to the left end of the first electrode 24(1) and the left end of the first electrode 24(3). The switches S11 coupled to the respective left ends of the first electrodes 24(2) and 24(4) are turned off, and the switches S12 coupled thereto are turned on. As a result, the left end of the first electrode 24(2) and the left end of the first electrode 24(4) are coupled to the first AFE 47A through the corresponding switches S12. As a result, a pair of the first electrodes 24(1) and 24(2) is provided as a receiving coil CRx (refer to FIG. 3). A pair of the first electrodes 24(3) and 24(4) is also provided as a receiving coil CRx. The electromotive force based on the electromagnetic induction is generated in the first electrodes 24. A current corresponding to the electromotive force is supplied to the first AFE 47A. As a result, the electromagnetic induction touch detection is performed.

The switches S7, S8, and S9 coupled to the lower end sides of the common electrodes COML1, COML3, and COML5 are turned off. As a result, the common electrodes COML1, COML3, and COML5 are not supplied with the ground voltage GND, the first voltage VTPH, and the second voltage VTPL, and are placed in a floating state. The switches S6 and S10 corresponding to the signal lines SGL overlapping with the common electrodes COML1, COML3, and COML5 are turned off, and thus, the signal lines SGL overlapping with the common electrodes COML1, COML3, and COML5 are placed in the floating state.

During the first sensing period Pem, all the switches S3 are turned off, and all the switches S4 are turned on. As a result, the gate lines GCL are supplied with the low-level voltage VGL as a direct-current voltage signal. All the switches S5 are turned off, and thus, none of the signal lines SGL are supplied with the pixel signal Vpix.

As illustrated in FIG. 11, also during a second sensing period Pes, the switches S5 are turned off, and one of the switches S6 and a corresponding one of the switches S10 are turned on. As a result, one of the common electrodes COML is electrically coupled to one of the signal lines SGL overlapping with the common electrode COML. The switches S2 are turned off. As a result, the lower ends of the common electrodes COML are uncoupled from one another.

The following describes a case illustrated in FIG. 11 where the common electrode COML3 is selected as the drive electrode block Bk. Specifically, the switch S8 and the switch S9 that are coupled to the lower end of the common electrode COML3 alternately repeat on/off operations. As a result, the first voltage VTPH and the second voltage VTPL are alternately supplied to the common electrode COML3 and the signal line SGL overlapping therewith. This operation supplies the second drive signal TSVcom to the common electrode COML3 and the signal line SGL overlapping therewith.

The switches S7 coupled to the lower ends of the common electrodes COML1, COML2, COML4, and COML5 are turned on. As a result, the common electrodes COML1, COML2, COML4, and COML5 and the signal lines SGL overlapping therewith are supplied with the drive signal Vcomdc through the wiring L11. The controller 11 sequentially selects the drive electrode block Bk so as to perform the touch detection in the display region Ad using the capacitance method.

With the configurations described above, during the display period Pd, the signal lines SGL are supplied with the pixel signals in response to the control signals from the controller 11. During the first sensing period Pem, the signal lines SGL opposed to the common electrodes COML supplied with the first drive signal VTP are supplied with the same potential signal as the first drive signal VTP. That is, the common electrodes COML and the signal lines SGL serve as the transmitting coils CTx during the first sensing period Pem. The magnetic field generated from the signal lines SGL overlaps with the magnetic field generated from the common electrodes COML in the detection region Aem.

During the second sensing period Pes, the signal lines SGL opposed to the common electrodes COML supplied with the second drive signal TSVcom are supplied with the same potential signal as the second drive signal TSVcom. That is, the signal lines SGL also serve as the drive electrodes during the second sensing period Pes. As a result, the detection sensitivity is improved in the electromagnetic induction method and the mutual-capacitance method.

Figure 12:
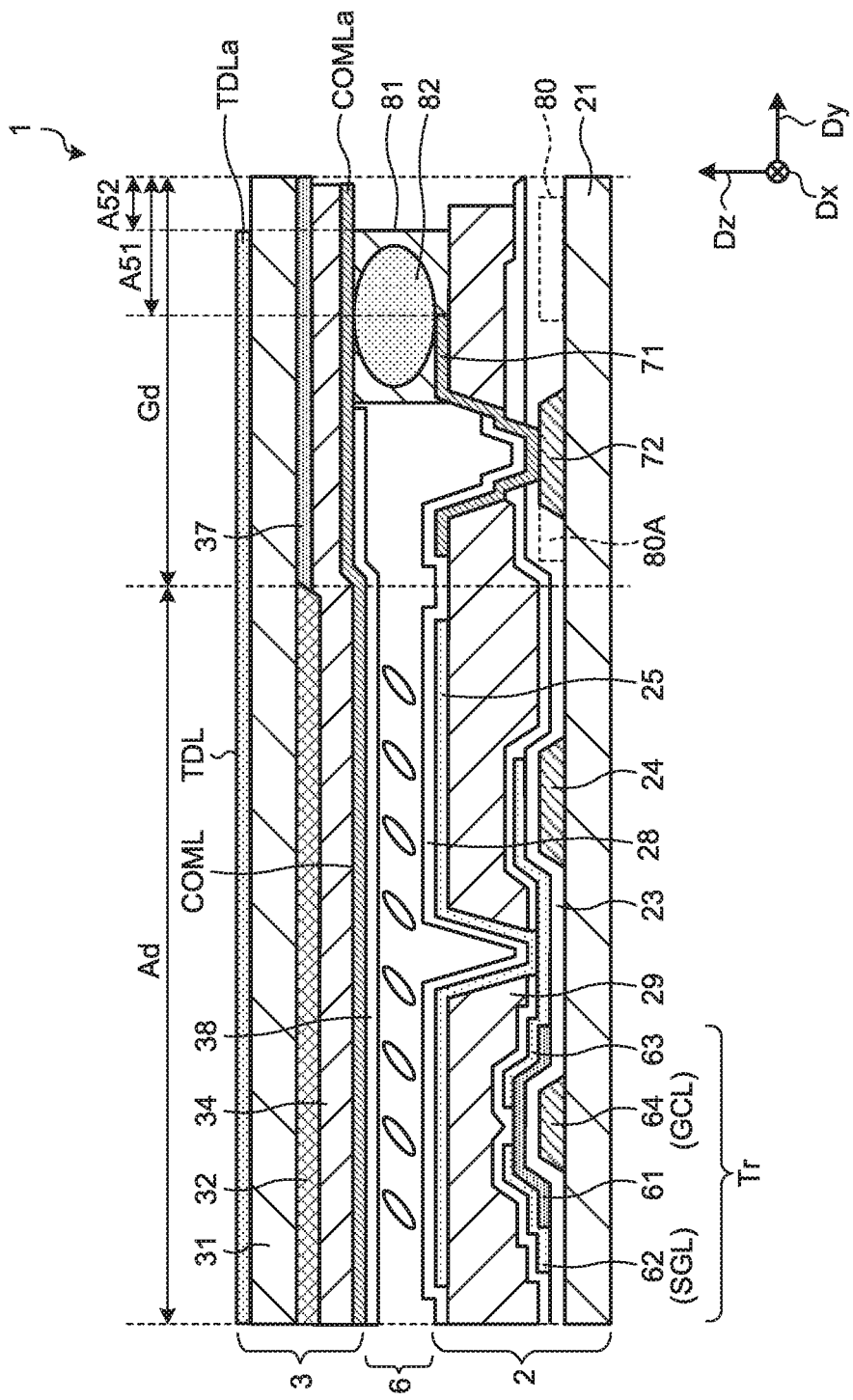
FIG. 12 is a schematic sectional diagram for explaining a coupling configuration between the common electrodes and signal lines.
Figure 13:
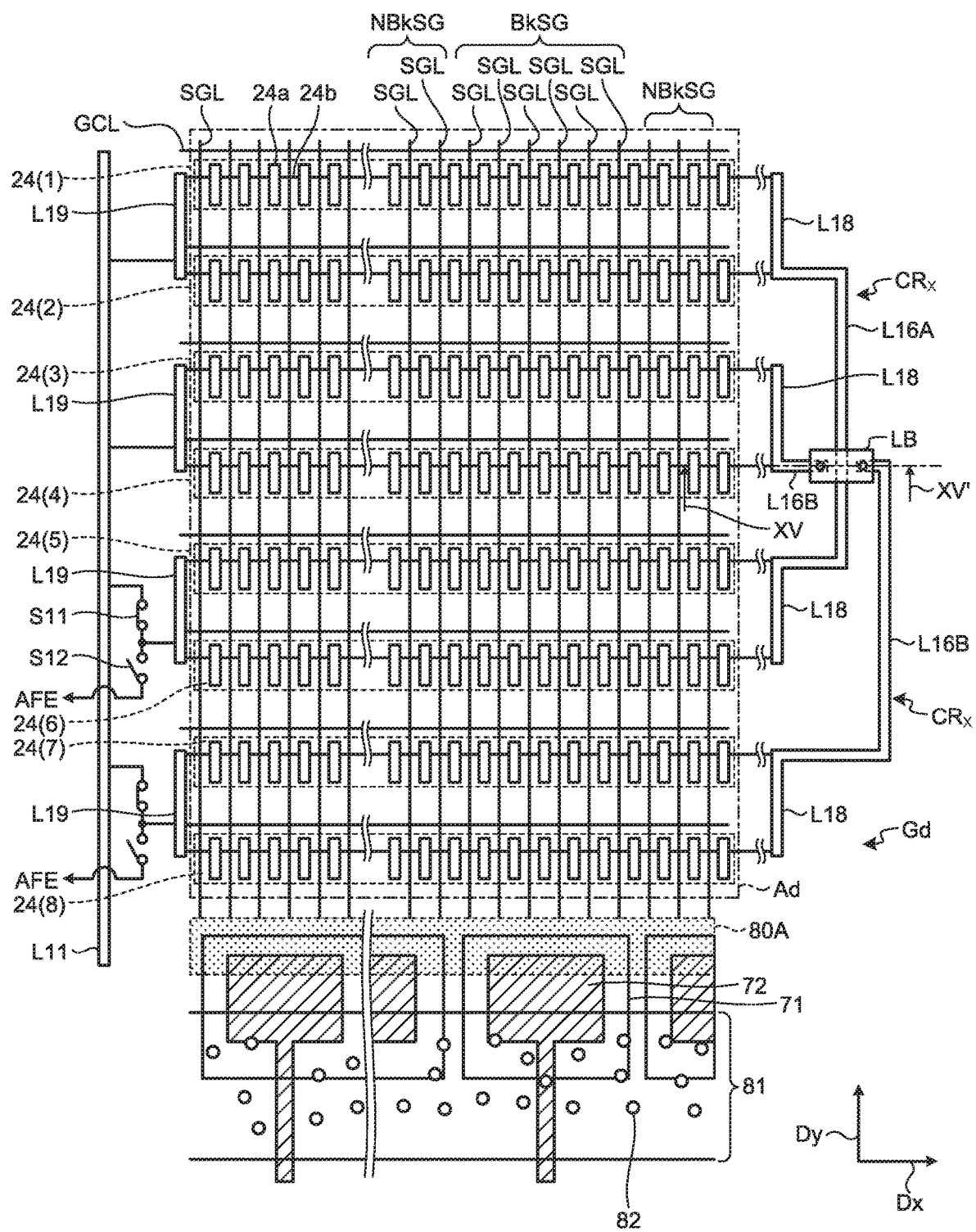
FIG. 13 is a plan view schematically illustrating first electrodes, the signal lines, and a conductive portion.
Figure 14:
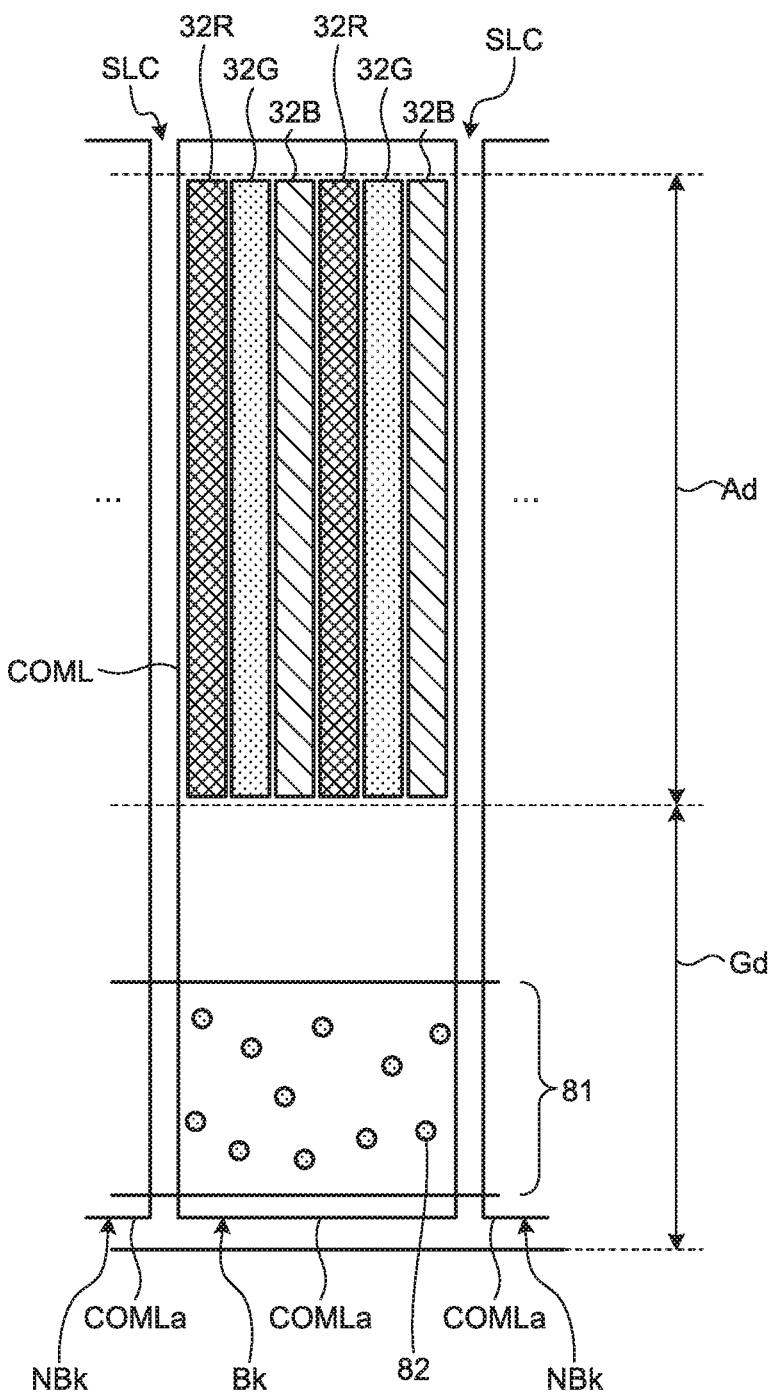
FIG. 14 is a plan view schematically illustrating the common electrodes and the conductive portion.
Figure 15:
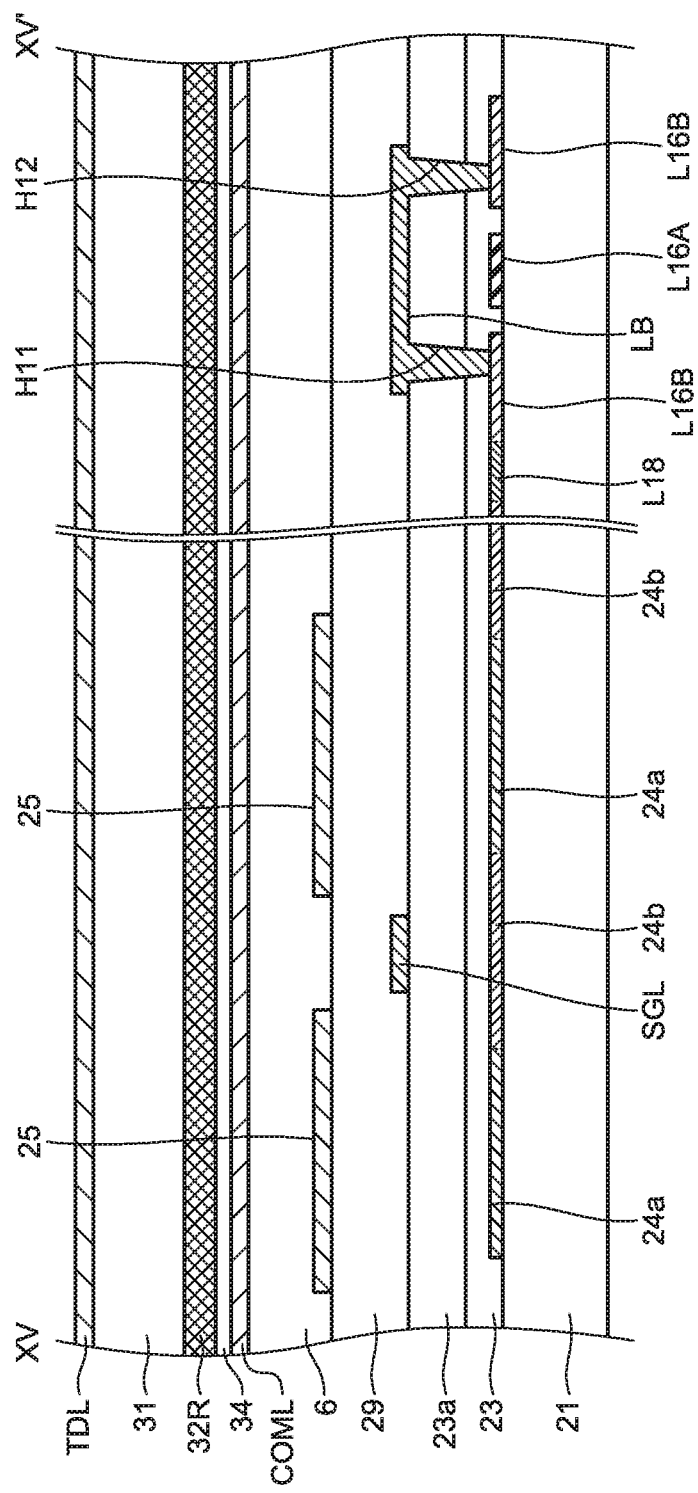
FIG. 15 is a sectional view along line XV-XV' in FIG. 13.

The following describes a coupling configuration between the signal lines SGL and the common electrodes COML. FIG. 12 is a schematic sectional diagram for explaining the coupling configuration between the common electrodes and signal lines. FIG. 13 is a plan view schematically illustrating the first electrodes, the signal lines, and a conductive portion. FIG. 14 is a plan view schematically illustrating the common electrodes and the conductive portion. FIG. 15 is a sectional view along line XV-XV in FIG. 13.

FIG. 12 illustrates a portion for one pixel at the outermost circumference of the display region Ad and the peripheral region Gd adjacent thereto. As illustrated in FIG. 12, in the pixel substrate 2, for example, the switching elements Tr, the pixel electrodes 25, the first electrodes 24, coupling electrodes 72, the insulating layer 23, the planarizing film 29, and the orientation film 28 are provided on the first substrate 21. The orientation film 28 is provided so as to cover the pixel electrodes 25 in the display region Ad. The orientation film 28 is provided in a region not overlapping with a conductive portion 81 in the peripheral region Gd, and overlaps with a part of a conductive layer 71. The switching element Tr includes a gate electrode 64, a source electrode 62, a semiconductor layer 61, and a drain electrode 63. The gate electrode 64 is provided in the same layer as that of the gate lines GCL. A part of each of the gate lines GCL may be used as the gate electrode 64. The source electrode 62 is provided in the same layer as that of the signal lines SGL. A part of each of the signal lines SGL may be used as the source electrode 62.

Each of the pixel electrodes 25 is coupled to the drain electrode 63 through a contact hole provided in the planarizing film 29. Each of the first electrodes 24 is provided in the same layer as that of the gate electrode 64 (gate line GCL). The first electrode 24 is provided so as to overlap with the drain electrode 63 and the pixel electrode 25 in the direction orthogonal to the surface of the first substrate 21.

As illustrated in FIG. 12, in the counter substrate 3, the color filter 32 is provided on one surface of the second substrate 31. A decorative layer 37 is provided in the peripheral region Gd of the second substrate 31. An overcoat layer 34 is provided so as to cover the color filter 32 and the decorative layer 37. The common electrodes COML are provided between the overcoat layer 34 and the liquid crystal layer 6. The second electrodes TDL are provided on the other surface of the second substrate 31. The common electrodes COML are continuously provided from the display region Ad to the peripheral region Gd. Portions of the common electrodes COML provided in the peripheral region Gd serve as coupling portions COMLa. The orientation film 38 is provided so as to cover the common electrodes COML in the display region Ad. The orientation film 38 is provided in the region not overlapping with the conductive portion 81 in the peripheral region Gd, and overlaps with parts of the coupling portions COMLa.

In the peripheral region Gd, the conductive portion 81 is provided between the first substrate 21 and the second substrate 31. The conductive portion 81 is a seal portion that seals between the first substrate 21 and the second substrate 31. The conductive portion 81 includes a plurality of conductive particles 82 dispersed in a sealing material. The conductive portion 81 is provided above the peripheral circuit region 80 with the planarizing film 29 interposed therebetween. FIG. 12 is merely a schematic illustration, and illustrates only one of the conductive particles 82 in the conductive portion 81. The present disclosure is, however, not limited to this illustration. The conductive particles 82 are dispersed in the conductive portion 81, and electrically couple the common electrodes COML to the conductive layer 71.

The conductive layer 71 is coupled to the coupling electrodes 72. The conductive layer 71 is made of a light-transmitting conductive material, such as ITO. The coupling portions COMLa are coupled to the conductive layer 71 through the conductive particles 82 of the conductive portion 81. As illustrated in FIG. 13, the signal lines SGL are electrically coupled to the coupling electrodes 72 through a switching circuit 80A. As a result, the common electrodes COML are electrically coupled to the signal lines SGL. The switching circuit 80A is a switching circuit including, for example, the switches S1, S2, and S5 to S10 illustrated in FIGS. 9 to 11.

A region A51 denotes a region outside the central portion of the conductive portion 81 up to the outer circumference of the second substrate 31. The coupling portions COMLa are preferably provided from the boundary between the display region Ad and the peripheral region Gd up to the region A51. This configuration electrically couples the coupling portions COMLa to the conductive portion 81. A region A52 denotes a region outside end portions TDLa of the second electrodes TDL up to the outer circumference of the second substrate 31, the end portions TDLa being provided in the peripheral region Gd. The coupling portions COMLa are preferably provided up to the region A52. As a result, the coupling portions COMLa are provided between the peripheral circuit region 80 and the second electrodes TDL. This configuration allows the coupling portions COMLa to shield noise from the peripheral circuit region 80.

As illustrated in FIG. 13, the first electrodes 24 include capacitive electrodes 24a and wiring 24b. The capacitive electrodes 24a are provided so as to overlap with the drain electrodes 63 and the pixel electrodes 25, and generate retention capacitance between the capacitive electrodes 24a and both the drain electrodes 63 and the pixel electrodes 25. The wiring 24b couples the capacitive electrodes 24a arranged in the first direction Dx to one another. The configuration described above forms the first electrodes 24 into a long shape having a longitudinal direction in the first direction Dx as a whole. That is, the first electrodes 24 extend in a direction intersecting with the common electrodes COML illustrated in FIG. 14. As illustrated in FIG. 14, the color regions 32R, 32G, and 32B of the color filter 32 are formed to extend in the same direction as that of the common electrodes COML in the plan view.

As illustrated in FIGS. 13 and 14, the coupling electrodes 72 are provided corresponding to the respective common electrodes COML arranged in the first direction Dx. That is, the coupling electrodes 72 are coupled in a one-to-one relation to the common electrodes COML through the conductive portion 81. A plurality of signal lines SGL overlapping with one of the common electrodes COML are coupled to one of the coupling electrodes 72 through the switching circuit 80A.

As illustrated in FIG. 14, the common electrodes COML adjacent to each other are separated by a slit SLC. The width of the slit SLC is larger than the diameter of the conductive particles 82. This configuration electrically isolates the adjacent common electrodes COML from each other. One of the common electrodes COML is selected as the drive electrode block Bk. Common electrodes COML other than that selected as the drive electrode block Bk serve as a non-selected electrode block NBk. The driver IC 19 (refer to FIG. 7) supplies the various drive signals to the drive electrode block Bk.

As illustrated in FIG. 13, a plurality of signal lines SGL overlapping with and opposed to the drive electrode block Bk are electrically coupled to the drive electrode block Bk through the conductive portion 81. As a result, these signal lines SGL function as a signal line block BkSG integrally with the drive electrode block Bk. The signal line block BkSG is supplied with the same signals as the various drive signals supplied to the drive electrode block Bk.

Specifically, during the first sensing period Pem (refer to FIG. 10), for example, a plurality of signal lines SGL overlapping with and opposed to the common electrodes COML2 and COML4 also serve as the transmitting coils CTx. That is, these signal lines SGL are supplied with the first drive signal VTP from the driver IC 19. A plurality of signal lines SGL overlapping with and opposed to the common electrodes COML1, COML3, and COML5 are not supplied with the first drive signal VTP, and are placed in the floating state.

During the second sensing period Pes (refer to FIG. 11), the signal lines SGL overlapping with the drive electrode block Bk are also supplied with the second drive signal TSVcom from the driver IC 19. A plurality of signal lines SGL overlapping with the non-selected electrode block NBk are supplied with the drive signal Vcomdc from the driver IC 19.

In the example illustrated in FIG. 13, first electrodes 24(1), 24(2), 24(5), and 24(6) constitute one receiving coil CRx, and first electrodes 24(3), 24(4), 24(7), and 24(8) constitute another receiving coil CRx. The two receiving coils CRx are arranged so as to partially overlap with each other. This configuration can reduce generation of a region outside the receiving coil CRx, that is, an insensitive region in which the detection sensitivity of the magnetic field is reduced or the magnetic field cannot be detected, in the display region Ad.

Specifically, the left ends of the first electrodes 24(1) and 24(2) are coupled to each other by wiring L19. The left ends of the first electrodes 24(1) and 24(2) are coupled to the wiring L11 through the wiring L19. The right ends of the first electrodes 24(1) and 24(2) are coupled to each other by wiring L18.

The left ends of the first electrodes 24(5) and 24(6) are coupled to each other by wiring L19. The left ends of the first electrodes 24(5) and 24(6) are coupled to the wiring L11 through the switch S11. Alternatively, the left ends of the first electrodes 24(5) and 24(6) are coupled to the first AFE 47A through the switch S12. The right ends of the first electrodes 24(5) and 24(6) are coupled to each other by wiring L18.

The right ends of the first electrodes 24(1) and 24(2) are coupled to the right ends of the first electrodes 24(5) and 24(6) through wiring L16A. As a result, the first electrodes 24(1) and 24(2) are coupled to the first electrodes 24(5) and 24(6) so as to form a loop and constitute one receiving coil CRx.

The first electrodes 24(3) and 24(4) and the first electrodes 24(7) and 24(8) also constitute another receiving coil CRx. The first electrodes 24(3) and 24(4) of the other receiving coil CRx are disposed in a region surrounded by the first electrodes 24(1) and 24(2) and the first electrodes 24(5) and 24(6) of one receiving coil CRx. The first electrodes 24(5) and 24(6) of one receiving coil CRx are disposed in a region surrounded by the first electrodes 24(3) and 24(4) and the first electrodes 24(7) and 24(8) of the other receiving coil CRx. With the above-described configuration, the two receiving coils CRx are arranged so as to partially overlap with each other.

As illustrated in FIGS. 13 and 15, wiring L16B coupled to the right ends of the first electrodes 24(3) and 24(4) and wiring L16B coupled to the right ends of the first electrodes 24(7) and 24(8) are provided so as to interpose the wiring L16A therebetween. In other words, one of the two pieces of wiring L16B is disposed inside the receiving coil CRx including the wiring L16A, and the other thereof is disposed outside the receiving coil CRx including the wiring L16A. A bridge LB is provided so as to intersect with the wiring L16A in the plan view, and couples the two pieces of wiring L16B to each other.

As illustrated in FIG. 15, the bridge LB is provided in a layer different from that of the wiring L16A and the wiring L16B. The bridge LB is coupled to one of the two pieces of wiring L16B through a contact hole H11, and coupled to the other of the two pieces of the wiring L16B through a contact hole H12. This configuration electrically couples the two pieces of wirings L16B to each other, and couples the first electrodes 24(3) and 24(4) to the first electrodes 24(7) and 24(8) so as to form a loop.

As illustrated in FIG. 15, the bridge LB is provided in the same layer as that of the signal lines SGL. This configuration allows the bridge LB to be made using the same material as that of the signal lines SGL, and to be provided in the same process as that of the signal lines SGL. As a result, a process for providing the bridge LB can be eliminated unlike a case of providing the bridge LB in a layer different from that of the signal lines SGL.

Whereas the common electrodes COML in the drive electrode block Bk are made of ITO, the signal lines SGL in the signal line block BkSG are made of a metal. Therefore, the signal lines SGL have a significantly lower resistance than that of the common electrodes COML. As a result, using the signal lines SGL as the drive electrodes can reduce dulling of the first drive signal VTP and the second drive signal TSVcom each having a square wave. This point will be described with reference to FIG. 16.

Figure 16:
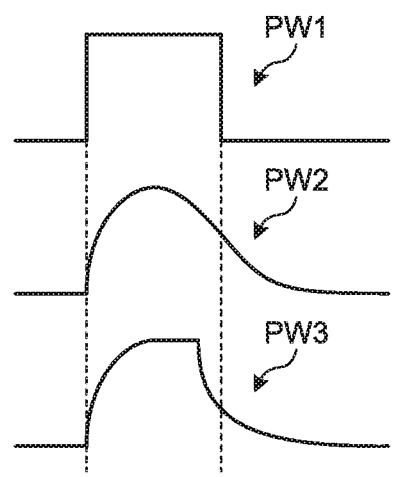
FIG. 16 is an explanatory diagram for explaining a pulse wave applied to drive electrodes.

FIG. 16 is an explanatory diagram for explaining a pulse wave applied to the drive electrodes. Each of a first pulse wave PW1, a second pulse wave PW2, and a third pulse wave PW3 illustrated in FIG. 16 exemplifies one pulse wave of a plurality of pulse waves included in the first drive signal VTP and the second drive signal TSVcom. The first pulse wave PW1 represents an ideal waveform of the pulse wave applied to the drive electrodes. The second pulse wave PW2 represents a waveform when only the common electrodes COML made of ITO are used as the drive electrodes. Since ITO has a high resistance, the waveform of the square wave applied thereto is made duller than that of the first pulse wave PW1. The waveform is made duller particularly when falling.

In contrast, the third pulse wave PW3 represents a waveform when the common electrodes COML made of ITO are combined with the signal lines SGL to be used as the drive electrodes. The signal lines SGL are metallic. Therefore, the signal lines SGL have a significantly lower resistance than that obtained by ITO. As a result, overall response of the drive electrodes is improved, and in particular, the falling of the third pulse wave PW3 is made steeper than that of the second pulse wave PW2. As a result, in this embodiment, responses to the drive signals are improved and the detection sensitivity is improved in both cases of the electromagnetic induction method and the mutual-capacitance method.

The common electrodes COML and the pixel electrodes 25 lie between the signal lines SGL and the second electrodes TDL serving as the detection electrodes. Also in this case, the common electrodes COML are supplied with the same signals as those for the signal lines SGL, and the pixel electrodes 25 are substantially in the floating state. As a result, the common electrodes COML and the pixel electrodes 25 are excited in the same phase as that of the signal lines SGL, and can thus be restrained from hindering the function of the signal lines SGL as the drive electrodes.

Figure 17:
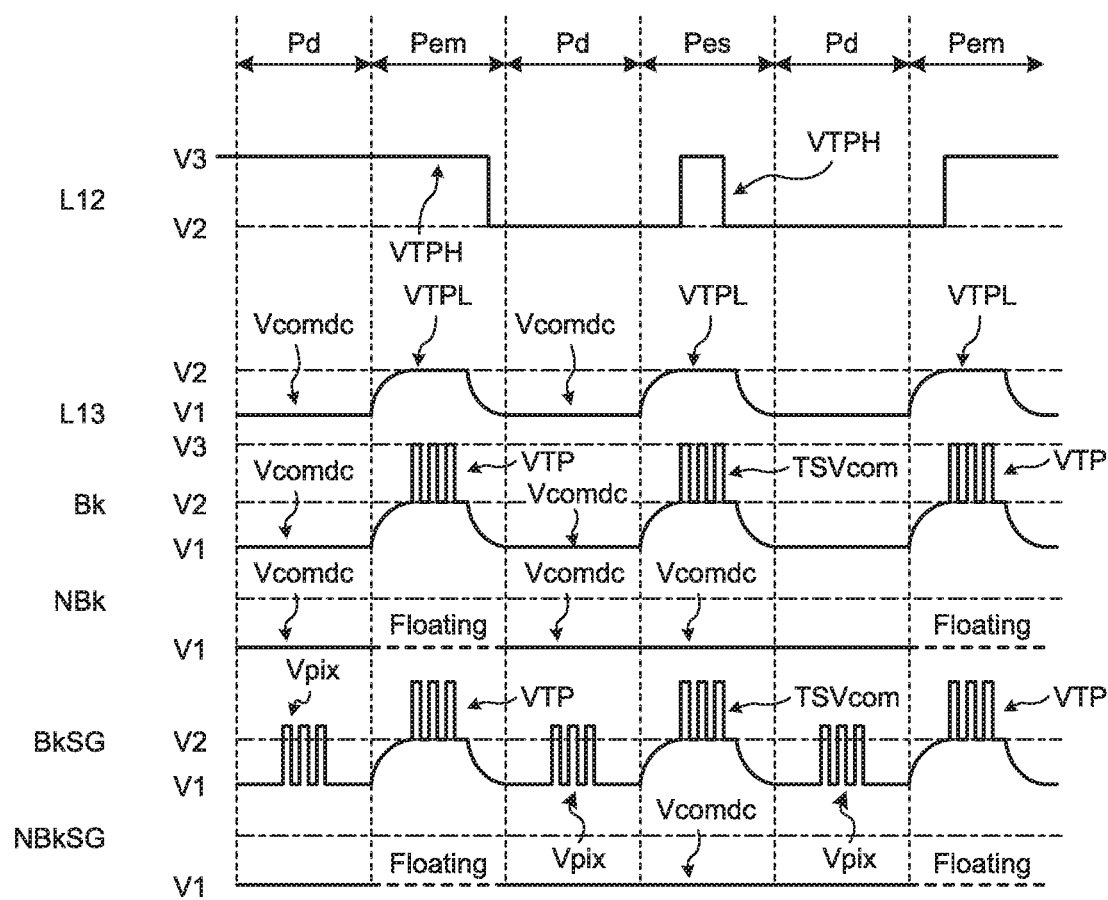
FIG. 17 is a timing waveform diagram illustrating an operation example of the display device according to the first embodiment.

FIG. 17 is a timing waveform diagram illustrating an operation example of the display device according to the first embodiment. The display device 1 performs the touch detection operation (detection period) and the display operation (display period) in a time-division manner. The touch detection operation and the display operation may be divided in any way. The following describes, for example, a method in which the touch detection and the display are performed in a time-division manner in one frame period of the display panel 10, that is, in a time required for displaying video information for one screen.

As illustrated in FIG. 17, the display periods Pd and the first and second sensing periods Pem and Pes are alternately arranged.

The above-described display operation is performed during the display period Pd. As illustrated in FIG. 9, all the common electrodes COML are selected as the drive electrode block Bk. The driver IC 19 supplies the drive signal Vcomdc to the drive electrode block Bk through the wiring L11. During the same period, the pixel signals Vpix are supplied to the signal line block BkSG (signal lines SGL) opposed to the drive electrode block Bk.

During the first sensing period Pem, the driver IC 19 alternately supplies the first voltage VTPH and the second voltage VTPL to both ends of the transmitting coil CTx, as illustrated in FIG. 10. This operation supplies the first drive signal VTP to the drive electrode block Bk constituting the transmitting coil CTx. The same first drive signal VTP is also supplied to the signal line block BkSG overlapping with and opposed to the drive electrode block Bk during the same period. The non-selected electrode block NBk and a non-selected signal line block NBkSG are not supplied with the first drive signal VTP, and are placed in the floating state.

As described above, during the first sensing period Pem, the common electrodes COML provided on the second substrate 31 (refer to FIGS. 5 and 12) and the signal lines SGL provided on the first substrate 21 are simultaneously driven. As a result, the strength of the magnetic field M1 can be increased.

As illustrated in FIG. 17, the first voltage VTPH is a voltage signal having a potential V3. The second voltage VTPL is a voltage signal having a potential V2 lower than the potential V3. The drive signal Vcomdc is a voltage signal having a potential V1 lower than the potential V2.

During the second sensing period Pes, the driver IC 19 supplies the second drive signal TSVcom to the drive electrode block Bk, as illustrated in FIG. 11. The same second drive signal TSVcom is also supplied to the signal line block BkSG overlapping with and opposed to the drive electrode block Bk during the same period. The non-selected electrode block NBk and the non-selected signal line block NBkSG are supplied with the drive signal Vcomdc. The non-selected electrode block NBk and the non-selected signal line block NBkSG only need to have a fixed potential, and, for example, may be supplied with the second voltage VTPL.

The timing waveform diagram illustrated in FIG. 17 is merely an example, and can be changed as appropriate. For example, the order of the display period Pd, the first sensing period Pem, and the second sensing period Pes can be changed as appropriate. One frame period may be provided with only either one of the first sensing period Pem and the second sensing period Pes. The lengths of the display period Pd, the first sensing period Pem, and the second sensing period Pes may differ from one another.

Second Embodiment

Figure 18:
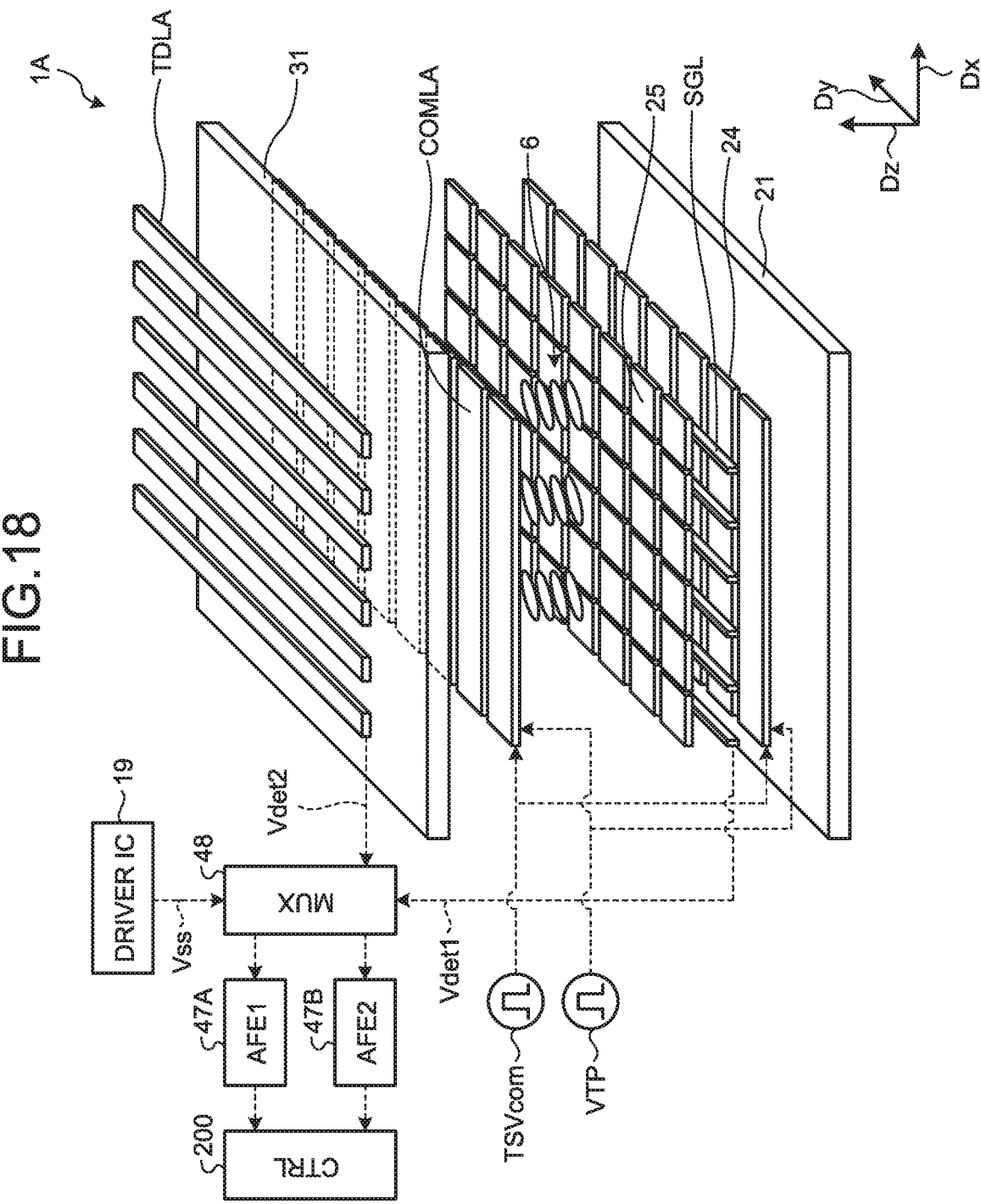
FIG. 18 is an exploded perspective view of a display device according to a second embodiment of the present disclosure.

FIG. 18 is an exploded perspective view of a display device according to a second embodiment of the present disclosure. As illustrated in FIG. 18, in a display device 1A of this embodiment, common electrodes COMLA extend in the first direction Dx, and are arranged in the second direction Dy. Second electrodes TDLA extend in the second direction Dy, and are arranged in the first direction Dx. That is, the second electrodes TDLA intersect with the common electrodes COMLA in the plan view. Both the common electrodes COMLA and the second electrodes TDLA are formed into strips. Also in this embodiment, the electrostatic capacitance is generated at intersecting portions between the common electrodes COMLA and the second electrodes TDLA, and at the peripheries thereof.

The first electrodes 24 extend in the first direction Dx, and are arranged in the second direction Dy. The first electrodes 24 are provided so as to intersect with the second electrodes TDLA in the plan view, and extend in the same direction as that of the common electrodes COMLA. The signal lines SGL extend in the second direction Dy, and are arranged from one side to the other side of the first substrate 21, those sides extending along the second direction Dy. The signal lines SGL intersect with the first electrodes 24 and the common electrodes COMLA in the plan view, and have a longitudinal direction in the same direction as that of the second electrodes TDLA.

When the electromagnetic induction touch detection is performed, the driver IC 19 supplies the first drive signal VTP to the common electrodes COMLA and the first electrodes 24. That is, in addition to the common electrodes COMLA, the first electrodes 24 also serve as the transmitting coils CTx in the electromagnetic induction method. As a result, the common electrodes COMLA and the first electrodes 24 generate the electromagnetic induction. The signal lines SGL form the receiving coils CRx (refer to FIG. 3).

When the mutual-capacitive touch detection is performed, the driver IC 19 supplies the second drive signal TSVcom to the common electrodes COMLA and the first electrodes 24 in a time-division manner. As a result, in addition to the common electrodes COMLA, the first electrodes 24 also serve as the drive electrodes in the mutual-capacitive touch detection. The second detection signal Vdet2 generated corresponding to a change in electrostatic capacitance between both the common electrode COMLA and the first electrode 24 and the second electrode TDLA is supplied to the second AFE 47B through the multiplexer 48.

In this embodiment, in the electromagnetic induction method and the mutual-capacitance method, the common electrodes COMLA and the first electrodes 24 are simultaneously driven. The first electrodes 24 are metallic, and have a large area including the capacitive electrodes 24a for generating the retention capacitance of the pixels Pix (sub-pixels SPix). Therefore, the first electrodes 24 have a significantly lower resistance than that obtained by ITO. As a result, the responses to the first drive signal VTP and the second drive signal TSVcom are improved in the same manner as in the first embodiment.

Figure 19:
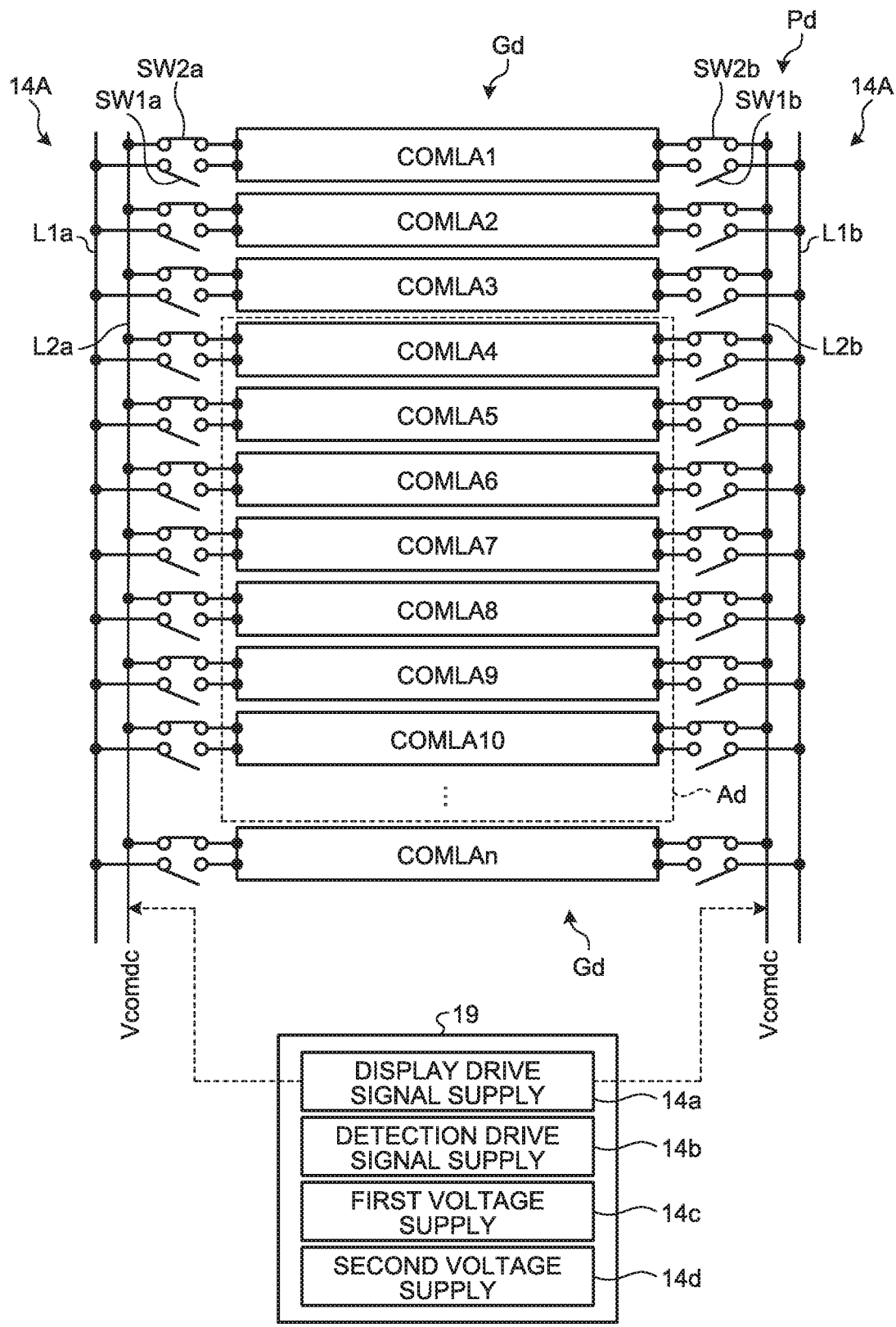
FIG. 19 is a circuit diagram for explaining a coupling configuration of common electrodes during the display period according to the second embodiment.
Figure 20:
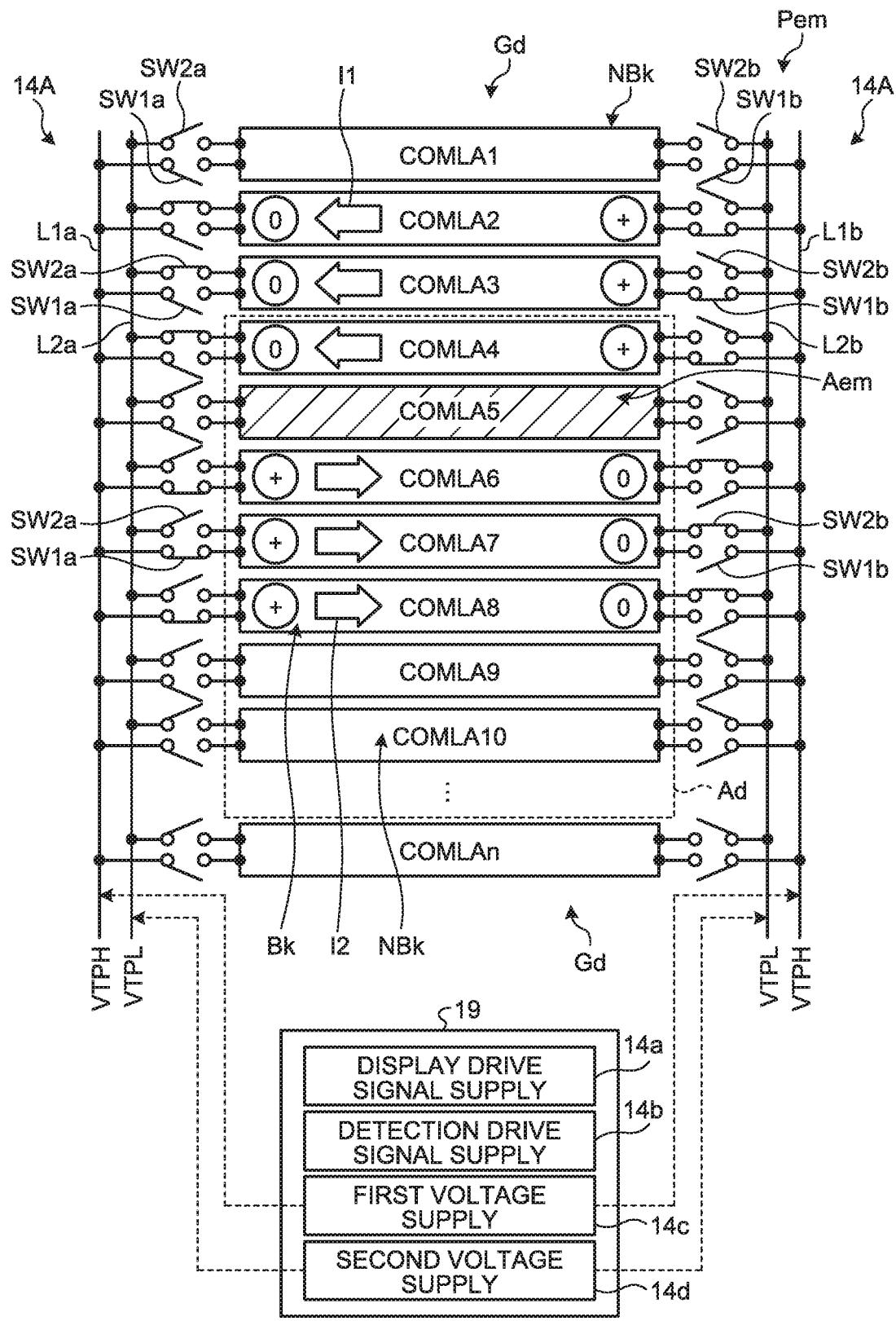
FIG. 20 is a circuit diagram illustrating a coupling configuration of the common electrodes during the first sensing period according to the second embodiment.
Figure 21:
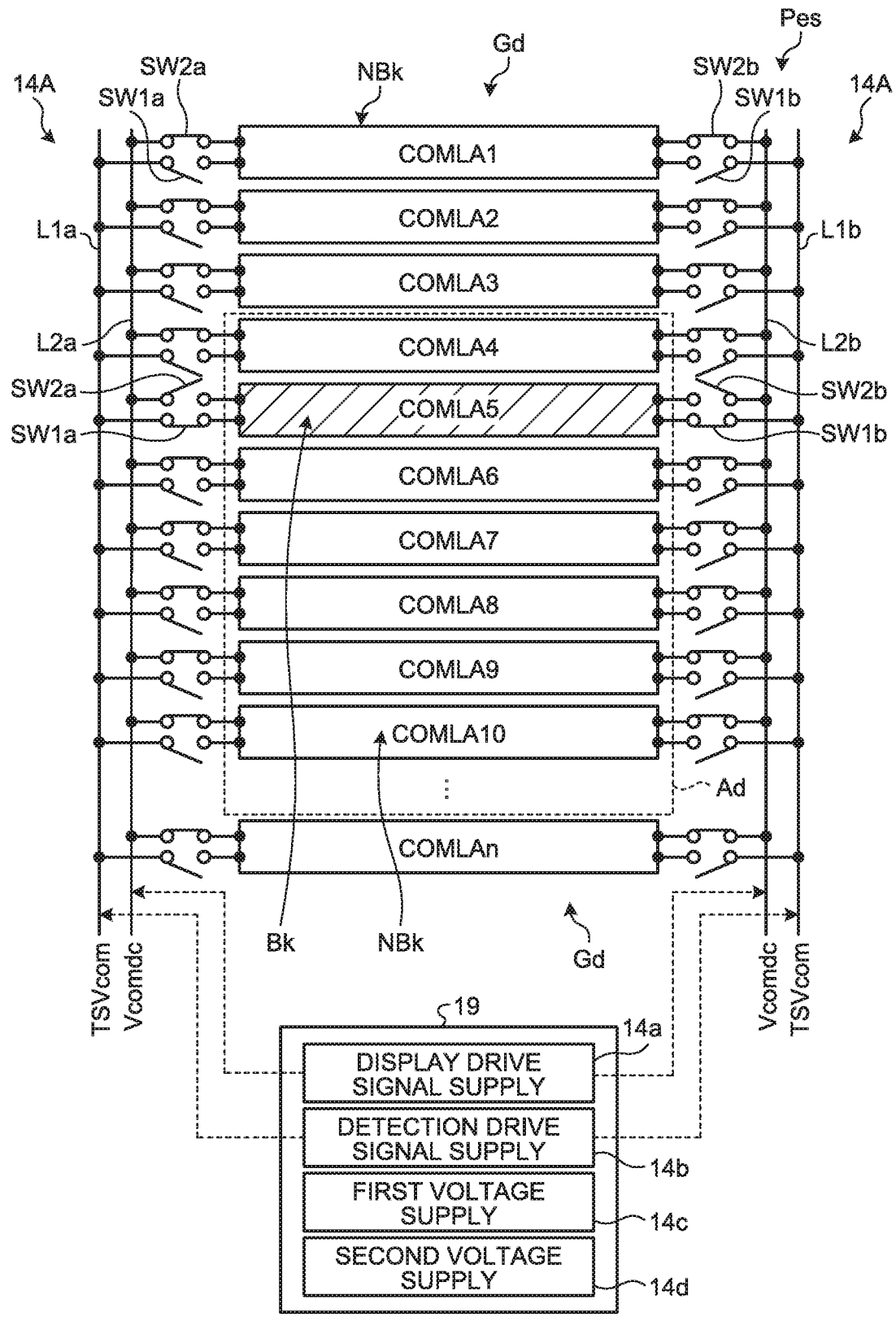
FIG. 21 is a circuit diagram illustrating a coupling configuration of the common electrodes during the second sensing period according to the second embodiment.

The following describes coupling configurations of the common electrodes COMLA in the display device 1A of this embodiment. FIG. 19 is a circuit diagram for explaining a coupling configuration of the common electrodes during the display period according to the second embodiment. FIG. 20 is a circuit diagram illustrating a coupling configuration of the common electrodes during the first sensing period according to the second embodiment. FIG. 21 is a circuit diagram illustrating a coupling configuration of the common electrodes during the second sensing period according to the second embodiment.

As illustrated in FIGS. 19 to 21, a plurality of common electrodes COMLA1, COMLA2, . . . , COMLAn are arranged. In the following description, the common electrodes COMLA1, COMLA2, . . . , COMLAn will each be referred to as a common electrode COMLA when they need not be distinguished from one another.

The common electrode scanner 14A includes first wiring L1a and L1b, second wiring L2a and L2b, and switches SW1a, SW1b, SW2a, and SW2b. The common electrode scanner 14A is provided on both one end side and the other end side of the common electrodes COMLA. In the following description, one end of the common electrode COMLA is referred to as the left end, and the other end thereof is referred to as the right end, with reference to FIGS. 19 to 21. The first wiring L1a and the second wiring L2a are provided on the left ends of the common electrodes COMLA, and the first wiring L1b and the second wiring L2b are provided on the right ends of the common electrodes COMLA.

The switch SW1a is provided between the left end of the common electrode COMLA and the first wiring L1a. The switch SW2a is provided between the left end of the common electrode COMLA and the second wiring L2a. The switch SW1a and the switch SW2a are coupled in parallel to the left end of each of the common electrodes COMLA. The switch SW1b is provided between the right end of the common electrode COMLA and the first wiring L1b. The switch SW2b is provided between the right end of the common electrode COMLA and the second wiring L2b. The switch SW1b and the switch SW2b are coupled in parallel to the right end of each of the common electrodes COMLA.

As illustrated in FIGS. 19 to 21, the driver IC 19 supplies various signals to the common electrodes COMLA through the first wiring L1a and L1b and the second wiring L2a and L2b. The driver circuit 14 (refer to FIG. 1) includes a display drive signal supply 14a, a detection drive signal supply 14b, a first voltage supply 14c, and a second voltage supply 14d. These supplies are incorporated in the driver IC 19.

The display drive signal supply 14a supplies the drive signal Vcomdc for display to the common electrodes COMLA and the first electrodes 24 (refer to FIG. 18) through the second wiring L2a and L2b. The detection drive signal supply 14b supplies the second drive signal TSVcom for detection to the common electrodes COMLA and the first electrodes 24 through the first wiring L1a and L1b. The first voltage supply 14c supplies the first voltage VTPH of a direct current having a first potential to the common electrodes COMLA and the first electrodes 24 through the first wiring L1a and L1b. The second voltage supply 14d supplies the second voltage VTPL of a direct current having a second potential lower than the first potential to the common electrodes COMLA and the first electrodes 24 through the second wiring L2a and L2b.

As illustrated in FIG. 19, during a display period Pd, all the switches SW1a and SW1b are turned off, and all the switches SW2a and SW2b are turned on, in response to a control signal from the controller 11. As a result, all the common electrodes COMLA are uncoupled from the first wiring L1a and L1b; the second wiring L2a is coupled to the left ends of all the common electrodes COMLA; and the second wiring L2b is coupled to the right ends of all the common electrodes COMLA.

As a result, during the display period Pd, the display drive signal supply 14a supplies the drive signal Vcomdc for display to all the common electrodes COMLA and the first electrodes 24 (refer to FIG. 18) through the second wiring L2a and L2b. The display drive signal supply 14a is not limited to this operation, and may supply the drive signal Vcomdc in a time-division manner to a common electrode COML overlapping one horizontal line serving as a target of the display driving.

As illustrated in FIG. 20, during a first sensing period Pem, the switches SW1a and SW1b and the switches SW2a and SW2b operate in response to the control signal from the controller 11, and the drive electrode block Bk is selected. Specifically, the common electrodes COMLA2, COMLA3, COMLA4, COMLA6, COMLA7, and COMLA8 are selected as the drive electrode block Bk. The other common electrodes COMLA serve as a non-selected electrode block NBk. A region between the common electrode COMLA4 and the common electrode COMLA6 is a detection region Aem that detects the detection target body.

The switches SW1a and SW1b and the switches SW2a and SW2b for the common electrodes COMLA in the non-selected electrode block NBk are turned off in response to the control signal from the controller 11. This operation brings the common electrodes COMLA in the non-selected electrode block NBk into a floating state.

On the left side of the common electrodes COMLA2, COMLA3, and COMLA4, the switches SW are turned off, and the switches SW2a are turned on. As a result, the left ends of the common electrodes COMLA2, COMLA3, and COMLA4 are electrically coupled to the second wiring L2a. On the right side of the common electrodes COMLA2, COMLA3, and COMLA4, the switches SW1b are turned on, and the switches SW2b are turned off. As a result, the right ends of the common electrodes COMLA2, COMLA3, and COMLA4 are electrically coupled to the first wiring L1b.

On the left side of the common electrodes COMLA6, COMLA7, and COMLA8, the switches SW1a are turned on, and the switches SW2a are turned off. As a result, the left ends of the common electrodes COMLA6, COMLA7, and COMLA8 are electrically coupled to the first wiring L1a. On the right side of the common electrodes COMLA6, COMLA7, and COMLA8, the switches SW1b are turned off, and the switches SW2b are turned on. As a result, the right ends of the common electrodes COMLA6, COMLA7, and COMLA8 are electrically coupled to the second wiring L2b.

As a result, during the first sensing period Pem, in response to the control signal from the controller 11, the first voltage supply 14c is coupled to the left end of at least one common electrode (common electrodes COMLA6, COMLA7, and COMLA8), and the second voltage supply 14d is coupled to the right end thereof. In addition, the second voltage supply 14d is coupled to the left end of at least one of the other common electrodes (common electrodes COMLA2, COMLA3, and COMLA4), and the first voltage supply 14c is coupled to the right end thereof.

The second voltage supply 14d supplies the second voltage VTPL to the left ends of the common electrodes COMLA2, COMLA3, and COMLA4 through the second wiring L2a. The first voltage supply 14c supplies the first voltage VTPH to the right ends of the common electrodes COMLA2, COMLA3, and COMLA4 through the first wiring L1b. As a result, potential differences between the left ends and the right ends of the common electrodes COMLA2, COMLA3, and COMLA4 are generated, and currents I1 thus flow in a direction from the right ends toward the left ends thereof.

The first voltage supply 14c supplies the first voltage VTPH to the left ends of the common electrodes COMLA6, COMLA7, and COMLA8 through the first wiring L1a. The second voltage supply 14d supplies the second voltage VTPL to the right ends of the common electrodes COMLA6, COMLA7, and COMLA8 through the second wiring L2b. As a result, potential differences between the left ends and the right ends of the common electrodes COMLA6, COMLA7, and COMLA8 are generated, and currents I2 thus flow in a direction from the left ends toward the right ends thereof.

In this manner, the first voltage VTPH and the second voltage VTPL supplied to both ends of the common electrodes COMLA are changed over to each other by switching the operations of the switches SW1a, SW2a, SW1b, and SW2b. As a result, the first drive signal VTP is supplied to the common electrodes COMLA. The currents I1 and I2 generate magnetic fields.

The currents I1 and the currents I2 flow in directions opposite to each other. As a result, the magnetic field generated by the currents I1 overlaps with the magnetic field generated by the currents I2 in the detection region Aem. This configuration can increase the strength of the magnetic field passing through the detection region Aem. The magnetic fields generated by the currents I1 and the currents I2 correspond to the magnetic field M1 generated during the magnetic field generation period of the electromagnetic induction method illustrated in FIG. 3. The common electrodes COMLA2, COMLA3, COMLA4, COMLA6, COMLA7, and COMLA8 included in the drive electrode block Bk correspond to the transmitting coils CTx.

The controller 11 sequentially selects the common electrodes COMLA1 to COMLAn. As a result, the touch detection is performed over the entire display region Ad using the electromagnetic induction method. As illustrated in FIG. 20, the common electrodes COMLA1, COMLA2, COMLA3, and COMLAn are also provided in the peripheral region Gd. This configuration can also generate magnetic fields in the peripheral portion of the display region Ad. In this case, the common electrodes COMLA1, COMLA2, COMLA3, and COMLAn are provided in positions not overlapping with the detection region Aem.

In FIG. 20, a transmitting coil CTx is formed by six of the common electrodes COMLA. However, the transmitting coil CTx is not limited to this example, but may be formed by one or two of the common electrodes COMLA disposed on one side of the detection region Aem and one or two of the common electrodes COMLA disposed on the other side of the detection region Aem. The transmitting coil CTx may be formed by four or more of the common electrodes COMLA disposed on one side of the detection region Aem and four or more of the common electrodes COMLA disposed on the other side of the detection region Aem. The numbers of the common electrodes COMLA on both sides of the detection region Aem need not be the same as each other. A configuration can be employed in which the number of the common electrodes COMLA on one side differs from that of the common electrodes COMLA on the other side.

As illustrated in FIG. 21, during a second sensing period Pes in which the mutual-capacitive touch detection is performed, the switches SW1a and SW1b coupled to both ends of the common electrodes COMLA in the drive electrode block Bk are turned on in response to the control signal from the controller 11. In addition, the switches SW2a and SW2b are turned off. As a result, the drive electrode block Bk is selected. For the non-selected electrode block NBk, the switches SW2a and SW2b coupled to both ends of the common electrodes COMLA are turned on, and the switches SW1a and SW1b are turned off.

The detection drive signal supply 14b supplies the second drive signal TSVcom serving as an alternating-current voltage signal to the common electrodes COMLA in the drive electrode block Bk through the first wiring L1a and L1b. The display drive signal supply 14a supplies the drive signal Vcomdc serving as a direct-current voltage signal to the common electrodes COMLA in the non-selected electrode block NBk through the second wiring L2a and L2b. The second electrodes TDLA (refer to FIG. 18) supply the second detection signal Vdet2 corresponding to a change in capacitance between the second electrodes TDLA and the drive electrode block Bk to the second AFE, 47B. The controller 11 sequentially selects the common electrodes COMLA provided in the display region Ad. A configuration can also be employed in which the second voltage supply 14d supplies the second voltage VTPL serving as a direct-current voltage signal to the non-selected electrode block NBk during the second sensing period Pes.

Figure 22:
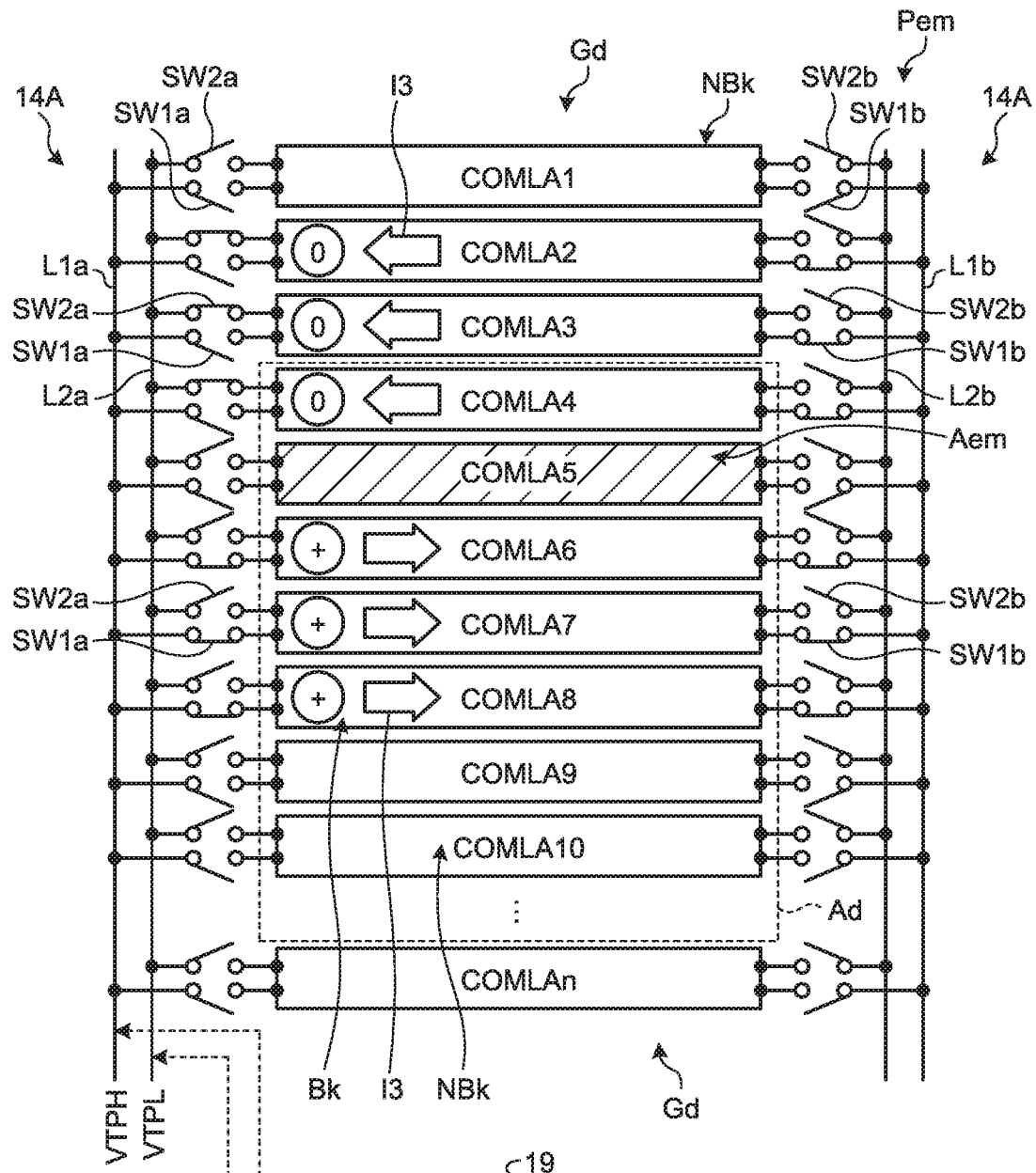
FIG. 22 is a circuit diagram illustrating another example of the coupling configuration of the common electrodes during the first sensing period according to the second embodiment.

FIG. 22 is a circuit diagram illustrating another example of the coupling configuration of the common electrodes during the first sensing period. As illustrated in FIG. 22, on the right side of the common electrodes COMLA6, COMLA7, and COMLA8, the switches SW1b are turned on, and the switches SW2b are turned off. The operations of the switches SW1a and the switches SW2a on the left side of the common electrodes COMLA6, COMLA7, and COMLA8, and the switches SW1a, SW1b, SW2a, and SW2b coupled to the common electrodes COMLA2, COMLA3, and COMLA4 are the same as those in the example illustrated in FIG. 20.

The supplies 14a to 14d of the driver IC 19 do not supply the various signals to the first wiring L1b and the second wiring L2b disposed on the right side of the common electrodes COMLA.

With the configuration described above, the right ends of the common electrodes COMLA2, COMLA3, and COMLA4 are electrically coupled to the right ends of the common electrodes COMLA6, COMLA7, and COMLA8 through the switches SW1b and the first wiring L1b. That is, the common electrodes COMLA2, COMLA3, and COMLA4, the first wiring L1b, and the common electrodes COMLA6, COMLA7, and COMLA8 are coupled together so as to form a loop surrounding the detection region Aem.

The first voltage supply 14c supplies the first voltage VTPH to the left ends of the common electrodes COMLA6, COMLA7, and COMLA8 through the first wiring L1a. The second voltage supply 14d supplies the second voltage VTPL to the left ends of the common electrodes COMLA2, COMLA3, and COMLA4 through the second wiring L2a. As a result, currents I3 flow from the left ends of the common electrodes COMLA6, COMLA7, and COMLA8 to the left ends of the common electrodes COMLA2, COMLA3, and COMLA4 through the first wiring L1b. The currents I3 generate a magnetic field passing through the detection region Aem.

As described above, the switches SW1b are provided that couple together the ends on the same side of a pair of groups of the common electrodes (the common electrodes COMLA2, COMLA3, and COMLA4 and the common electrodes COMLA6, COMLA7, and COMLA8) among the common electrodes COMLA. During the first sensing period Pem, the controller 11 couples together a pair of groups of the common electrodes COMLA by operating the switches SW1b and SW2b. During a period different from the first sensing period Pem, that is, for example, during the display period Pd, the controller 11 brings the pair of groups of the common electrodes COMLA into an uncoupled state by operating the switches SW1b and SW2b.

Also with the configuration described above, the common electrodes COMLA constitute the transmitting coil CTx during the first sensing period Pem. The direction of the currents I3 flowing in the common electrodes COMLA2, COMLA3, and COMLA4 is opposite to the direction of the currents I3 flowing in the common electrodes COMLA6, COMLA7, and COMLA8. This configuration can increase the strength of the magnetic field passing through the detection region Aem. Accordingly, the detection sensitivity of the electromagnetic induction method can be increased.

Figure 23:
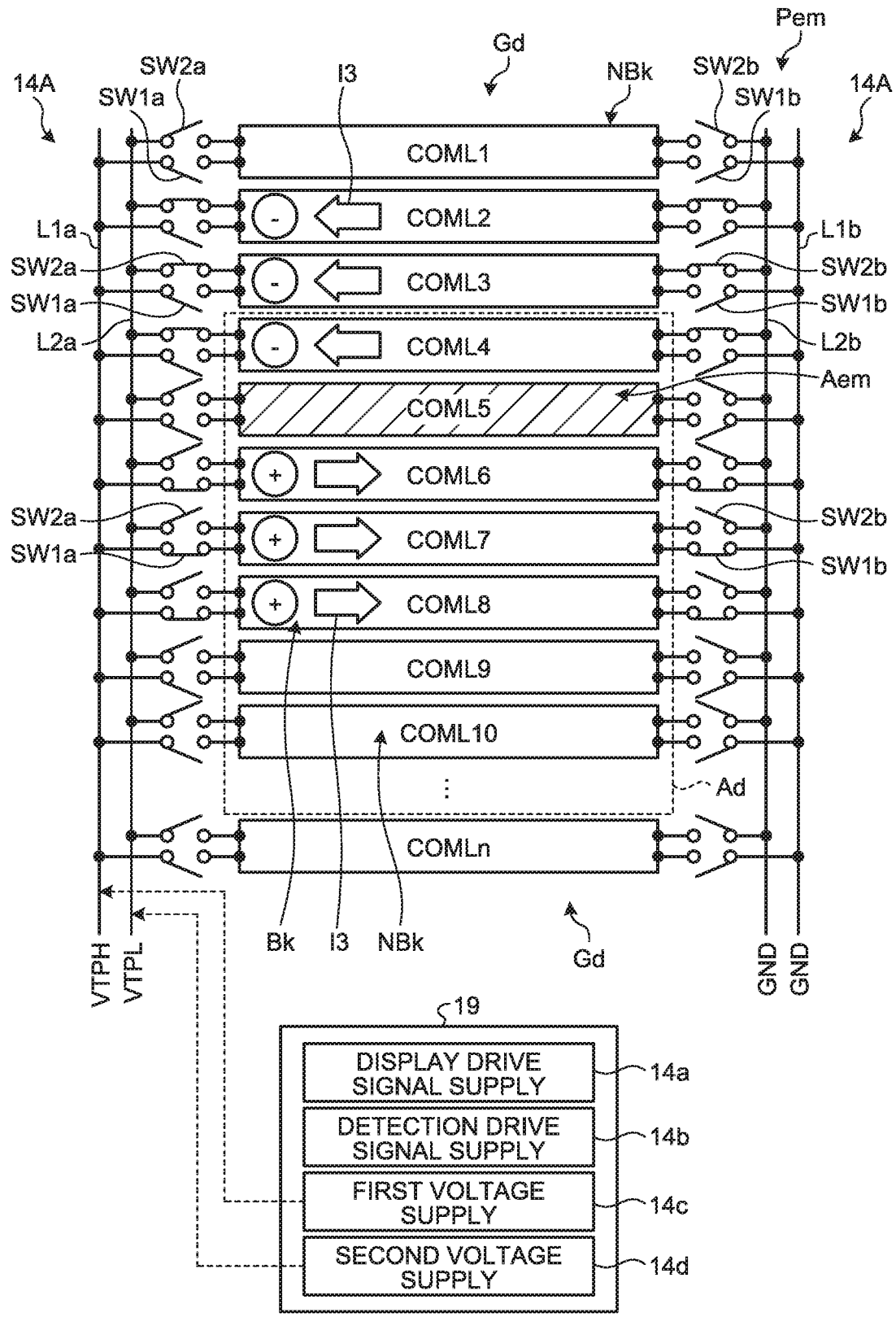
FIG. 23 is a circuit diagram illustrating still another example of the coupling configuration of the common electrodes during the first sensing period according to the second embodiment.

FIG. 23 is a circuit diagram illustrating still another example of the coupling configuration of the common electrodes during the first sensing period according to the second embodiment. In this example, on the right side of the common electrodes COML, the first wiring L1b and the second wiring L2b are supplied with the ground potential GND. The right ends of the common electrodes COML2, COML3, and COML4 are coupled to the second wiring L2b through the switches SW2b. The operations of the switches on the left side of the common electrodes COML2, COML3, and COML4 and the common electrodes COML6, COML7, and COML8 are the same as those of the example illustrated in FIG. 22.

The first voltage supply 14c supplies the first voltage VTPH to the left ends of the common electrodes COML6, COML7, and COML8 through the first wiring L1a. A potential difference between the first voltage VTPH and the ground potential GND causes the currents I3 to flow from the left ends toward the right ends of the common electrodes COML6, COML7, and COML8. The second voltage supply 14d supplies the second voltage VTPL to the left ends of the common electrodes COML2, COML3, and COML4 through the second wiring L2a. A potential difference between the second voltage VTPL and the ground potential GND causes the currents I3 to flow from the right ends toward the left ends of the common electrodes COML2, COML3, and COML4. The currents I3 generate a magnetic field passing through the detection region Aem. Also with the configuration described above, the common electrodes COML constitute the transmitting coil CTx during the first sensing period Pem.

Figure 24:
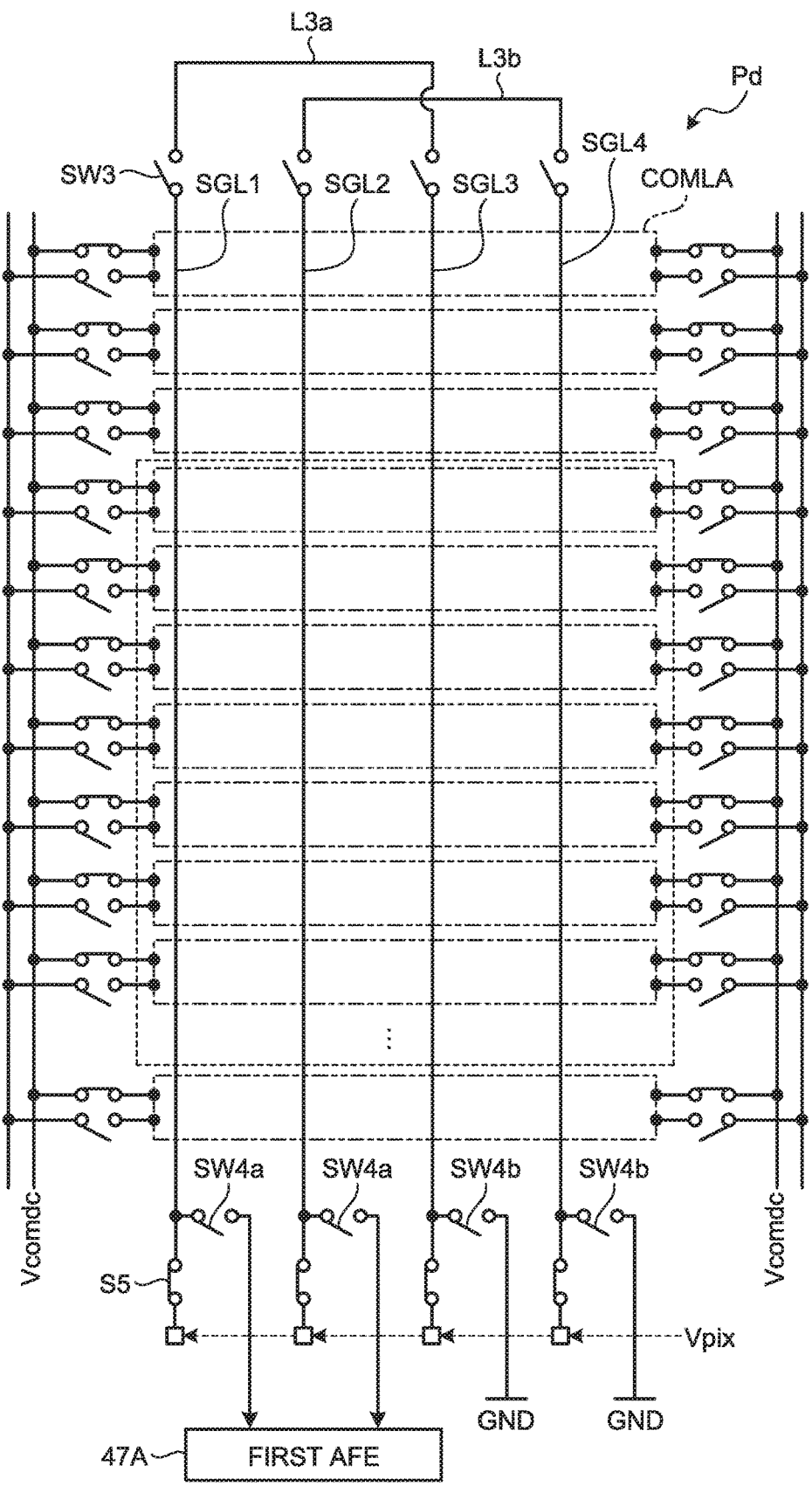
FIG. 24 is a circuit diagram for explaining a coupling configuration of the signal lines during the display period according to the second embodiment.
Figure 25:
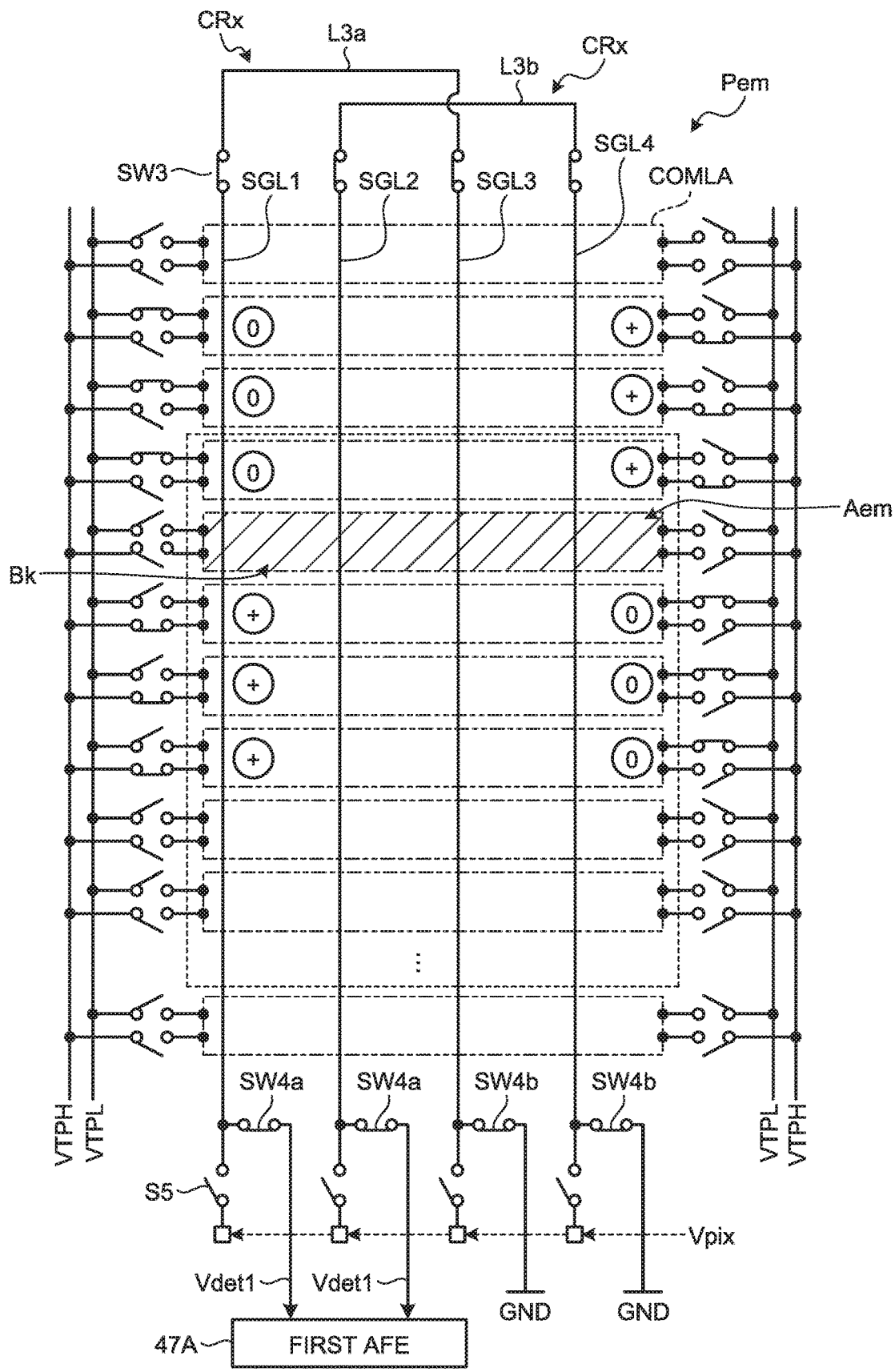
FIG. 25 is a circuit diagram illustrating a coupling configuration of the signal lines during the first sensing period according to the second embodiment.
Figure 26:
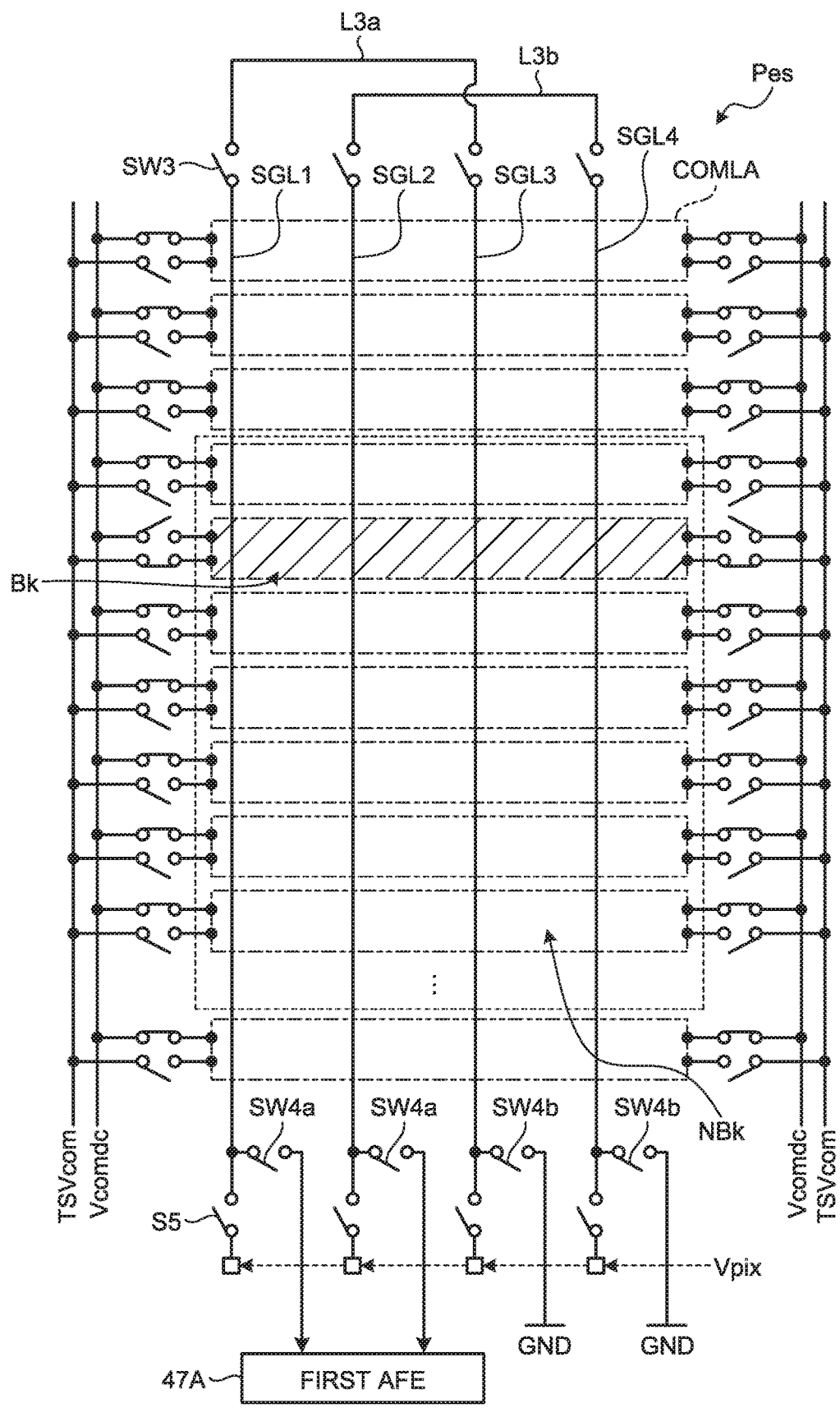
FIG. 26 is a circuit diagram illustrating a coupling configuration of the signal lines during the second sensing period according to the second embodiment.

The following describes coupling configurations of the signal lines SGL in the display device 1A of this embodiment. FIG. 24 is a circuit diagram for explaining a coupling configuration of the signal lines during the display period according to the second embodiment. FIG. 25 is a circuit diagram illustrating a coupling configuration of the signal lines during the first sensing period according to the second embodiment. FIG. 26 is a circuit diagram illustrating a coupling configuration of the signal lines during the second sensing period according to the second embodiment.

FIGS. 24 to 26 illustrate four signal lines SGL1, SGL2, SGL3, and SGL4 among the signal lines SGL. In the following description, the signal lines SGL1, SGL2, SGL3, and SGL4 will each be referred to as the signal line SGL when they need not be distinguished from one another. In FIGS. 24 to 26, the common electrodes COMLA are each indicated by a long dashed double-short dashed line.

As illustrated in FIGS. 24 to 26, the signal lines SGL are provided so as to intersect with the common electrodes COMLA in the plan view. The upper end sides of the signal lines SGL1, SGL2, SGL3, and SGL4 are provided with switches SW3 and wiring L3a and L3b. Two of the switches SW3 and the wiring L3a couple the upper ends of a pair of the signal lines SGL1 and SGL3 to each other. The other two of the switches SW3 and the wiring L3b couple the upper ends of a pair of the signal lines SGL2 and SGL4 to each other. The lower end sides of the signal lines SGL1, SGL2, SGL3, and SGL4 are coupled to switches SW4a, SW4b, and S5.

As illustrated in FIG. 24, during the display period Pd, the switches SW3 are turned off in response to the control signal from the controller 11. As a result, the upper ends of the signal lines SGL1, SGL2, SGL3, and SGL4 are uncoupled from one another. The switches SW4a and SW4b are turned off, and the switches S5 are turned on. As a result, the lower ends of the signal lines SGL1, SGL2, SGL3, and SGL4 are uncoupled from the first AFE 47A and the ground potential GND. The pixel signal Vpix is supplied to the signal lines SGL through the switches S5.

As illustrated in FIG. 25, during the first sensing period Pem, the switches SW3 are turned on in response to the control signal from the controller 11. As a result, the upper ends of the pair of the signal lines SGL1 and SGL3 are coupled to each other through the wiring L3a. The upper ends of the pair of the signal lines SGL2 and SGL4 are coupled to each other through the wiring L3b. The switches S5 are turned off, and the switches SW4a and SW4b are turned on. As a result, each of the lower ends of the signal lines SGL1 and SGL2 is coupled to the first AFE 47A. Each of the lower ends of the signal lines SGL3 and SGL4 is coupled to the ground potential GND.

With the above-described configuration, the signal lines SGL1 and SGL3 are coupled together so as to form a loop, and are provided as a receiving coil CRx. In addition, the signal lines SGL2 and SGL4 are coupled together so as to form a loop, and are formed as another receiving coil CRx. The receiving coils CRx are provided so as to overlap with the detection region Aem provided by the common electrodes COMLA.

When the magnetic field M2 from the touch pen 100 (refer to FIG. 4) passes through a region surrounded by the pair of the signal lines SGL1 and SGL3 and the wiring L3a or a region surrounded by the pair of the signal lines SGL2 and SGL4 and the wiring L3b, an electromotive force corresponding to a variation in the magnetic field M2 is generated in a corresponding one of the receiving coils CRx. The first detection signal Vdet1 corresponding to the electromotive force is supplied to the first AFE 47A. Thus, the touch pen 100 can be detected.

Also in this embodiment, the adjacent receiving coils CRx are arranged so as to partially overlap with each other. Specifically, the region surrounded by the pair of the signal lines SGL1 and SGL3 and the wiring L3a constituting one of the receiving coils CRx contains the signal line SGL2 of the other of the receiving coils CRx. In addition, the region surrounded by the pair of the signal lines SGL2 and SGL4 and the wiring L3b constituting the other of the receiving coils CRx contains the signal line SGL3 of one of the receiving coils CRx. This configuration can reduce the generation of the region in which the detection sensitivity of the magnetic field is reduced, or the insensitive region in which the magnetic field cannot be detected, in the display region Ad.

As illustrated in FIG. 26, during the second sensing period Pes, the switches SW3, SW4a, SW4b, and S5 are turned off. As a result, the signal lines SGL1, SGL2, SGL3, and SGL4 are uncoupled from one another. These signal lines SGL are not supplied with the second drive signal TSVcom and the second voltage VTPL, and are placed in the floating state. As a result, parasitic capacitance between the signal lines SGL and the common electrodes COMLA can be reduced.

As described above, in this embodiment, the switches SW3 are provided that couple together the ends on the same side of a pair of the signal lines SGL (such as the signal lines SGL1 and SGL3) among the signal lines SGL. The controller 11 couples together a pair of the signal lines SGL by operating the switches SW3 during the first sensing period Pem, and brings the pair of the signal lines SGL into the uncoupled state by operating the switches SW3 during the periods (display period Pd and second sensing period Pes) different from the first sensing period Pem. In this manner, the signal lines SGL are formed as the receiving coils CRx, and generate the electromotive force based on the electromagnetic induction.

Figure 27:
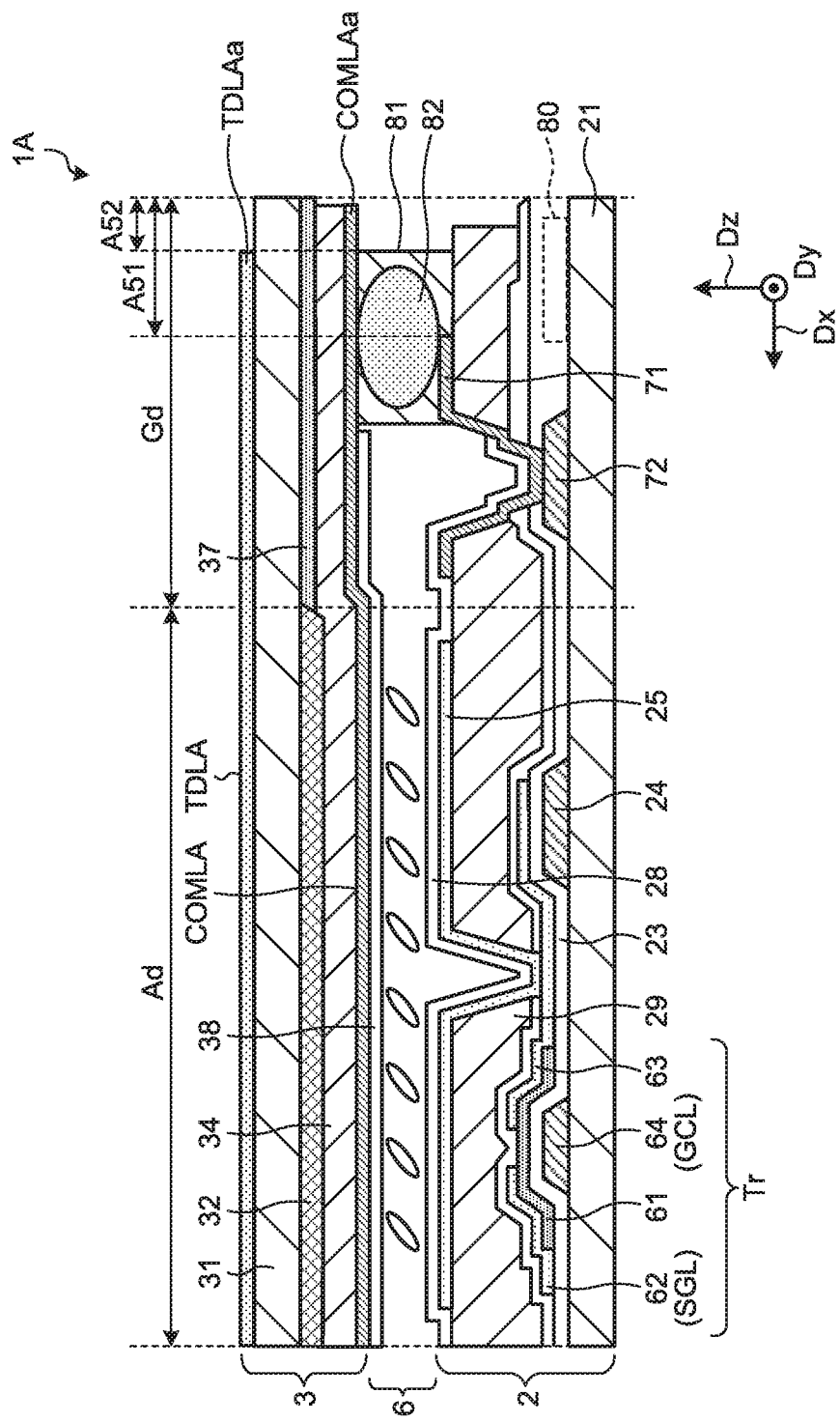
FIG. 27 is a schematic sectional diagram for explaining a coupling configuration between the common electrodes and the first electrodes.
Figure 28:
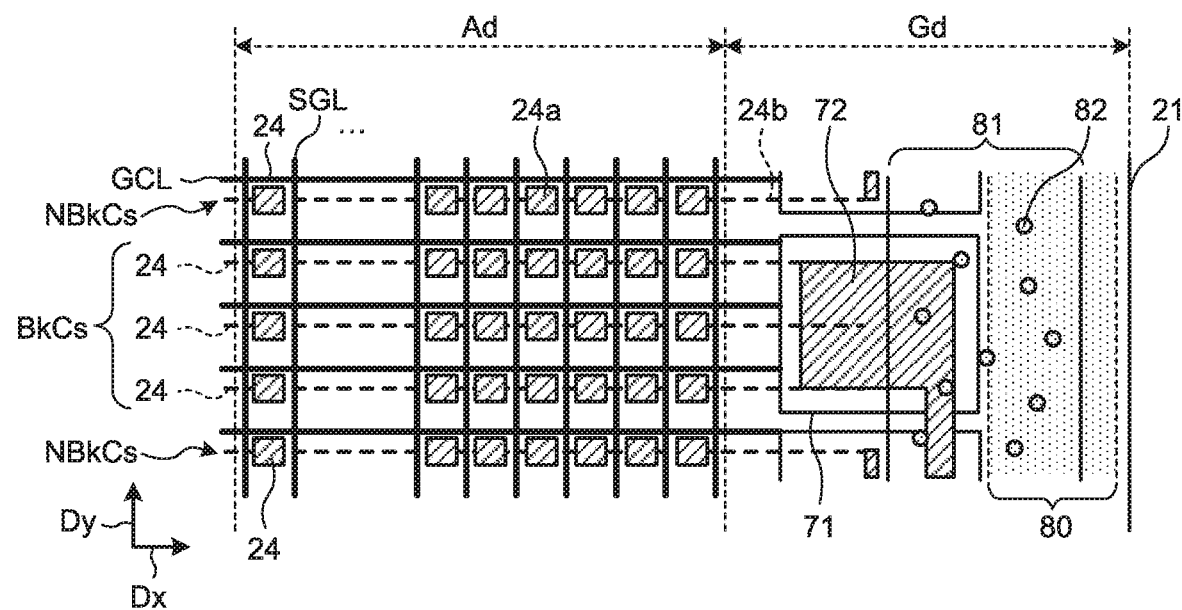
FIG. 28 is a plan view schematically illustrating the first electrodes and the conductive portion.
Figure 29:
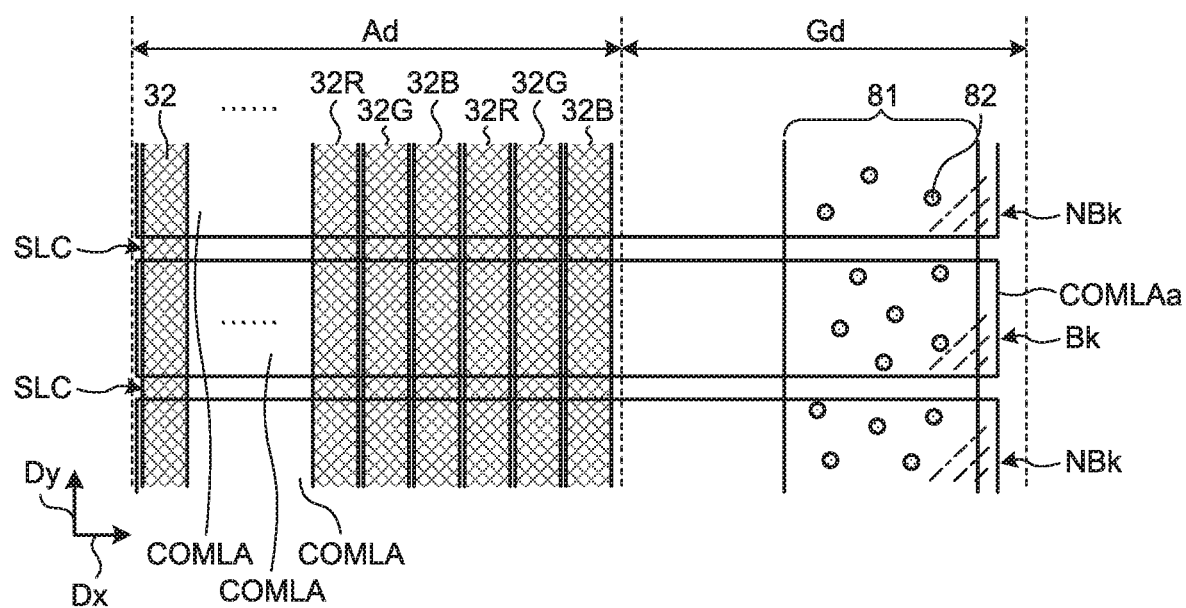
FIG. 29 is a plan view schematically illustrating the common electrodes and the conductive portion.

The following describes a coupling configuration between the first electrodes 24 and the common electrodes COMLA. FIG. 27 is a schematic sectional diagram for explaining the coupling configuration between the common electrodes and the first electrodes. FIG. 28 is a plan view schematically illustrating the first electrodes and the conductive portion. FIG. 29 is a plan view schematically illustrating the common electrodes and the conductive portion.

FIG. 27 illustrates a portion for one pixel at the outermost circumference of the display region Ad and the peripheral region Gd adjacent thereto. The display device 1A illustrated in FIG. 27 differs in configuration from that described with reference to FIGS. 12 to 15 in that the switching circuit 80A is not provided. That is, this embodiment includes no configuration for switching between coupling and uncoupling the common electrodes COMLA and the signal lines SGL.

As illustrated in FIG. 27, the common electrodes COMLA are electrically coupled to the conductive layer 71 and the coupling electrodes 72 of the first substrate 21 through coupling portions COMLAa and the conductive portion 81. As illustrated in FIG. 28, the first electrodes 24 are formed into a long shape having a longitudinal direction in the first direction Dx as a whole, and are electrically coupled to the coupling electrodes 72. The signal lines SGL are provided so as to intersect with the first electrodes 24, and are uncoupled from the coupling electrodes 72. The longitudinal direction of the first electrodes 24 is the same as that of the common electrodes COMLA illustrated in FIG. 29. As illustrated in FIG. 29, the color regions 32R, 32G, and 32B of the color filter 32 intersect with the common electrodes COMLA in the plan view.

As illustrated in FIGS. 28 and 29, the coupling electrodes 72 are provided corresponding to the common electrodes COMLA arranged in the second direction Dy. That is, the coupling electrodes 72 are coupled in a one-to-one relation to the common electrodes COMLA through the conductive portion 81. A plurality of first electrodes 24 overlapping with one of the common electrodes COMLA are coupled to one of the coupling electrodes 72.

FIG. 29 illustrates a case where one of the common electrodes COMLA is selected as the drive electrode block Bk. The common electrodes COMLA other than those selected as the drive electrode block Bk serve as the non-selected electrode block NBk. As described above, the driver IC 19 (refer to FIG. 18) supplies the various drive signals to the drive electrode block Bk.

As illustrated in FIG. 28, a plurality of first electrodes 24 overlapping with and opposed to the drive electrode block Bk are electrically coupled to the drive electrode block Bk through the conductive portion 81. As a result, these first electrodes 24 serve as a first electrode block BkCs. The first electrode block BkCs is supplied with the same signals as the various drive signals supplied to the drive electrode block Bk. A plurality of first electrodes 24 overlapping with the non-selected electrode block NBk serve as a non-selected first electrode block NBkCs, and are driven in the same manner as the non-selected electrode block NBk.

That is, during the display period Pd illustrated in FIG. 19, the first electrodes 24 overlapping with and opposed to the common electrodes COMLA are also supplied with the same potential signal as the drive signal Vcomdc.

During the first sensing period Pem illustrated in FIG. 20, a plurality of first electrodes 24 overlapping with and opposed to the common electrodes COMLA2, COMLA3, COMLA4, COMLA6, COMLA7, and COMLA8 also serve as the transmitting coil CTx. That is, these first electrodes 24 are supplied with the same potential signal as the first drive signal VTP from the driver IC 19, and generate the magnetic field M1. The magnetic field M1 generated from the first electrodes 24 overlaps with the magnetic field generated from the common electrodes COMLA in the detection region Aem.

During the second sensing period Pes illustrated in FIG. 21, the first electrodes 24 overlapping with and opposed to the drive electrode block Bk are also supplied with the same potential signal as the second drive signal TSVcom from the driver IC 19. These first electrodes 24 also generate the electrostatic capacitance between the first electrodes 24 and the second electrodes TDL.

As described above, during the first sensing period Pem and the second sensing period Pes, in response to the control signal from the controller 11, the first electrodes 24 in the display device 1A of this embodiment are supplied with the same signals as those supplied to the common electrodes COMLA. As a result, the responses to the first drive signal VTP and the second drive signal TSVcom are improved in the same manner as in the first embodiment.

Third Embodiment

Figure 30:
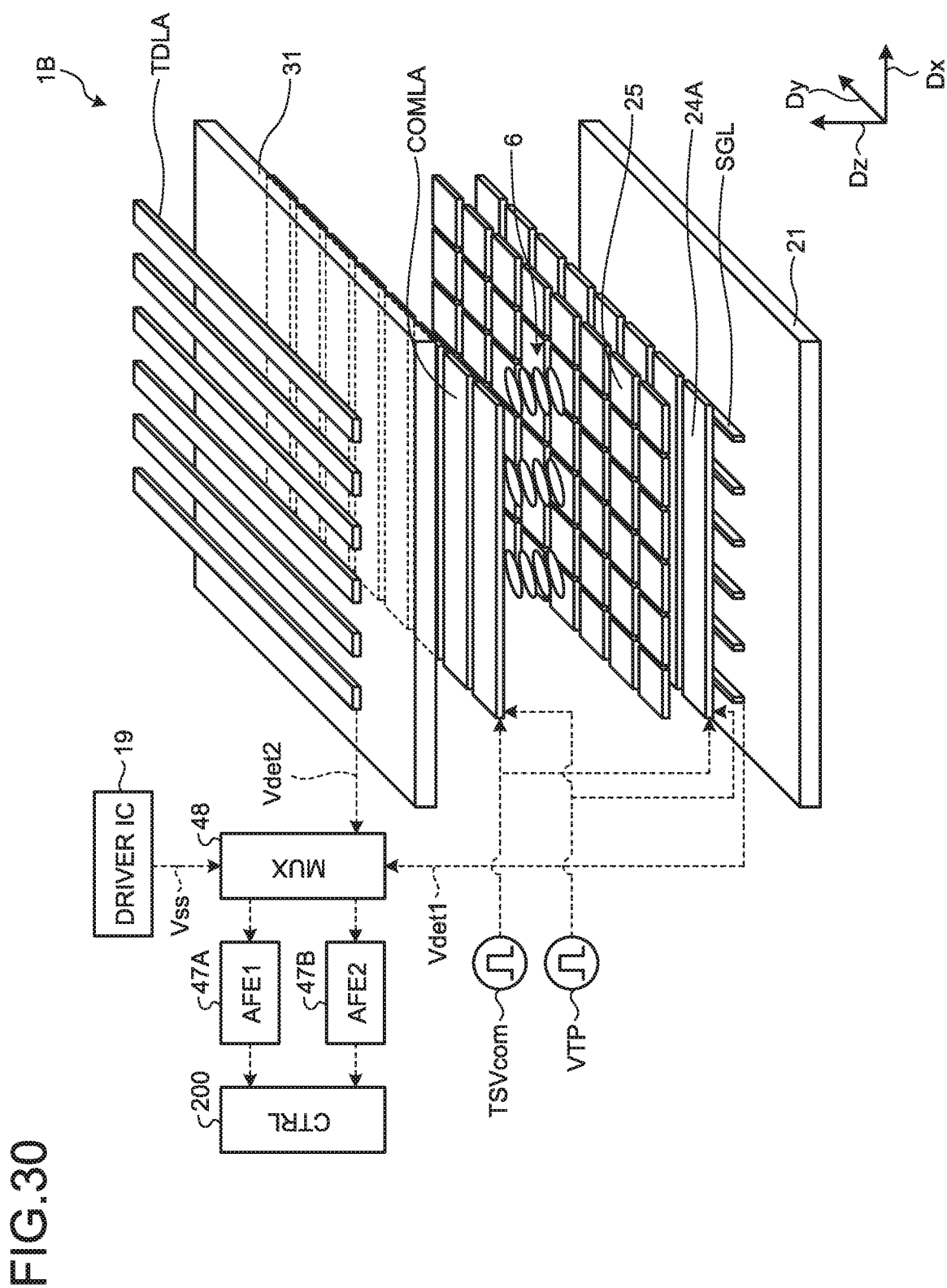
FIG. 30 is an exploded perspective view of a display device according to a third embodiment of the present disclosure.
Figure 31:
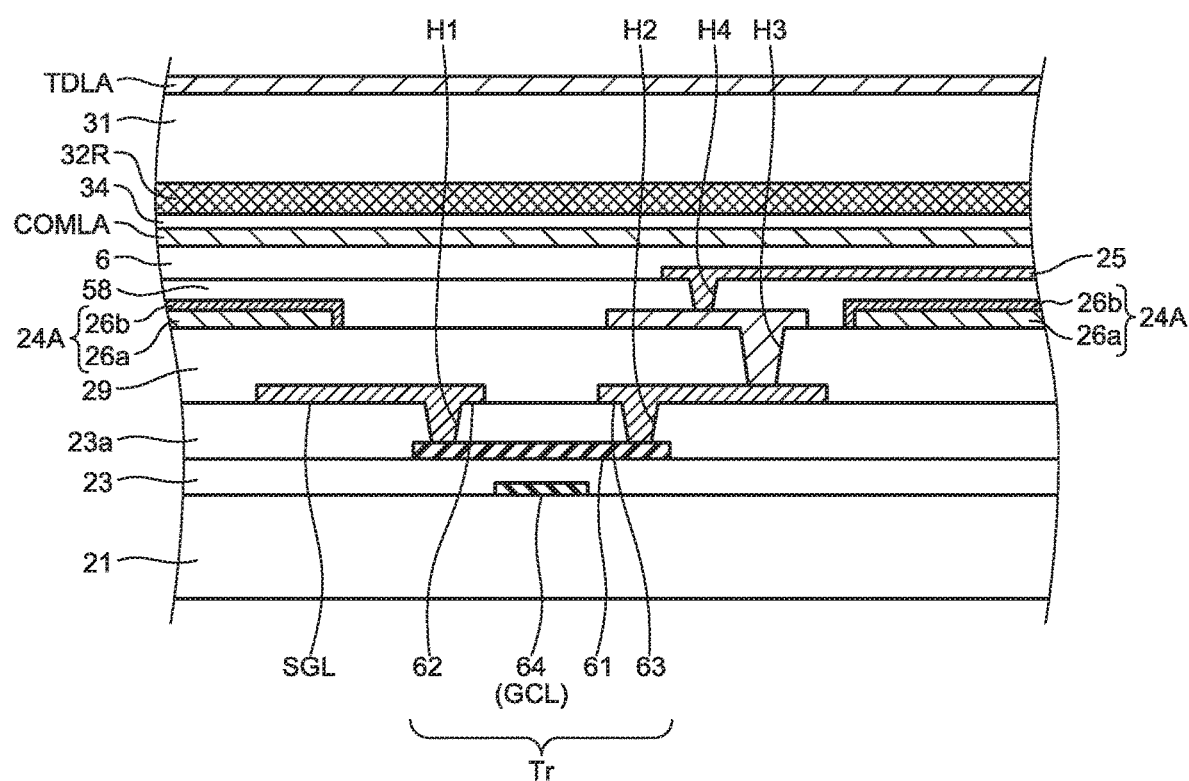
FIG. 31 is a schematic diagram illustrating a sectional structure of the display device according to the third embodiment.

FIG. 30 is an exploded perspective view of a display device according to a third embodiment of the present disclosure. FIG. 31 is a schematic diagram illustrating a sectional structure of the display device according to the third embodiment. As illustrated in FIG. 30, in a display device 1B of this embodiment, the first substrate 21, the signal lines SGL, first electrodes 24A, the pixel electrodes 25, the liquid crystal layer 6 serving as the display functional layer, the common electrodes COMLA, and the second electrodes TDLA are stacked in this order. In other words, the signal lines SGL are provided between the first substrate 21 and the first electrodes 24A in the direction orthogonal to the surface of the first substrate 21.

In this embodiment, the configurations of the common electrodes COMLA and the second electrodes TDLA are the same as those of the second embodiment, and will not be described in detail. In the same manner as in the example illustrated in FIGS. 27 to 29, the common electrodes COMLA are coupled to the first electrodes 24A through the conductive portion 81. Also in this embodiment, as illustrated in FIG. 30, the common electrodes COMLA and the first electrodes 24A are supplied with the same first drive signal VTP during the electromagnetic induction touch detection, and supplied with the same second drive signal TSVcom during the mutual-capacitive touch detection. During the electromagnetic induction touch detection, the signal lines SGL form the receiving coils CRx, and output the first detection signals Vdet1. During the mutual-capacitive touch detection, the second electrodes TDLA output the second detection signals Vdet2.

As illustrated in FIG. 31, the switching element Tr is provided on the first substrate 21. Specifically, the gate electrode 64 (gate line GCL) is provided on the first substrate 21. The semiconductor layer 61 is provided on the upper side of the gate electrode 64 (gate line GCL) with the insulating layer 23 interposed therebetween. The source electrode 62 (signal line SGL) and the drain electrode 63 are provided on the upper side of the semiconductor layer 61 with an insulating layer 23a interposed therebetween. The source electrode 62 is electrically coupled to the semiconductor layer 61 through a contact hole HE The drain electrode 63 is electrically coupled to the semiconductor layer 61 through a contact hole H2.

The planarizing film 29 is provided so as to cover the source electrodes 62 (signal lines SGL) and the drain electrodes 63. The first electrodes 24A are provided on a surface of the planarizing film 29. An insulating layer 58 is provided so as to cover the first electrodes 24A. The pixel electrodes 25 are provided on the insulating layer 58. The pixel electrodes 25 are electrically coupled to the drain electrodes 63 through contact holes H3 and H4.

The first electrodes 24A are provided so as to overlap with the pixel electrodes 25 across the insulating layer 58 in the direction orthogonal to the surface of the first substrate 21. This configuration generates retention capacitance between the first electrodes 24A and the pixel electrodes 25.

Each of the first electrodes 24A includes a metal layer 26a and a light-transmitting conductive layer 26b covering the metal layer 26a. At least one metal material, such as aluminum (Al), copper (Cu), silver (Ag), molybdenum (Mo), and an alloy thereof, is used for the metal layer 26a. For example, ITO is used for the light-transmitting conductive layer 26b.

In this embodiment, the first electrodes 24A are provided in a layer different from that of the switching elements Tr. As a result, each of the first electrodes 24A can have a shape with a large area without being much restricted by, for example, the gate lines GCL and the signal lines SGL. This configuration can increase the overlapping area of the first electrodes 24A and the pixel electrodes 25 so as to increase the retention capacitance.

Each of the first electrodes 24A includes a metal layer 26a, and can have a larger plane area. Therefore, the total resistance value of the common electrodes COMLA and the first electrodes 24A can be lower than those of the first and second embodiments. As a result, the responses to the first drive signal VTP and the second drive signal TSVcom are improved.

Fourth Embodiment

Figure 32:
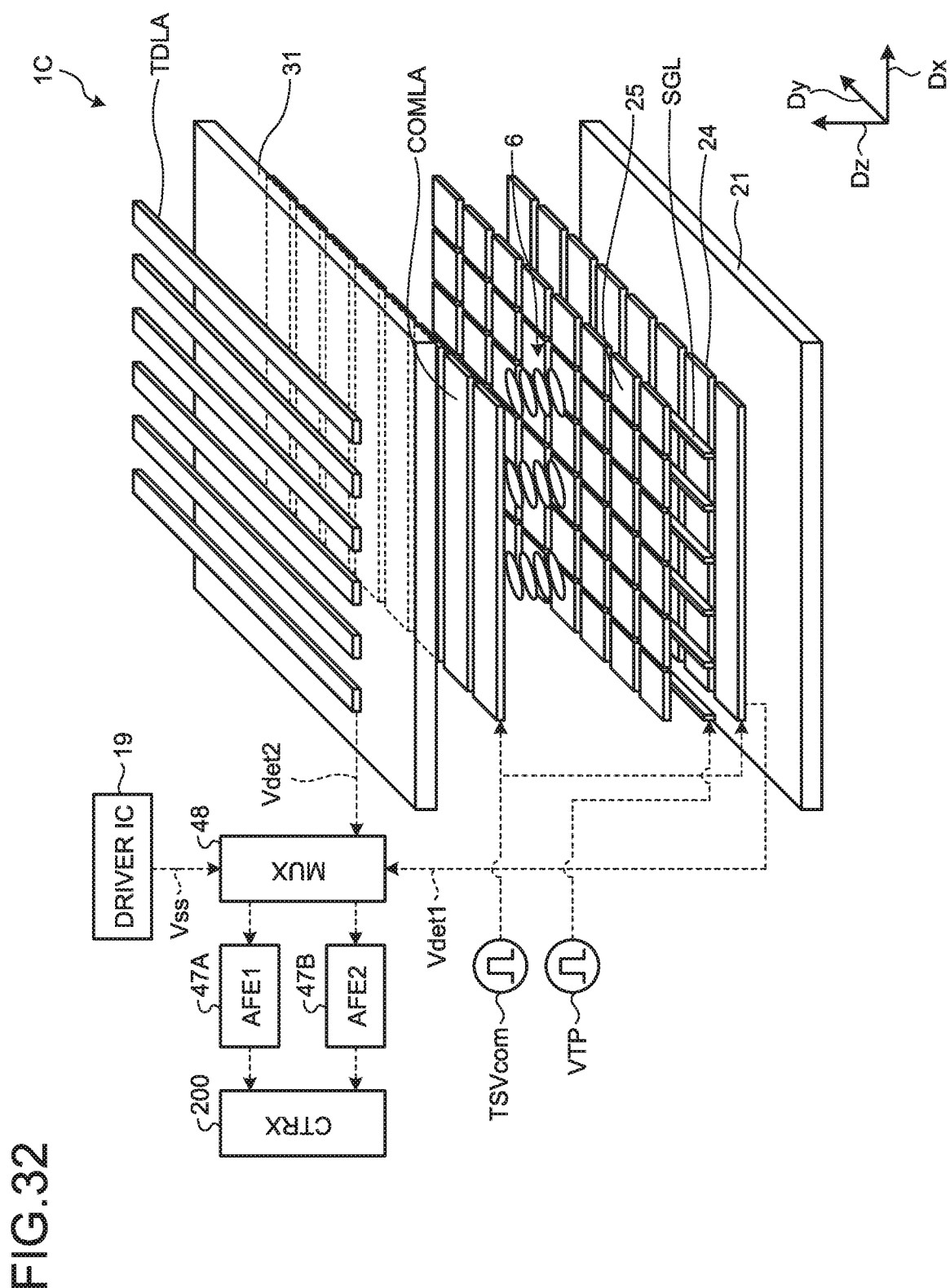
FIG. 32 is an exploded perspective view of a display device according to a fourth embodiment of the present disclosure.

FIG. 32 is an exploded perspective view of a display device according to a fourth embodiment of the present disclosure. As illustrated in FIG. 32, in a display device 1C of this embodiment, the first substrate 21, the first electrodes 24, the signal lines SGL, the pixel electrodes 25, the liquid crystal layer 6 serving as the display functional layer, the common electrodes COMLA, and the second electrodes TDLA are stacked in this order. In other words, the first electrodes 24 are provided between the first substrate 21 and the signal lines SGL in the direction orthogonal to the surface of the first substrate 21.

In this embodiment, for example, the stacking order and the arrangement direction of the first electrodes 24, the signal lines SGL, the common electrodes COMLA, and the second electrodes TDLA are the same as those of the second embodiment. That is, the second electrodes TDLA intersect with the common electrodes COMLA in the plan view. The signal lines SGL intersect with the first electrodes 24 and the common electrodes COMLA in the plan view, and have a longitudinal direction in the same direction as that of the second electrodes TDLA.

As illustrated in FIG. 32, during the electromagnetic induction touch detection, the signal lines SGL form the transmitting coils CTx, and are supplied with the first drive signal VTP. The first electrodes 24 form the receiving coils CRx, and generate the electromotive force based on the electromagnetic induction. The first electrodes 24 output the first detection signal Vdet1 corresponding to the electromotive force.

During the mutual-capacitive touch detection, the common electrodes COMLA and the first electrodes 24 are supplied with the same second drive signal TSVcom. Each of the second electrodes TDLA output the second detection signal Vdet2 corresponding to a change in capacitance between the second electrode TDLA and both the common electrodes COMLA and the first electrodes 24.

Figure 33:
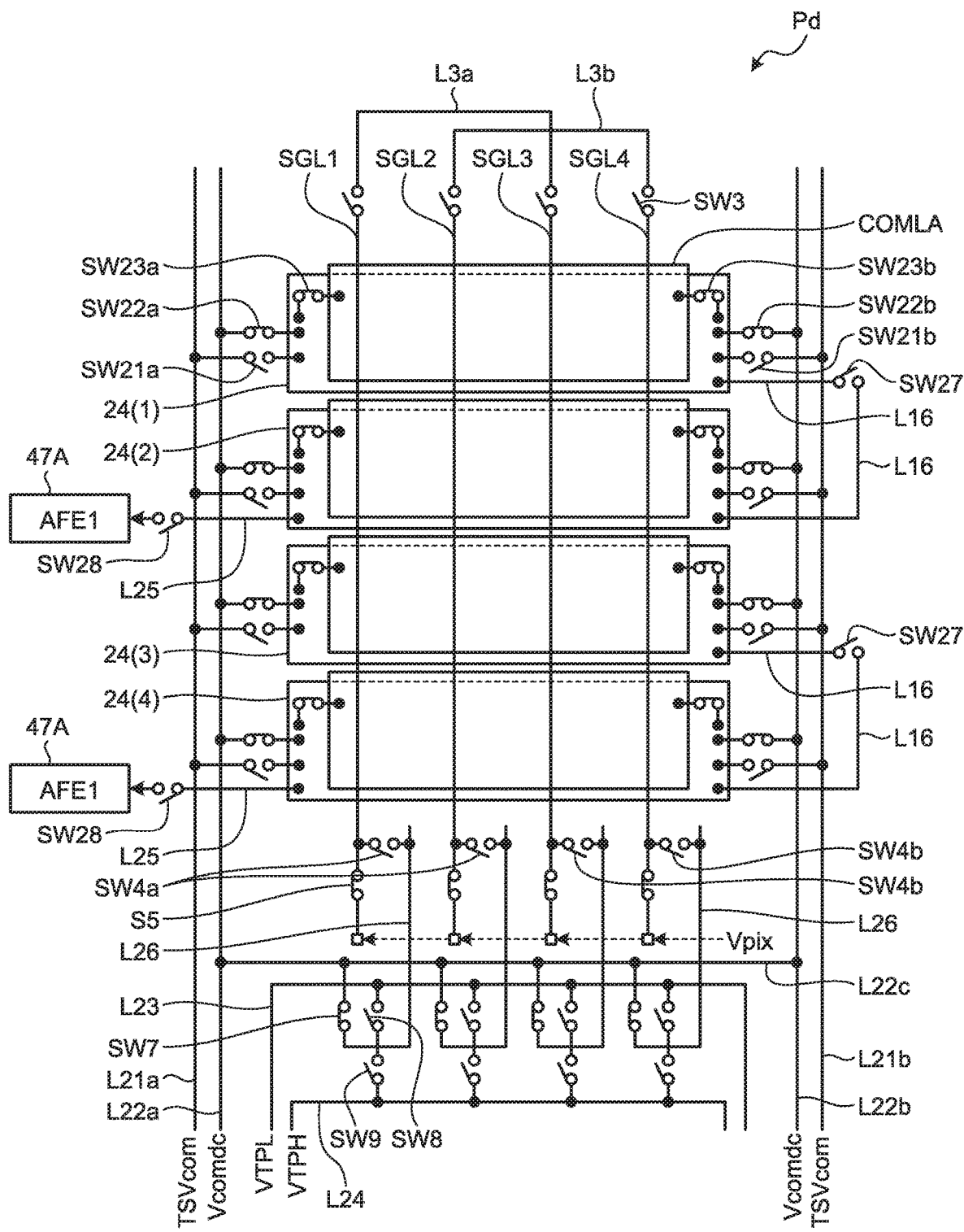
FIG. 33 is a circuit diagram for explaining a coupling configuration between the common electrodes, the first electrodes, and the signal lines during the display period according to the fourth embodiment.
Figure 34:
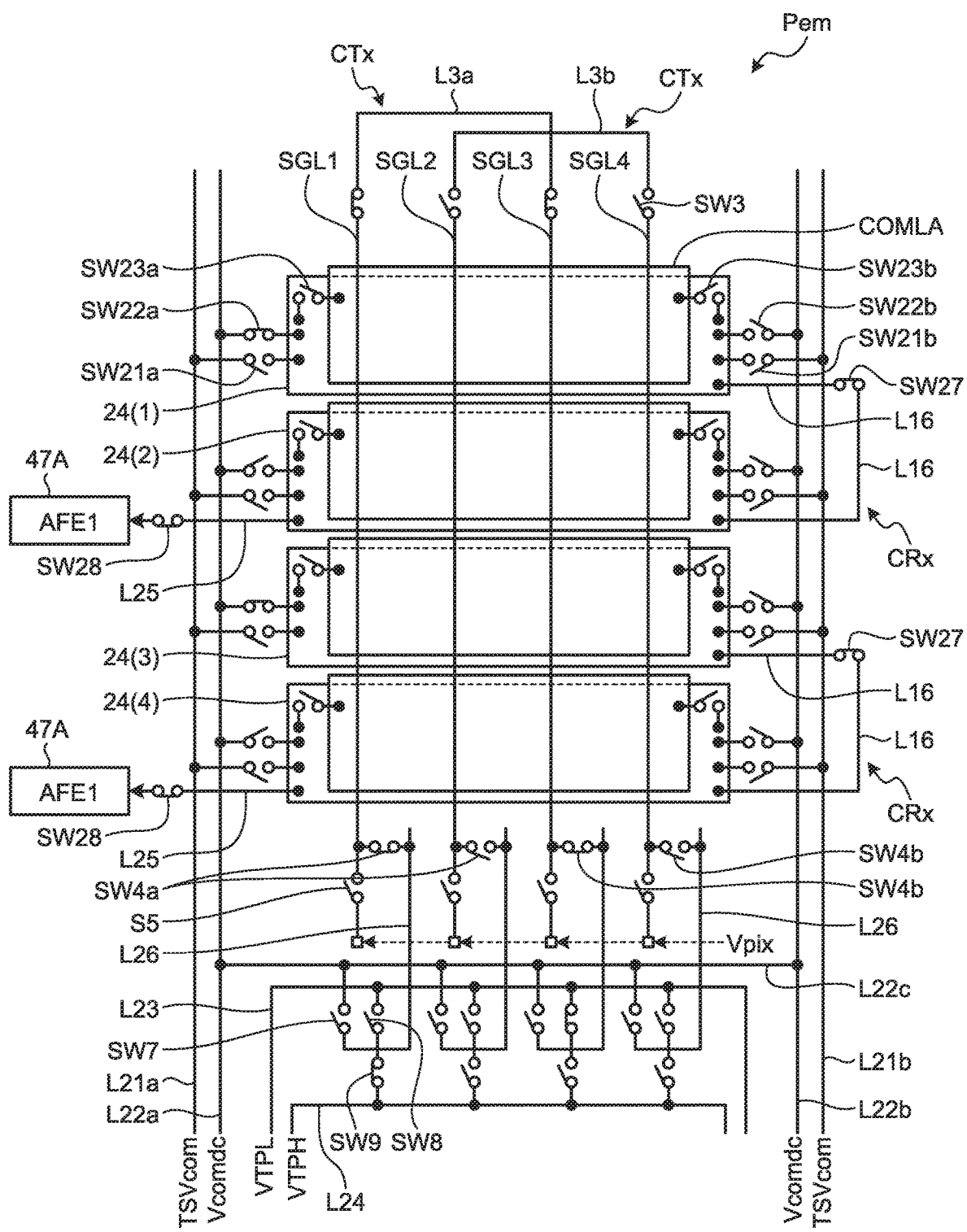
FIG. 34 is a circuit diagram for explaining a coupling configuration between the common electrodes, the first electrodes, and the signal lines during the first sensing period according to the fourth embodiment.
Figure 35:
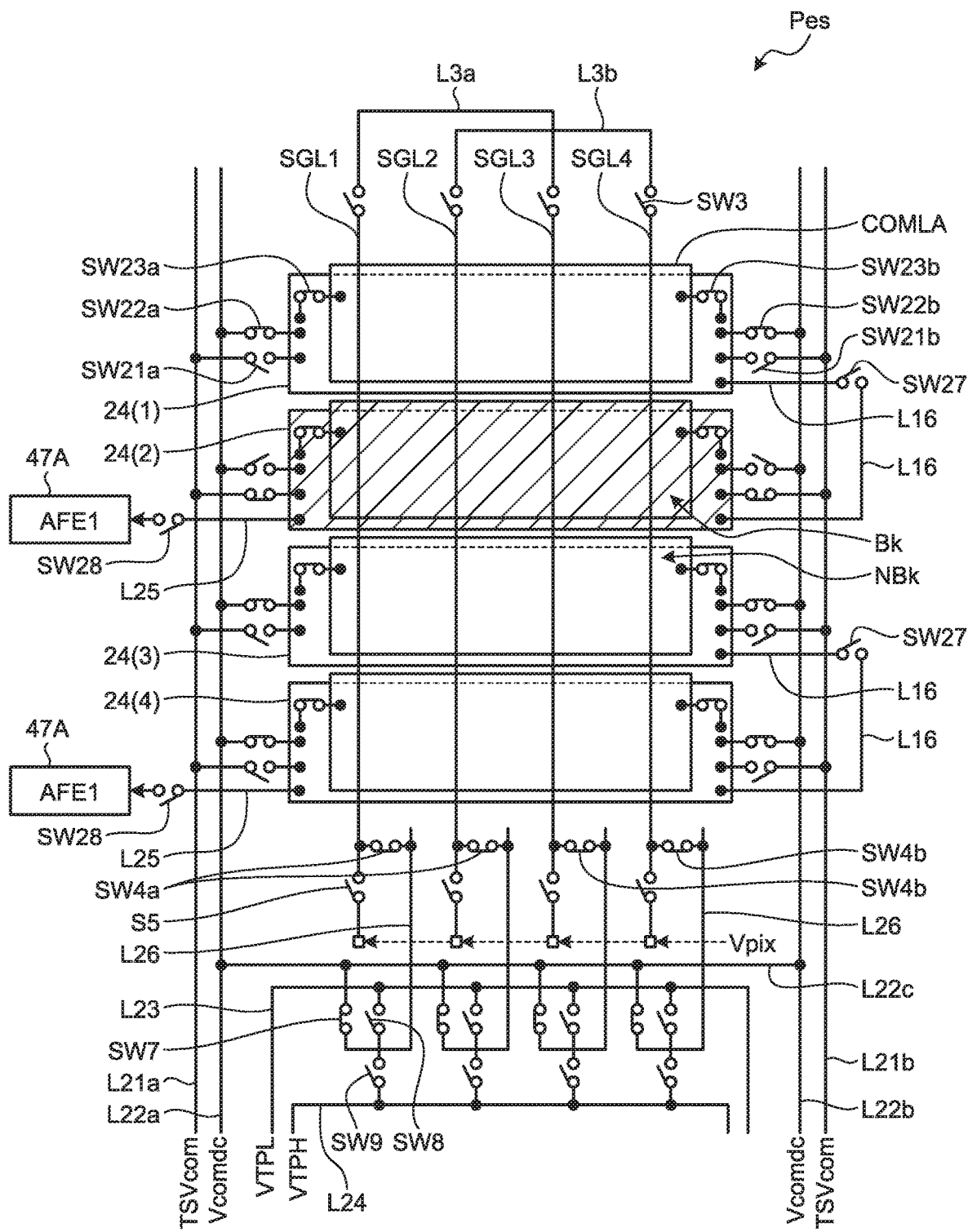
FIG. 35 is a circuit diagram for explaining a coupling configuration between the common electrodes, the first electrodes, and the signal lines during the second sensing period according to the fourth embodiment.

The following describes coupling configurations between the common electrodes COMLA, the first electrodes 24, and the signal lines SGL. FIG. 33 is a circuit diagram for explaining a coupling configuration between the common electrodes, the first electrodes, and the signal lines during the display period according to the fourth embodiment. FIG. 34 is a circuit diagram for explaining a coupling configuration between the common electrodes, the first electrodes, and the signal lines during the first sensing period according to the fourth embodiment. FIG. 35 is a circuit diagram for explaining a coupling configuration between the common electrodes, the first electrodes, and the signal lines during the second sensing period according to the fourth embodiment.

For ease of viewing, each of FIGS. 33 to 35 makes a schematic illustration such that one first electrode 24 overlaps with one common electrode COMLA. However, each of the first electrodes 24(1), 24(2), 24(3), and 24(4) includes a plurality of first electrodes 24 overlapping with a corresponding one of the common electrodes COMLA, as illustrated in FIGS. 28 and 29.

As illustrated in FIGS. 33 to 35, the second drive signal TSVcom is supplied to the common electrodes COMLA through wiring L21a and L21b. The drive signal Vcomdc for display is supplied to the common electrodes COMLA through wiring L22a and L22b. The second voltage VTPL is supplied to the signal lines SGL through wiring L23. The first voltage VTPH is supplied to the signal lines SGL through wiring L24.

The wiring L21a and the wiring L22a are provided on the left side of the common electrodes COMLA and the first electrodes 24. The wiring L21b and the wiring L22b are provided on the right side of the common electrodes COMLA and the first electrodes 24. Wiring L22c couples the wiring L22a to the wiring L22b.

A switch SW21a is provided between the left end of each of the first electrodes 24 and the wiring L21a. A switch SW22a is provided between the left end of each of the first electrodes 24 and the wiring L22a. The switch SW21a and the switch SW22a are coupled in parallel to the left end of each of the first electrodes 24. A switch SW23a is provided between the left end of each of the first electrodes 24 and the left end of a corresponding one of the common electrodes COMLA.

In the same manner, a switch SW21b is provided between the right end of each of the first electrodes 24 and the wiring L21b. A switch SW22b is provided between the right end of each of the first electrodes 24 and the wiring L22b. The switch SW21b and the switch SW22b are coupled in parallel to the right end of each of the first electrodes 24. A switch SW23b is provided between the right end of each of the first electrodes 24 and the right end of a corresponding one of the common electrodes COMLA.

One piece of the wiring L16 is coupled to the right end of the first electrode 24(1) and another piece of the wiring L16 is coupled to the right end of the first electrode 24(2). A switch SW27 is provided between the two pieces of the wiring L16. The left end of the first electrode 24(2) is coupled to the first AFE 47A through wiring L25 and a switch SW28. The same applies to the pair of the first electrodes 24(3) and 24(4).

The upper end sides of the signal lines SGL1, SGL2, SGL3, and SGL4 are provided with the switches SW3 and the wiring L3a and L3b. Two of the switches SW3 and the wiring L3a couple the upper ends of the pair of the signal lines SGL1 and SGL3 to each other. The other two of the switches SW3 and the wiring L3b couple the upper ends of the pair of the signal lines SGL2 and SGL4 to each other.

The switches SW4a and SW4b are provided between the lower ends of the signal lines SGL and wiring L26. Switches SW7 are provided between the wiring L22c and the wiring L26 (signal lines SGL). Switches SW8 are provided between the wiring L23 and the wiring L26 (signal lines SGL). Switches SW9 are provided between the wiring L24 and the wiring L26 (signal lines SGL).

As illustrated in FIG. 33, during the display period Pd, the switches SW23a and SW23b are turned on. As a result, both ends of the common electrodes COMLA are coupled to both ends of the first electrodes 24 overlapping with and opposed to the common electrodes COMLA. The switches SW27 are turned off. As a result, the right ends of the first electrodes 24(1) and 24(2) are uncoupled from each other, and the right ends of the first electrodes 24(3) and 24(4) are uncoupled from each other. As a result, the common electrodes COMLA are electrically coupled to the first electrodes 24 overlapping with and opposed to the common electrodes COMLA.

The switches SW21a and SW21b are turned off. As a result, the first electrodes 24 are uncoupled from the wiring L21a and the wiring L21b. The switches SW22a and SW22b are turned on. As a result, the left ends of the first electrodes 24 are coupled to the wiring L22a, and the right ends of the first electrodes 24 are coupled to the wiring L22b. With the above-described configuration, the drive signal Vcomdc is supplied to the first electrodes 24 and the common electrodes COMLA.

The switches SW3 are turned off in response to the control signal from the controller 11. As a result, the upper ends of the signal lines SGL1, SGL2, SGL3, and SGL4 are uncoupled from one another. The switches SW4a and SW4b are turned off, and the switches S5 are turned on. As a result, the pixel signal Vpix is supplied to the signal lines SGL through the switches S5.

As illustrated in FIG. 34, during the first sensing period Pem, the two of the switches SW3 coupled to the signal lines SGL1 and SGL3 are turned on. As a result, the upper ends of the pair of the signal lines SGL1 and SGL3 are coupled to each other through the wiring L3a. The other two of the switches SW3 coupled to the pair of the signal lines SGL2 and SGL4 are off.

On the lower end side of the signal lines SGL1 and SGL3, the switches S5 are turned off, and the switches SW4a and SW4b are turned on. As a result, the lower ends of the signal lines SGL1 and SGL3 are coupled to the wiring L26. The switch SW9 provided on the lower end side of the signal line SGL1 is turned on. The lower end of the signal line SGL1 is coupled to the wiring L24. The switch SW8 provided on the lower end side of the signal line SGL3 is turned on. The lower end of the signal line SGL3 is coupled to the wiring L23.

With the above-described configuration, the signal lines SGL1 and SGL3 are coupled together so as to form a loop, and are formed as a transmitting coil CTx. The signal line SGL1 is supplied with the first voltage VTPH through the wiring L24. The signal line SGL3 is supplied with the second voltage VTPL through the wiring L23. Switching the operations of the switches SW8 and SW9 causes the signal lines SGL1 and SGL3 to be supplied with the first drive signal VTP (refer to FIG. 32).

As a result, a current corresponding to the potential difference between the first voltage VTPH and the second voltage VTPL flows in the transmitting coil CTx. This current generates the magnetic field M1 (refer to FIG. 3). When the signal lines SGL1 and SGL3 are formed as the transmitting coil CTx, the pair of the signal lines SGL2 and SGL4 is in the floating state. In the same manner as the signal lines SGL1 and SGL3, the signal lines SGL2 and SGL4 are formed as the transmitting coil CTx in a time-division manner. As described above, during the first sensing period Pem, the first drive signal VTP is supplied to the signal lines SGL to cause the electromagnetic induction in response to the control signal from the controller 11.

During the first sensing period Pem, the switches SW23a and SW23b are turned off. As a result, the common electrodes COMLA are uncoupled from the first electrodes 24 overlapping with and opposed to the common electrodes COMLA.

The switches SW27 are turned on. As a result, the right ends of the pair of the first electrodes 24(1) and 24(2) are coupled to each other, and the right ends of the pair of the first electrodes 24(3) and 24(4) are coupled to each other.

All the switches SW21b and SW22b coupled to the right ends of the first electrodes 24 are turned off. As a result, the right ends of the first electrodes 24 are uncoupled from the wiring L21b and L22b. The switch SW22a coupled to the left end of each of the first electrodes 24(1) and 24(3) is turned on. The left ends of the first electrodes 24(1) and 24(3) are coupled to the wiring L22a, and are supplied with the drive signal Vcomdc. The switch SW28 coupled to the left end of each of the first electrodes 24(2) and 24(4) is turned on. The left ends of the first electrodes 24(2) and 24(4) are coupled to the first AFE 47A.

As described above, in this embodiment, the switch SW27 is provided that couples together the ends on the same side of a pair of the first electrodes 24 (such as the first electrodes 24(1) and 24(2)) among the first electrodes 24. The controller 11 couples together the pair of the first electrodes 24 by operating the switch SW27 during the first sensing period Pem, and brings the pair of the first electrodes 24 into the uncoupled state by operating the switch SW27 during the periods different from the first sensing period Pem.

With the above-described configuration, the first electrodes 24(1) and 24(2) are coupled together so as to form a loop, and serve as a receiving coil CRx. The pair of the first electrodes 24(3) and 24(4) also serves as a receiving coil CRx.

In the example illustrated in FIG. 34, the two receiving coils CRx are formed so as not to overlap with each other. The two receiving coils CRx are, however, not limited to this example, but may be arranged so as to partially overlap with each other as illustrated in FIG. 13 or other drawings.

As illustrated in FIG. 35, during the second sensing period Pes, the switches SW23a and SW23b are turned on. As a result, both ends of the common electrodes COMLA are coupled to both ends of the first electrodes 24 overlapping with and opposed to the common electrodes COMLA. The switches SW27 are turned off. As a result, the other ends of the first electrodes 24 are uncoupled from each other. As a result, the same potential signal as the second drive signal TSVcom is supplied to the first electrodes 24 opposed to the common electrodes COMLA supplied with the second drive signal TSVcom.

The following describes a case illustrated in FIG. 35 where the first electrode 24(2) and the common electrode COMLA overlapping therewith are selected as the drive electrode block Bk. The switch SW21a on the left side of the first electrode 24(2) is turned on, and the switch SW22a thereon is turned off. The switch SW21b on the right side of the first electrode 24(2) is turned on, and the switch SW22b thereon is turned off. As a result, each end of the drive electrode block Bk is coupled to a corresponding one of the wiring L21a and the wiring L21b. As a result, the drive electrode block Bk is supplied with the second drive signal TSVcom through the wiring L21a and L21b.

The switch SW21a on the left side of the non-selected electrode block NBk is turned off, and the switch SW22a thereon is turned on. The switch SW21b on the right side of the non-selected electrode block NBk is turned off, and the switch SW22b thereon is turned on. As a result, each end of the non-selected electrode block NBk is coupled to a corresponding one of the wiring L22a and the wiring L22b. As a result, the non-selected electrode block NBk is supplied with the drive signal Vcomdc.

The controller 11 sequentially selects the common electrodes COMLA and the first electrodes 24 overlapping therewith. Each of the second electrodes TDLA (refer to FIG. 32) outputs, to the second AFE 47B, the second detection signal Vdet2 corresponding to the change in capacitance between the second electrode TDLA and both the common electrode COMLA and the first electrode 24.

During the second sensing period Pes, the switches SW3 coupled to the upper ends of the signal lines SGL are turned off. As a result, the upper ends of the signal lines SGL are uncoupled from one another. The switches SW8 and SW9 coupled to the lower end sides of the signal lines SGL are turned off, and the switches SW4a, SW4b, and SW7 coupled thereto are turned on. As a result, the lower ends of the signal lines SGL are coupled to the wiring L22c through the wiring L26. As a result, the signal lines SGL are supplied with the same drive signal Vcomdc as that for the non-selected electrode block NBk through the wiring L22a, L22b, and L22c.

The signal lines SGL are not limited to this configuration, but may be brought into the floating state during the second sensing period Pes in the same manner as the example illustrated in FIG. 26.

As described above, in the display device 1C of this embodiment, the electromagnetic induction touch detection is performed using the first electrodes 24 and the signal lines SGL provided on the first substrate 21. As a result, the response to the first drive signal VTP is improved in the same manner as in the first embodiment. The mutual-capacitive touch detection is performed using the common electrodes COMLA and the second electrodes TDLA provided on the second substrate 31 and the first electrodes 24 opposed to the common electrodes COMLA. As a result, the response to the second drive signal TSVcom is improved.

Pattern Configuration Example of Common Electrodes

Figure 36:
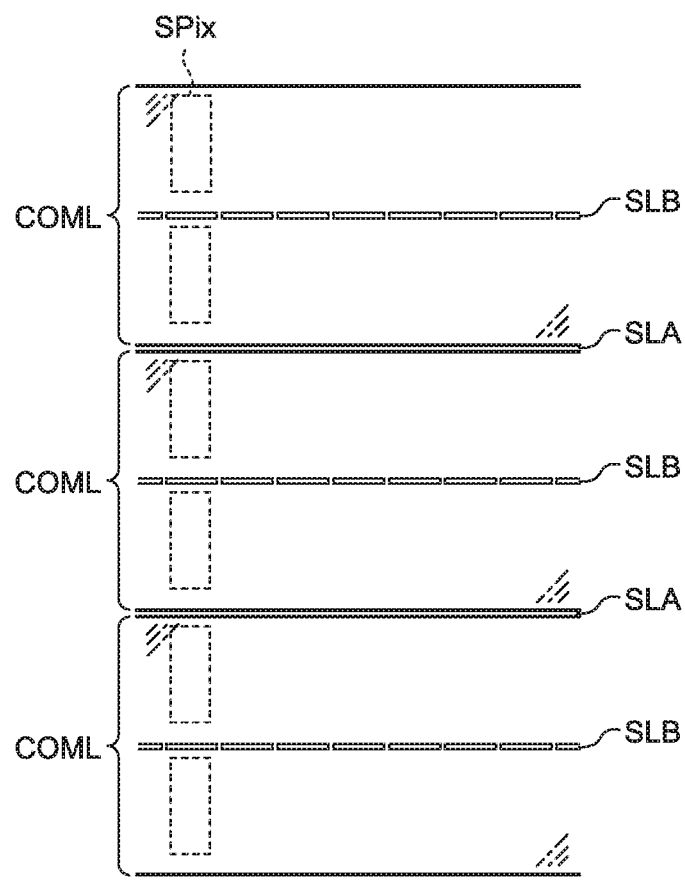
FIG. 36 is a plan view illustrating a pattern configuration example of the common electrodes.
Figure 37:
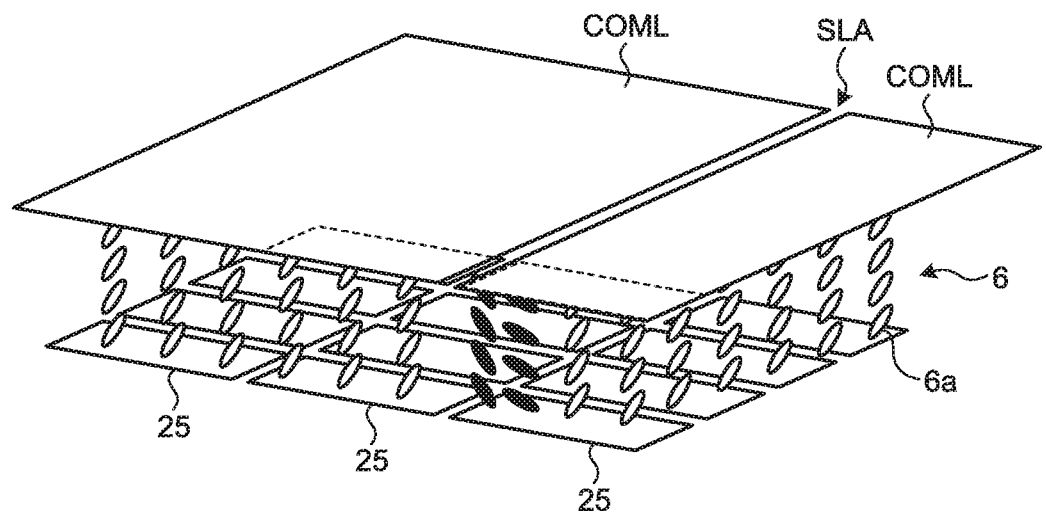
FIG. 37 is an explanatory diagram for explaining a relation between the common electrodes and orientations of liquid crystals.

FIG. 36 is a plan view illustrating a pattern configuration example of the common electrodes. FIG. 37 is an explanatory diagram for explaining a relation between the common electrodes and orientations of the liquid crystals. FIG. 37 schematically illustrates the pixel electrodes 25, the common electrodes COML, and the liquid crystal layer 6 disposed between the pixel electrodes 25 and the common electrodes COML. In the liquid crystal layer 6, ellipses indicate liquid crystal molecules 6a, and illustrate orientation states of the liquid crystal molecules 6a.

As illustrated in FIG. 37, slits SLA (inter-slit) are provided between the adjacent common electrodes COML. The state of electric fields between the pixel electrodes 25 and the common electrodes COML in regions not provided with the slits SLA differs from that in regions provided with the slits SLA. As a result, the orientation of the liquid crystal molecules 6a in the regions provided with the slits SLA may differ from the orientation in other regions and cause lines to be displayed.

FIG. 36 illustrates three of the common electrodes COML isolated by the slits SLA. Each of the common electrodes COML is provided so as to overlap with adjacent two of the sub-pixels SPix. A plurality of slits SLB (inter-slit) are arranged in each of the common electrodes COML in a direction parallel to the slits SLA. Each of the slits SLB is provided between the adjacent sub-pixels SPix in the plan view. The slits SLA and the slits SLB are provided so as to overlap with the gate lines GCL (refer to FIG. 28). The widths of the slits SLA and the slits SLB are greater than the width of the gate lines GCL. This configuration reduces capacitance between the gate lines GCL and the common electrodes COML.

The common electrodes COML are not limited to the example illustrated in FIG. 36, and may each have a width overlapping with three or more of the sub-pixels SPix depending on the resolution of the touch detection. In this case, the slits SLB are arranged in the direction parallel to the slits SLA, and are also arranged in a direction intersecting with the slits SLA. The common electrodes COML are not limited to the example illustrated in FIG. 36, and may be coupled in the peripheral region Gd, instead of being coupled in the display region Ad.

The slits SLA and the slits SLB are provided on a pixel line-by-pixel line basis. This configuration can allow the liquid crystal orientation state of regions provided with the slits SLB to be closer to the liquid crystal orientation state of the regions provided with the slits SLA. As a result, even if the displayed lines appear in the regions provided with the slits SLA, the lines regularly appear corresponding to the gate lines GCL in the display region Ad. Thus, uniformity of display is achieved.

In accordance with the pattern of the common electrodes COML provided with the slits SLA and SLB on a pixel line-by-pixel line basis as described above, a column inversion driving system or a frame inversion driving system is preferably employed as a display driving system; that is, a pixel writing system of the display device 1. That is, since these driving systems can reduce disarray in liquid crystal orientation at the slit portions, the display quality can be improved.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure naturally belong to the technical scope of the present disclosure.

What is claimed is:

1. A display device comprising:
    a pixel substrate including a first substrate made of glass, a plurality of first electrodes, a plurality of lines, and a plurality of pixel electrodes;
    a display functional layer;
    a counter substrate including a second substrate made of glass, a plurality of common electrodes provided on a rear side of the second substrate facing the pixel electrode, and a plurality of second electrodes provided on a front side of the second substrate; and
    a controller,
    wherein the first substrate, the first electrodes, the pixel electrodes, the display functional layer, the common electrodes, and the second electrodes are stacked in this order, and the common electrodes extend in a first direction and the second electrodes extend in a second direction crossing the first direction so as to intersect with the common electrodes in a plan view,
    wherein the lines extend in the second direction between the first substrate and the display functional layer, and are arranged from one side to the other side of the substrate, the first electrodes extend in the first direction along with the common electrodes so as to intersect with the lines and the second electrodes in the plan view, and the first electrodes are provided along the common electrodes in the plan view,
    wherein the pixel electrodes are respectively provided in pixel areas, overlap the first electrodes with an insulating layer therebetween, and face the common electrodes with the display functional layer therebetween,
    wherein the controller is configured to
        perform processing during a plurality of display periods to display an image, during an electromagnetic induction detection period, and during a capacitive detection period in a time-division manner, and
        control the pixel electrodes, the common electrodes, and the first electrodes according to the periods,
    wherein, during the display periods, in response to a control signal from the controller, the pixel electrodes are supplied with a pixel signal through the lines, the common electrodes and the first electrodes are supplied with a common signal, and capacitance between each of the pixel electrodes and a corresponding one of the first electrodes functions as a retention capacitance,
    wherein, during the electromagnetic induction detection period, in response to the control signal from the controller, either of the lines and the first electrodes are supplied with a first drive signal to generate a magnetic field, and the other of the lines and the first electrodes generate an electromotive force caused by the magnetic field, and
    wherein, during the capacitive detection period, in response to the control signal from the controller, the common electrodes are supplied with a second drive signal to generate electrostatic capacitance between the common electrodes and the second electrodes.

2. The display device according to claim 1, further comprising an analog front-end circuit configured to be coupled to the second electrodes.

3. The display device according to claim 2,
    wherein a switching circuit configured to switch a coupling state between the other of the lines and the first electrodes, the second electrodes, and the analog front-end circuit is provided therebetween,
    wherein the switching circuit couples the other of the lines and the first electrodes to the analog front-end circuit during the electromagnetic induction detection period, and
    wherein the switching circuit couples the second electrodes to the analog front-end circuit during the capacitive detection period.

4. The display device according to claim 1,
    wherein a switch is provided that is configured to couple together ends on the same side of a pair of the common electrodes, and
    wherein the controller is configured to
        couple the pair of the common electrodes to each other by operating the switch during the electromagnetic induction detection period, and
        bring the pair of the common electrodes into an uncoupled state by operating the switch during a period different from the electromagnetic induction detection period.

5. The display device according to claim 4,
    wherein, in response to the control signal from the controller, the lines are supplied with the same signal as that supplied to the common electrodes during the electromagnetic induction detection period and the capacitive detection period.

6. The display device according to claim 5,
wherein, in response to the control signal from the controller,
 the lines are supplied with the pixel signal during the display periods,
 the lines opposed to the common electrodes supplied with the first drive signal are supplied with the same potential signal as the first drive signal during the electromagnetic induction detection period, and
 the lines opposed to the common electrodes supplied with the second drive signal are supplied with the same potential signal as the second drive signal during the capacitive detection period.

7. The display device according to claim 1,
wherein a switch is provided that is configured to couple together ends on the same side of a pair of the lines, and
wherein the controller is configured to
 couple the pair of the lines to each other by operating the switch during the electromagnetic induction detection period, and
 bring the pair of the lines into an uncoupled state by operating the switch during a period different from the electromagnetic induction detection period.

8. The display device according to claim 1, further comprising:
a first voltage supply configured to supply a first voltage to the common electrodes; and
a second voltage supply configured to supply a second voltage lower than the first voltage to the common electrodes,
wherein, during the electromagnetic induction detection period, in response to the control signal from the controller,
 the first voltage supply is coupled to one end of at least one of the common electrodes,
 the second voltage supply is coupled to the other end thereof,
 the second voltage supply is coupled to one end of another common electrode, and
 the first voltage supply is coupled to the other end thereof.

9. The display device according to claim 1,
wherein, in response to the control signal from the controller, the first electrodes are supplied with the same signal as that supplied to the common electrodes during the electromagnetic induction detection period and the capacitive detection period.

10. The display device according to claim 9,
wherein, in response to the control signal from the controller,
 the first electrodes are supplied, during the display periods, with the same potential signal as that supplied to the common electrodes,
 the first electrodes opposed to the common electrodes supplied with the first drive signal are supplied with the same potential signal as the first drive signal during the electromagnetic induction detection period, and
 the first electrodes opposed to the common electrodes supplied with the second drive signal are supplied with the same potential signal as the second drive signal during the capacitive detection period.

11. The display device according to claim 1,
wherein the lines are covered with a planarizing film, and the first electrodes are provided on a surface of the planarizing film.

12. The display device according to claim 11,
wherein the second electrodes include a metal layer and a light-transmitting conductive layer covering the metal layer.

13. The display device according to claim 1,
wherein a switch is provided that is configured to couple together ends on the same side of a pair of the first electrodes, and
wherein the controller is configured to
 couple the pair of the first electrodes to each other by operating the switch during the electromagnetic induction detection period, and
 bring the pair of the first electrodes into an uncoupled state by operating the switch during a period different from the electromagnetic induction detection period.

14. The display device according to claim 13,
wherein, during the electromagnetic induction detection period, in response to the control signal from the controller, the lines are supplied with the first drive signal to generate the magnetic field, and the first electrodes generate the electromotive force caused by the magnetic field.

15. The display device according to claim 13,
wherein the first electrodes opposed to the common electrodes supplied with the second drive signal are supplied with the same potential signal as the second drive signal during the electromagnetic induction detection period.

16. The display device according to claim 1,
wherein an insulating substrate is provided between the common electrodes and the second electrodes.

17. The display device according to claim 1,
wherein the display functional layer is a liquid crystal layer, and is configured to change in orientation from an initial orientation based on an electric field generated between the pixel.

\* \* \* \* \*